US012352374B2

(12) United States Patent
Cook et al.

(10) Patent No.: US 12,352,374 B2
(45) Date of Patent: Jul. 8, 2025

(54) END FITTINGS FOR FLEXIBLE PIPE SEGMENTS

(71) Applicant: FMC Technologies, Inc., Houston, TX (US)

(72) Inventors: James Cook, Houston, TX (US); James R. Soltau, Stephenville, TX (US); Cody Bedwell, Houston, TX (US); Corey Massey, Houston, TX (US); Yaswanth Kasireddy, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 92 days.

(21) Appl. No.: 17/964,606

(22) Filed: Oct. 12, 2022

(65) Prior Publication Data
US 2024/0125415 A1    Apr. 18, 2024

(51) Int. Cl.
F16L 33/18    (2006.01)
F16L 33/01    (2006.01)
F16L 33/28    (2006.01)

(52) U.S. Cl.
CPC .............. F16L 33/18 (2013.01); F16L 33/28 (2013.01); F16L 33/01 (2013.01)

(58) Field of Classification Search
CPC . F16L 23/08; F16L 33/18; F16L 33/28; F16L 33/01
See application file for complete search history.

(56) References Cited

U.S. PATENT DOCUMENTS 4,666,191 A  *  5/1987  Sotelo ................. F16L 33/01
                                              138/109
6,273,142 B1 *  8/2001  Braad ................. F16L 33/01
                                              138/155
6,592,153 B1 *  7/2003  Belcher ............... F16L 33/01
                                              285/342

(Continued)

FOREIGN PATENT DOCUMENTS

FR       3038033 A1 * 12/2016 ............. F16L 33/01
WO  WO-2017114942 A1 *  7/2017 ............. F16L 33/01

(Continued)

OTHER PUBLICATIONS

PCT Patent Application PCT/US23/34503 International Search Report and Written Opinion issued Nov. 23, 2023.

Primary Examiner — Matthew Troutman
Assistant Examiner — Fannie Kee
(74) Attorney, Agent, or Firm — Erise IP, P.A.

(57) ABSTRACT

A pipe assembly includes a flexible pipe segment and at least one end fitting. The at least one end fitting includes an end casing coupled to the flexible pipe segment and a seal housing removably coupled to the end casing. The end casing defines a seal housing-receiving bore extending longitudinally through the end casing, and the seal housing is positioned within the seal housing-receiving bore. The seal housing defines at least one seal bore extending from an axially distal surface of the seal housing, and one or more sealing elements are seated in a respective one of the at least one seal bore. The end casing is couplable to a counterpart fitting, and the seal housing and/or the one or more sealing elements are configured to define a sealing interface with the counterpart fitting.

20 Claims, 20 Drawing Sheets

(56) References Cited

U.S. PATENT DOCUMENTS

Figure 1A:
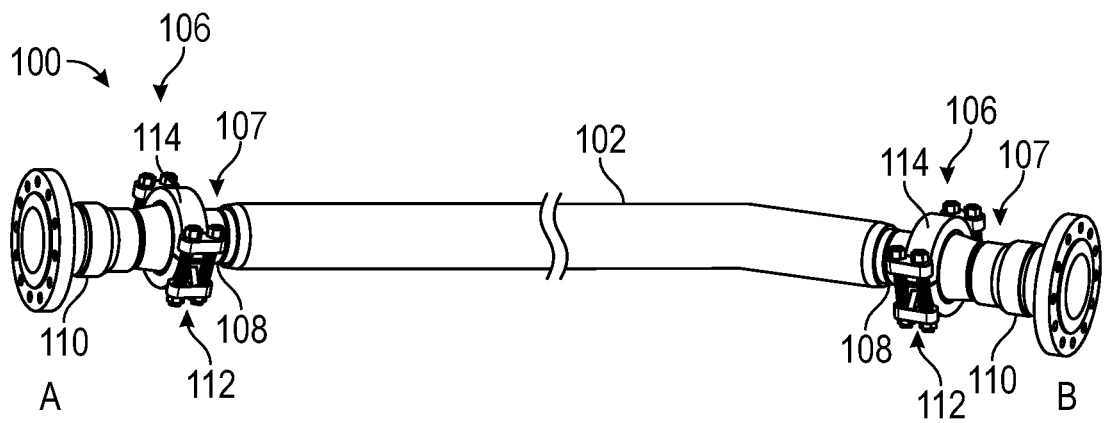

| | | | |
|---|---|---|---|
| 6,742,813 B1* | 6/2004 | Glejbol | F16L 33/01 285/222.4 |
| 2004/0066035 A1* | 4/2004 | Buon | F16L 33/01 138/135 |
| 2009/0085351 A1 | 4/2009 | Cloos et al. | |
| 2011/0100499 A1 | 5/2011 | Saltel et al. | |
| 2012/0211975 A1* | 8/2012 | Campello | F16L 33/01 156/92 |
| 2013/0340877 A1* | 12/2013 | Kassow | F16L 33/01 138/137 |
| 2014/0013829 A1* | 1/2014 | Demanze | F16L 33/01 73/49.1 |
| 2014/0312612 A1* | 10/2014 | Dhagat | F16L 33/01 29/515 |
| 2016/0153598 A1* | 6/2016 | Bertoni | F16L 33/01 285/55 |
| 2016/0208969 A1 | 7/2016 | Bertoni et al. | |
| 2016/0290539 A1* | 10/2016 | Nielsen | F16L 33/01 |
| 2017/0314379 A1 | 11/2017 | Guidry | |
| 2019/0017641 A1* | 1/2019 | Phillips | F16L 33/01 |
| 2020/0063908 A1 | 2/2020 | Fink | |
| 2020/0284132 A1 | 9/2020 | Fink et al. | |

FOREIGN PATENT DOCUMENTS

| | | |
|---|---|---|
| WO | 2019239115 A1 | 12/2019 |
| WO | 2021146203 A1 | 7/2021 |

\* cited by examiner

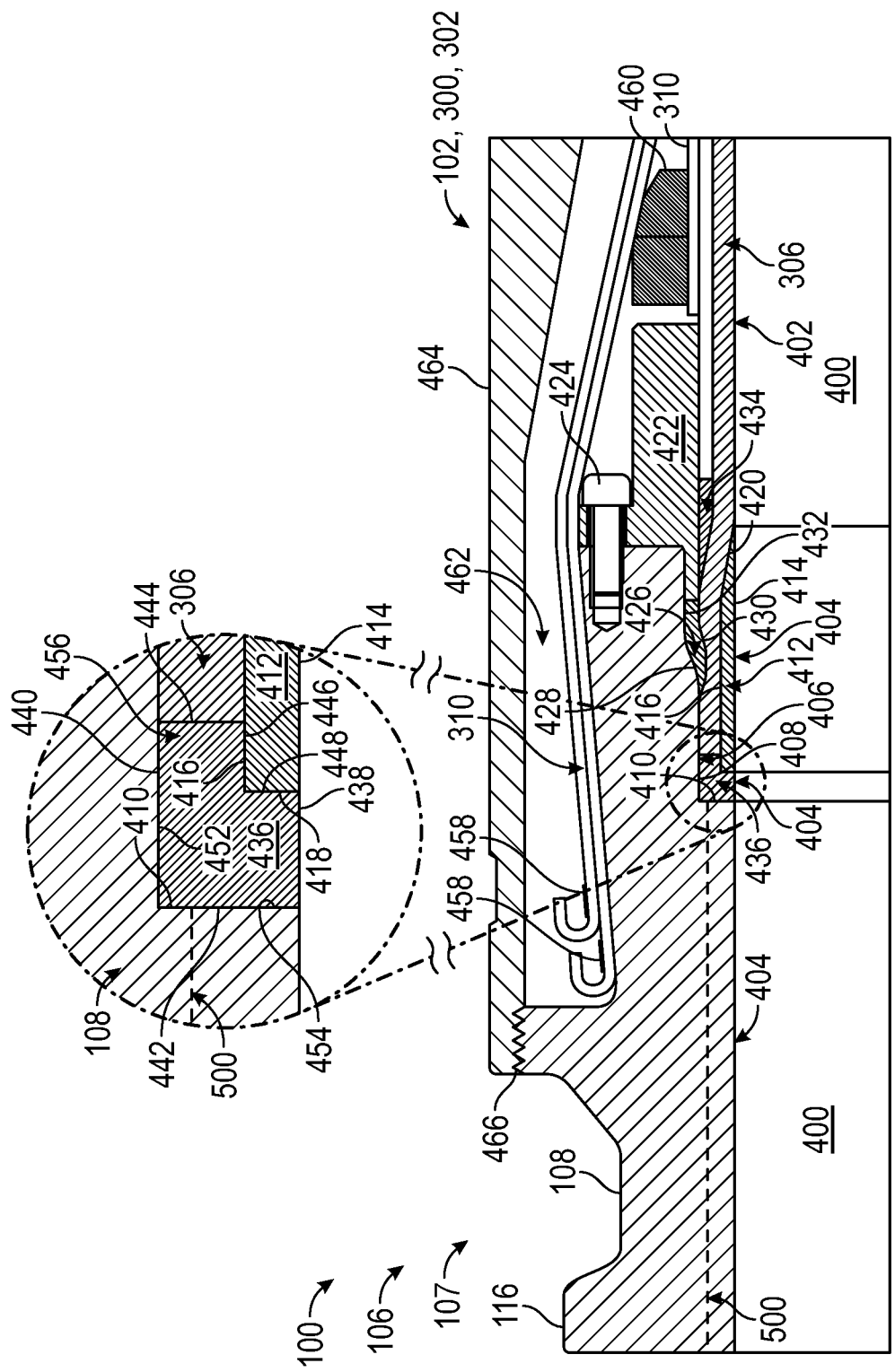

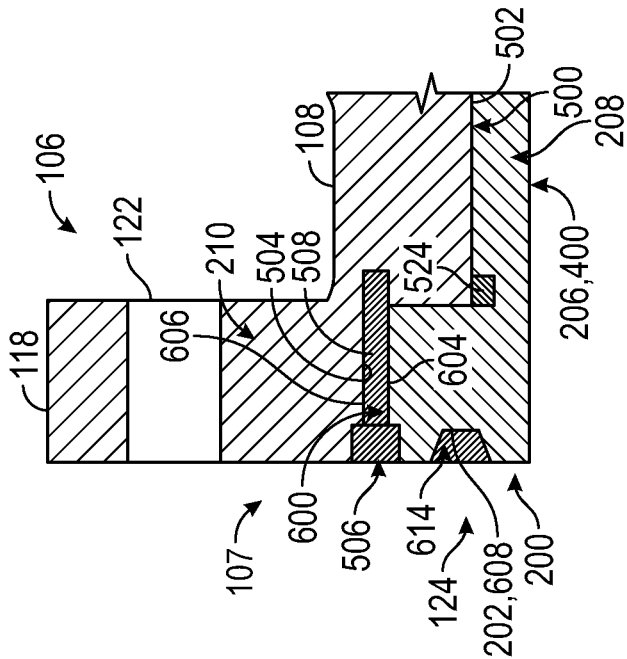
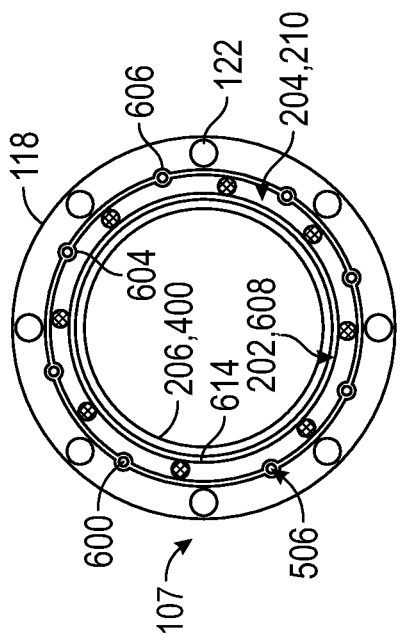
FIG. 6G
FIG. 6H
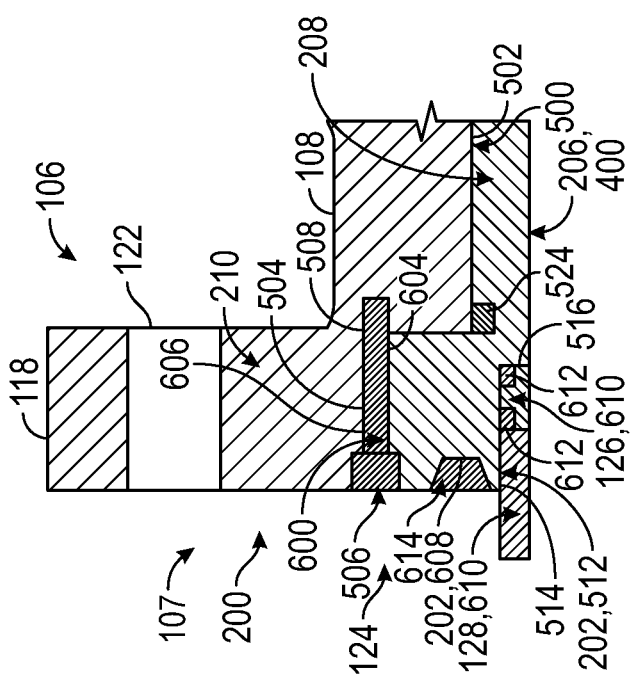
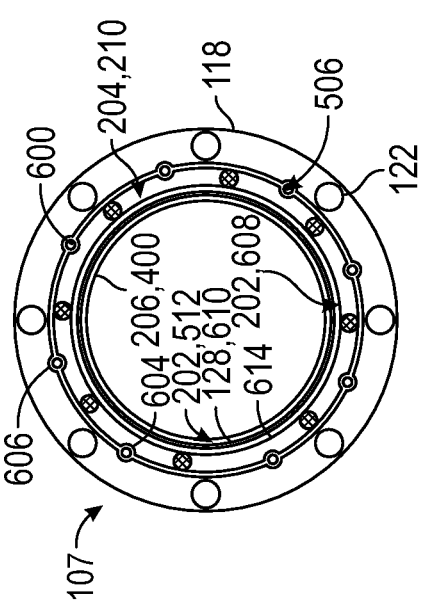
FIG. 6E
FIG. 6F

END FITTINGS FOR FLEXIBLE PIPE SEGMENTS

FIELD

The present disclosure generally pertains to pipe assemblies for flowing a fluid. The pipe assemblies may include one or more pipe segments, such as bonded or unbonded flexible pipe segments. The present disclosure further pertains to end fittings for pipe segments, as well as methods of coupling an end fitting to a pipe segments, and methods of coupling a pipe segment to a fluid flowing system.

BACKGROUND

A pipe assembly may include one or more pipe segments that may be coupled to one another and/or to a counterpart fitting by way of a coupling assembly. The coupling assembly or the pipe segment may be susceptive to wear that can limit the useful life of the pipe segment. The wear may be attributable, for example, to corrosion and/or abrasion from fluids and/or impurities flowing through the pipe segment. It is desirable to increase or prolong the useful of pipe segments, including by reducing wear from fluids and/or impurities flowing through the pipe segments.

SUMMARY

Aspects, features, and advantages of the presently disclosed subject matter are set forth in part in the following description. Further aspects and advantages may be apparent from the description or through practicing the presently disclosed subject matter.

In one aspect, the present disclosure provides end fittings for flexible pipe segments. An end fitting may include an end casing that is permanently couplable to an end of a flexible pipe segment, and a seal housing that is removably couplable to the end casing. The end casing may define a seal housing-receiving bore extending longitudinally through the end casing, and the seal housing may be positioned within the seal housing-receiving bore. The seal housing may define at least one seal bore extending from an axially distal surface of the seal housing.

In another aspect, the present disclosure provides pipe assemblies for flowing a fluid. A pipe assembly may include a pipe segment; and at least one end fitting respectively coupled to an end of the pipe segment. The at least one end fitting may include an end casing coupled to the end of the pipe segment and a seal housing removably coupled to the end casing. The end casing may define a seal housing-receiving bore extending longitudinally through the end casing, and the seal housing may be positioned within the seal housing-receiving bore. The seal housing may define at least one seal bore extending from an axially distal surface of the seal housing, and one or more sealing elements may be seated in a respective one of the at least one seal bore. The respective end fitting may be couplable to a counterpart fitting, and the seal housing and/or the one or more sealing elements may be configured to define a sealing interface with the counterpart fitting.

In some embodiments, the seal housing may include a sleeve portion and a flange portion, and the seal housing may be replaceably coupled to the end casing at least in part by a plurality of seal housing-bolts respectively installed in a corresponding one of a plurality of seal housing-bolt holes extending longitudinally through the flange portion of the replaceable seal housing. In yet another aspect, the present disclosure provides methods of installing a seal housing in an end fitting of a pipe assembly. An example method may include forming a seal housing-receiving bore in an end fitting of a coupling assembly for a pipe segment, with the seal housing-receiving bore extending longitudinally through the end fitting, and installing a seal housing in the seal housing-receiving bore, in which the seal housing defines at least one seal bore extending from an axially distal surface of the seal housing.

These and other aspects, features, and advantages thereof are further understood with reference to the following description, the accompanying drawing figures, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Figure 1B:
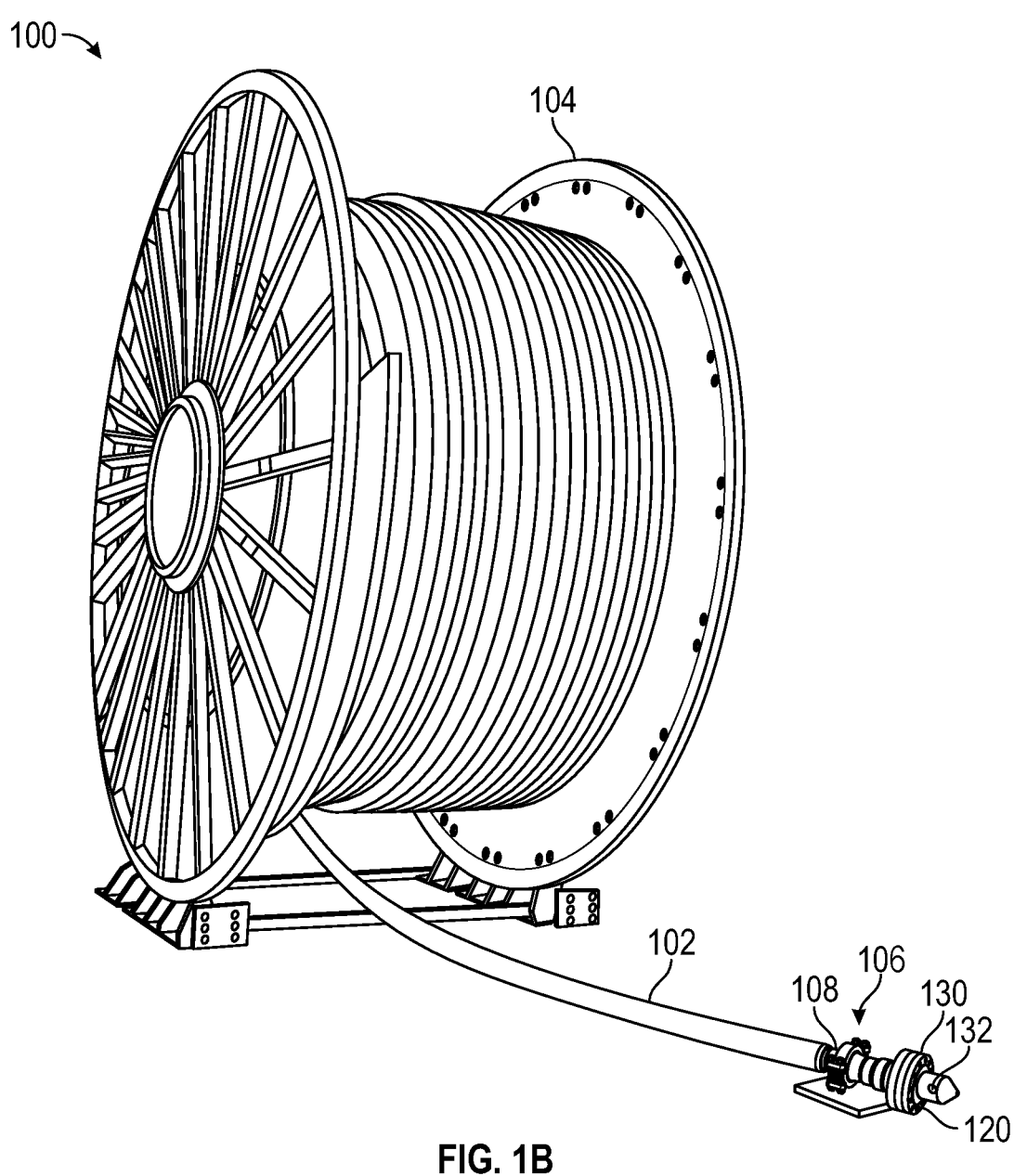
Figure 1C:
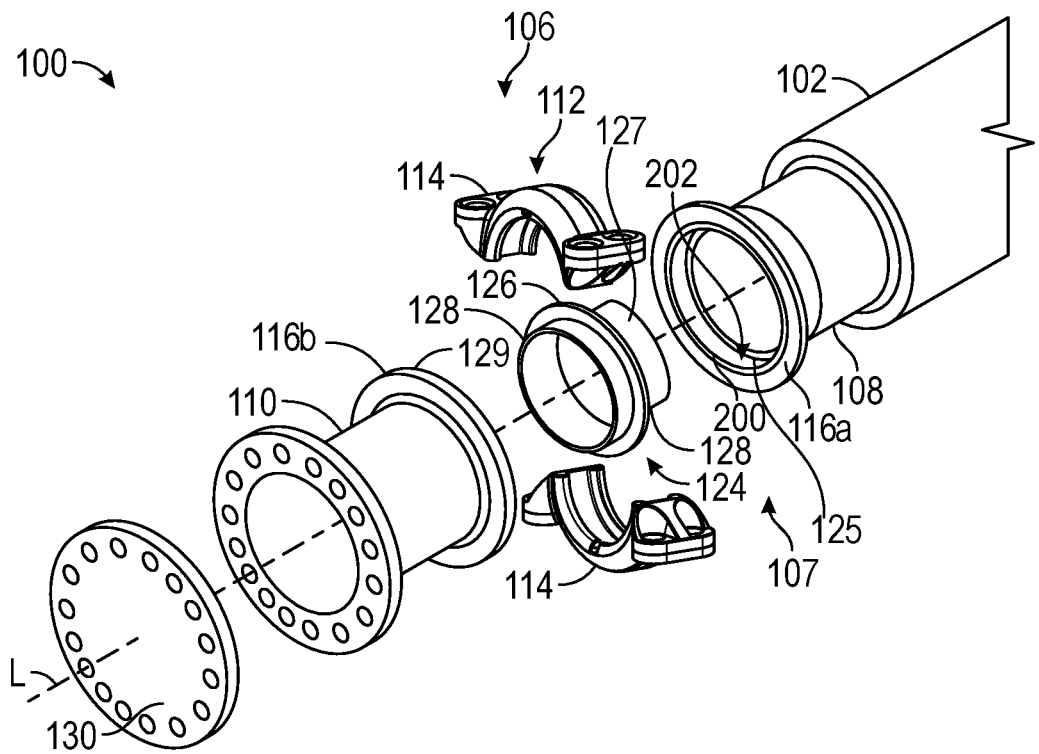
Figure 1D:
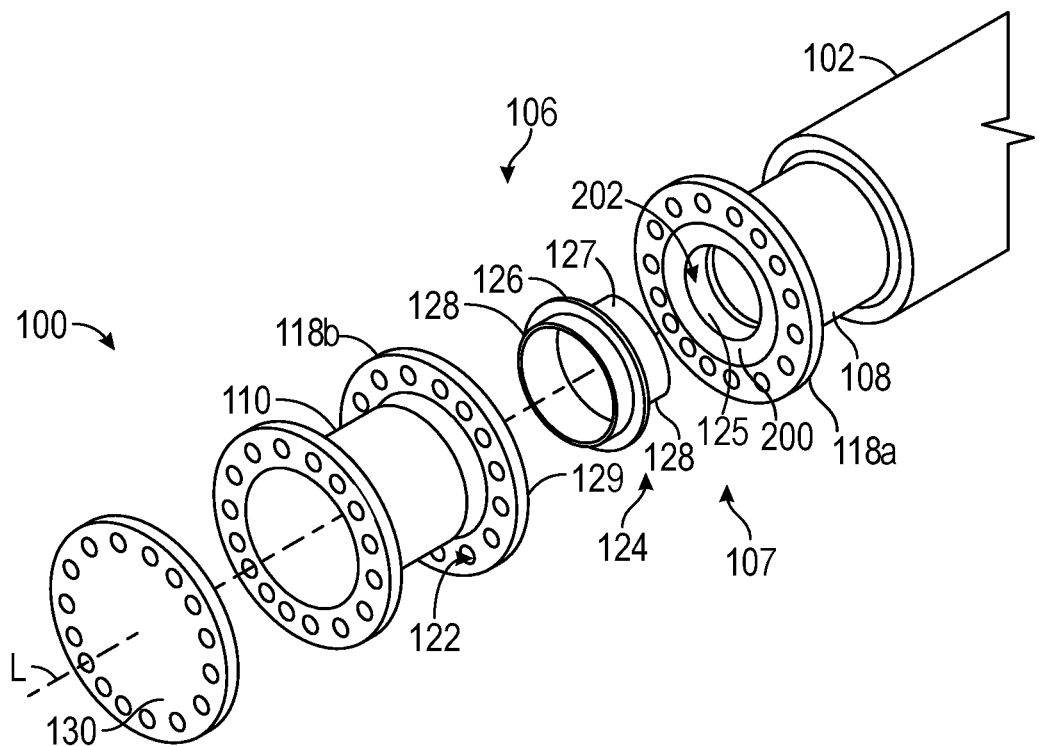
Figure 2A:
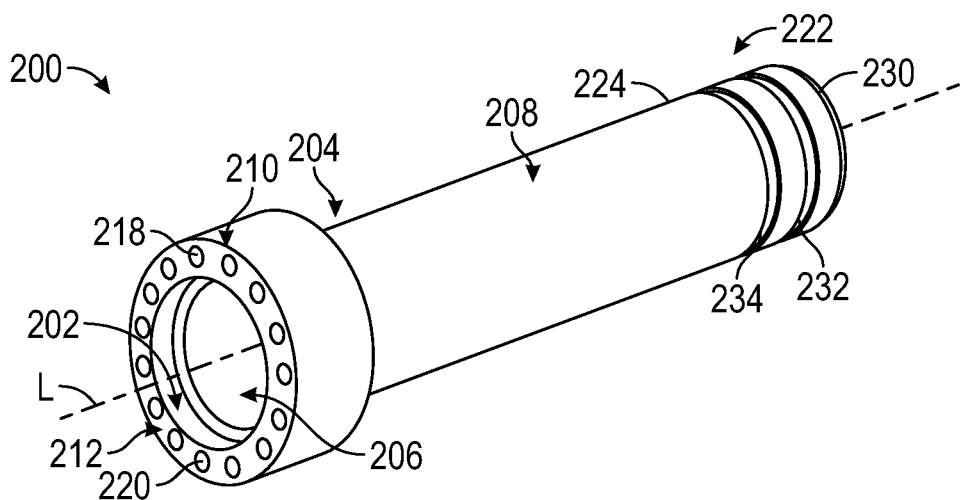
Figure 2B:
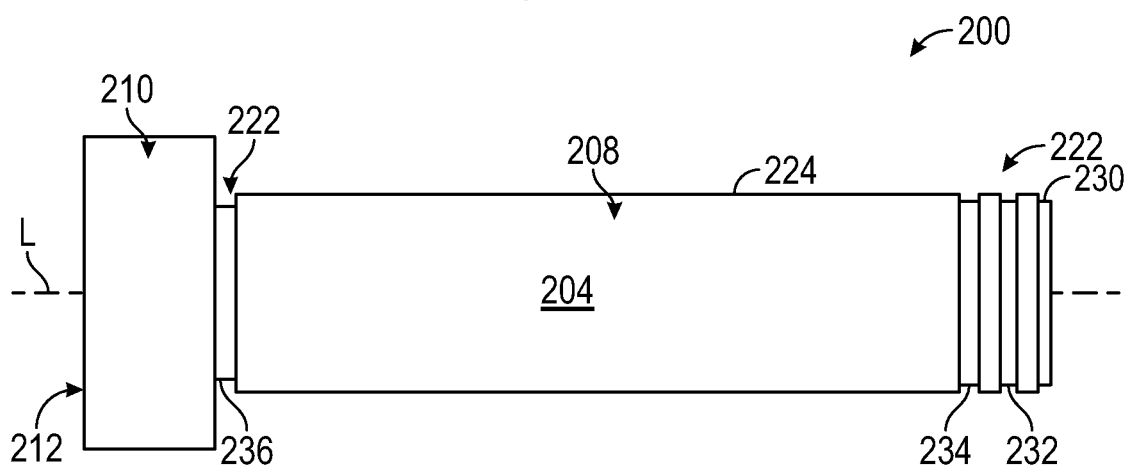
Figure 2C:
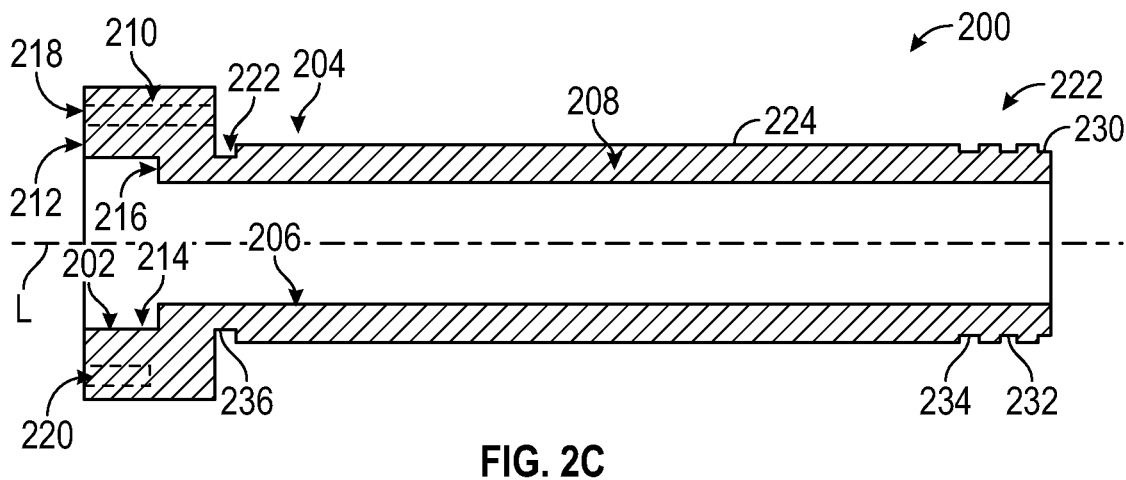
Figure 3A:
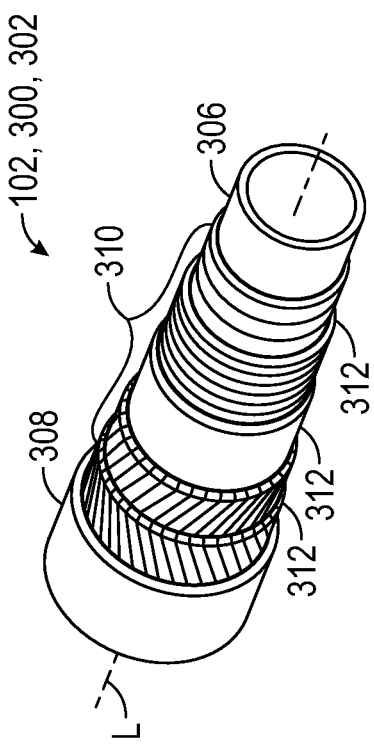
Figure 3B:
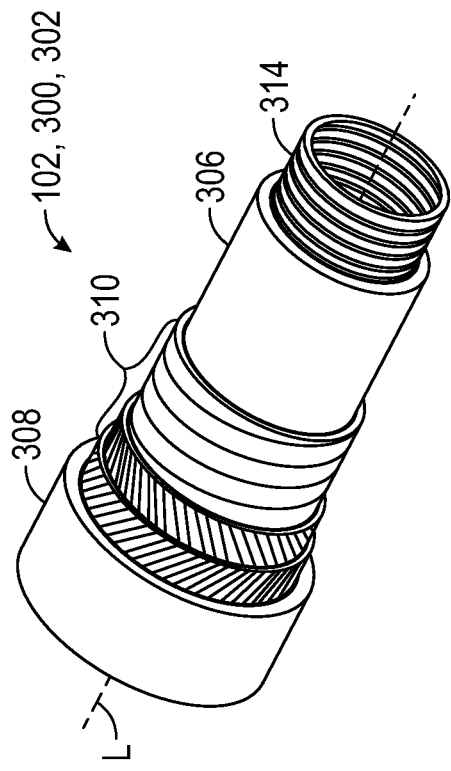
Figure 3C:
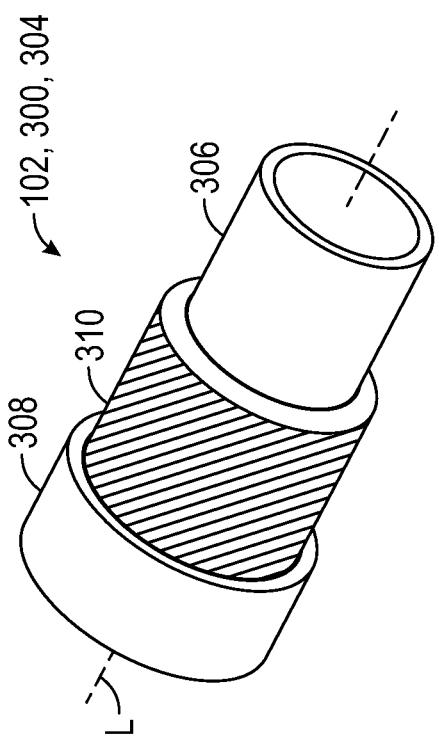
Figure 3D:
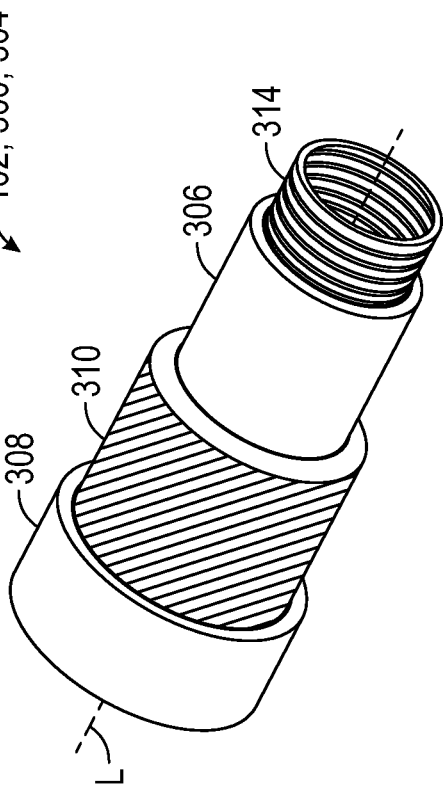
Figure 4B:
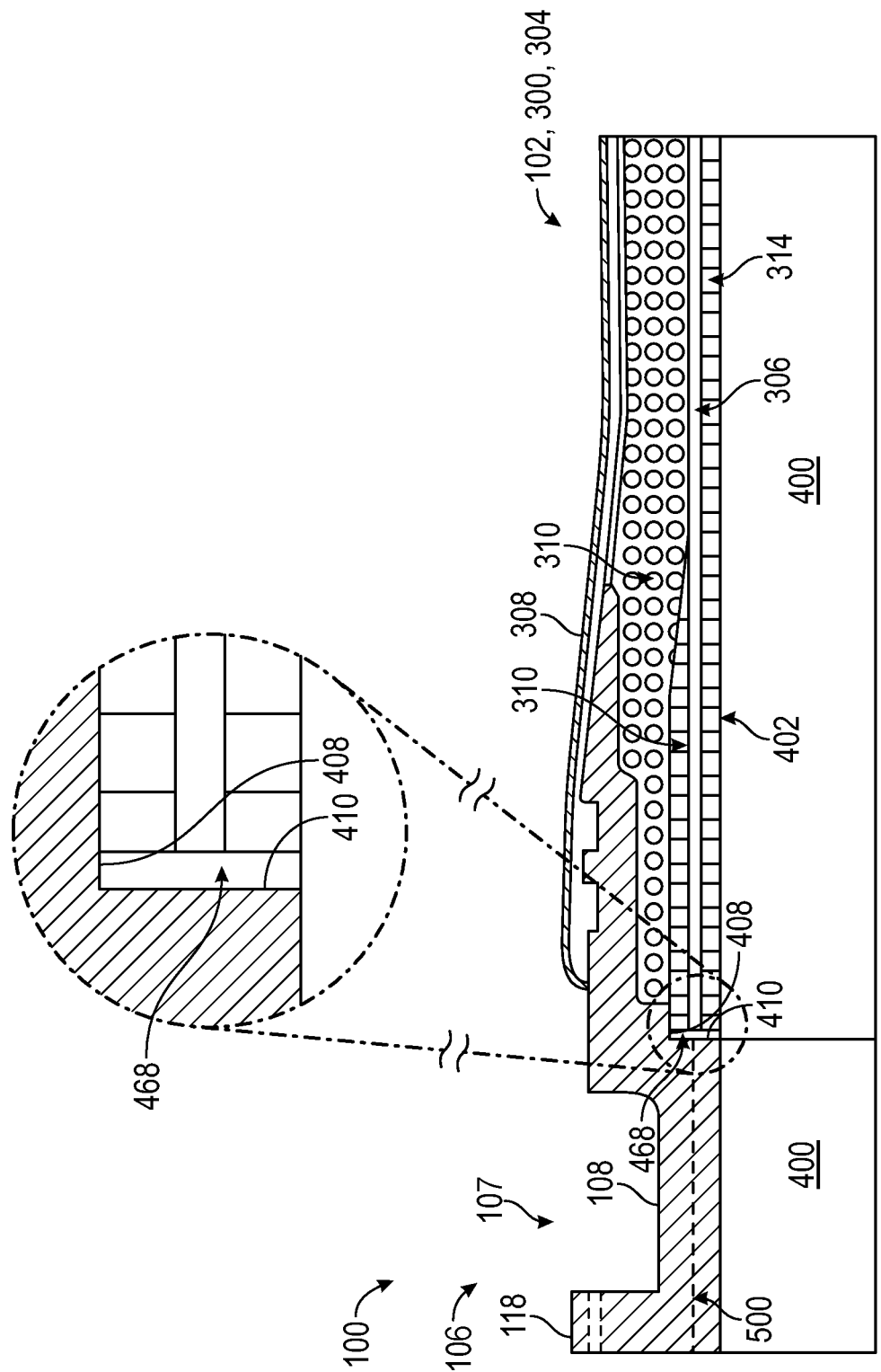
Figure 5A:
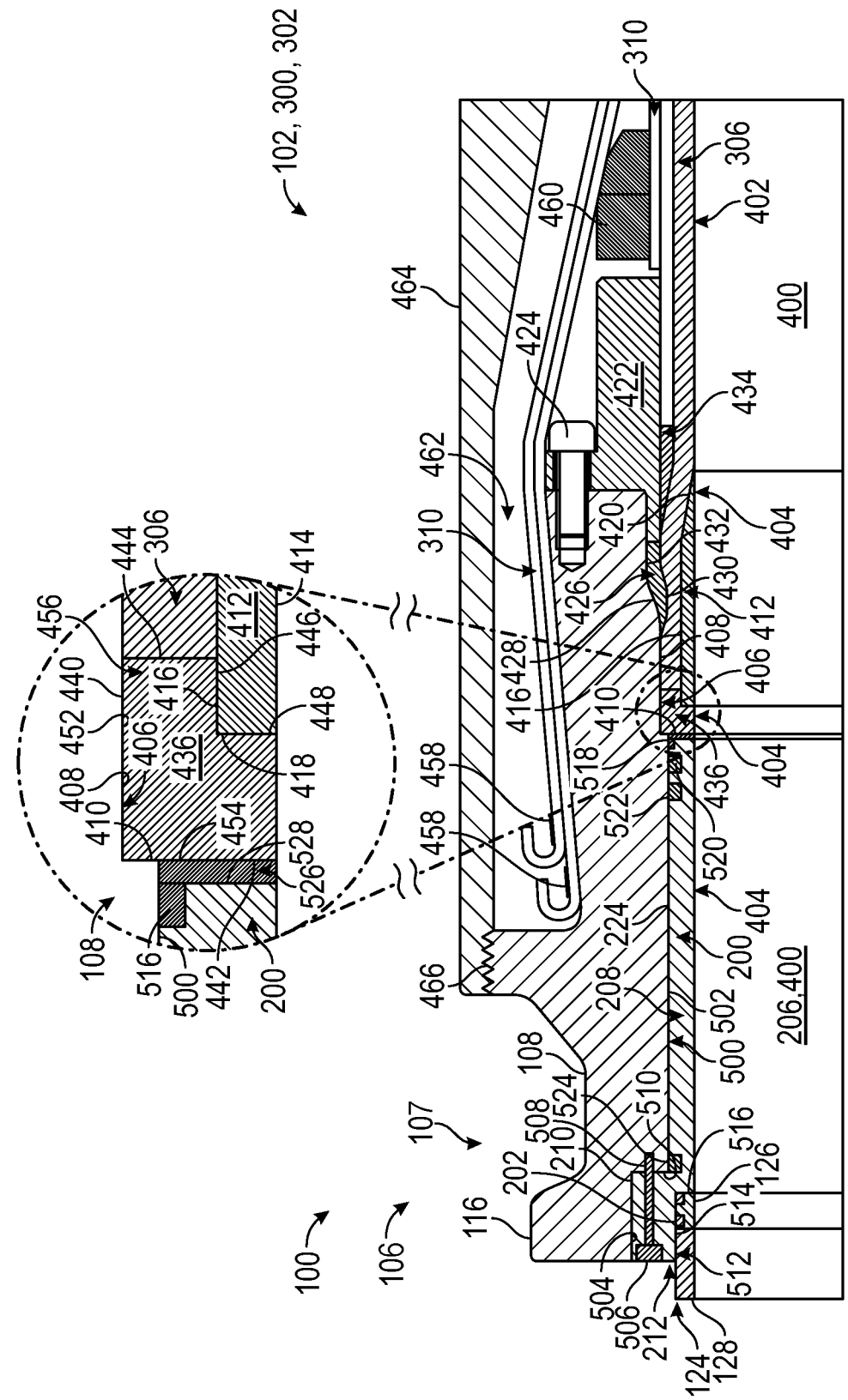
Figure 5B:
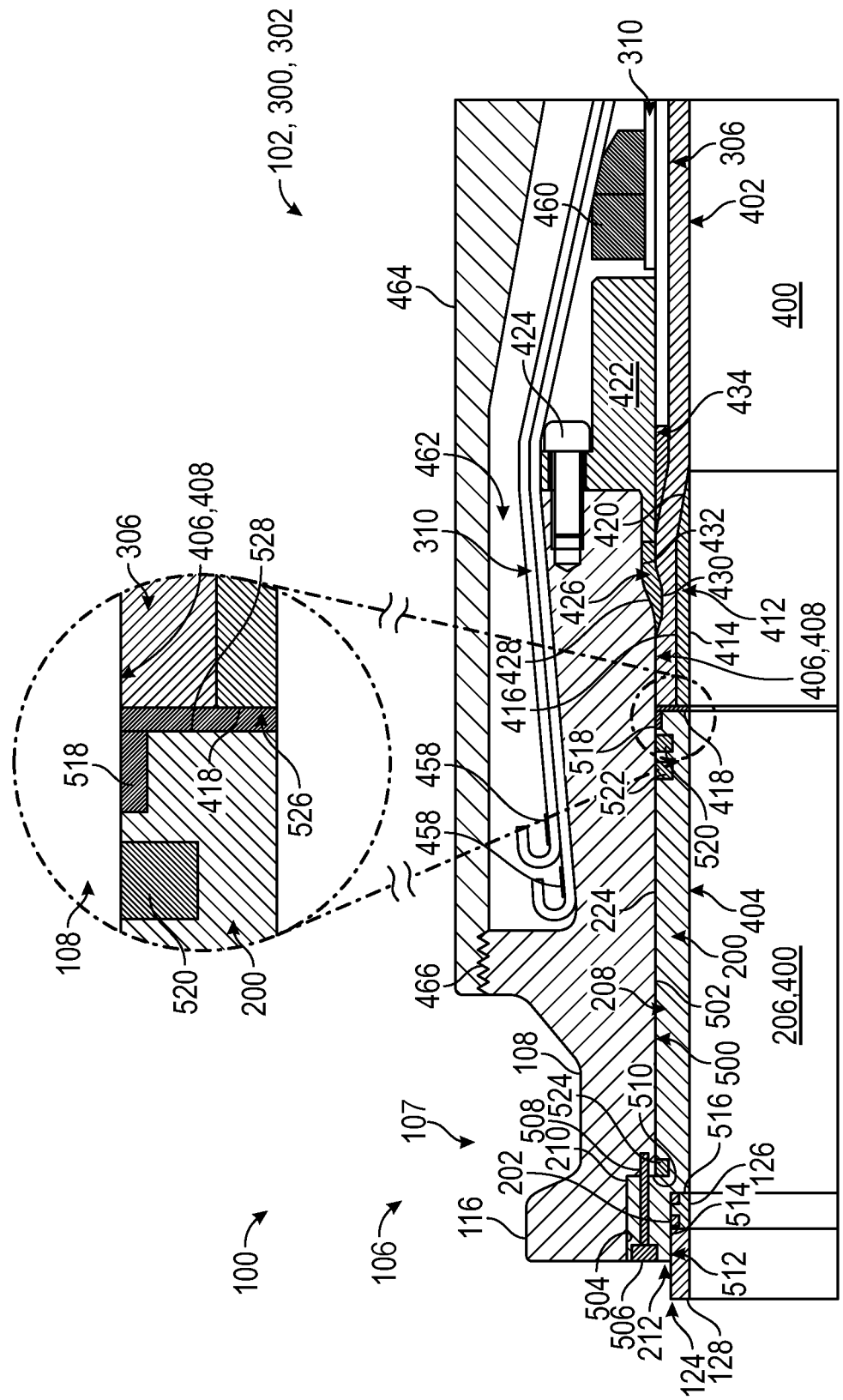
Figure 5C:
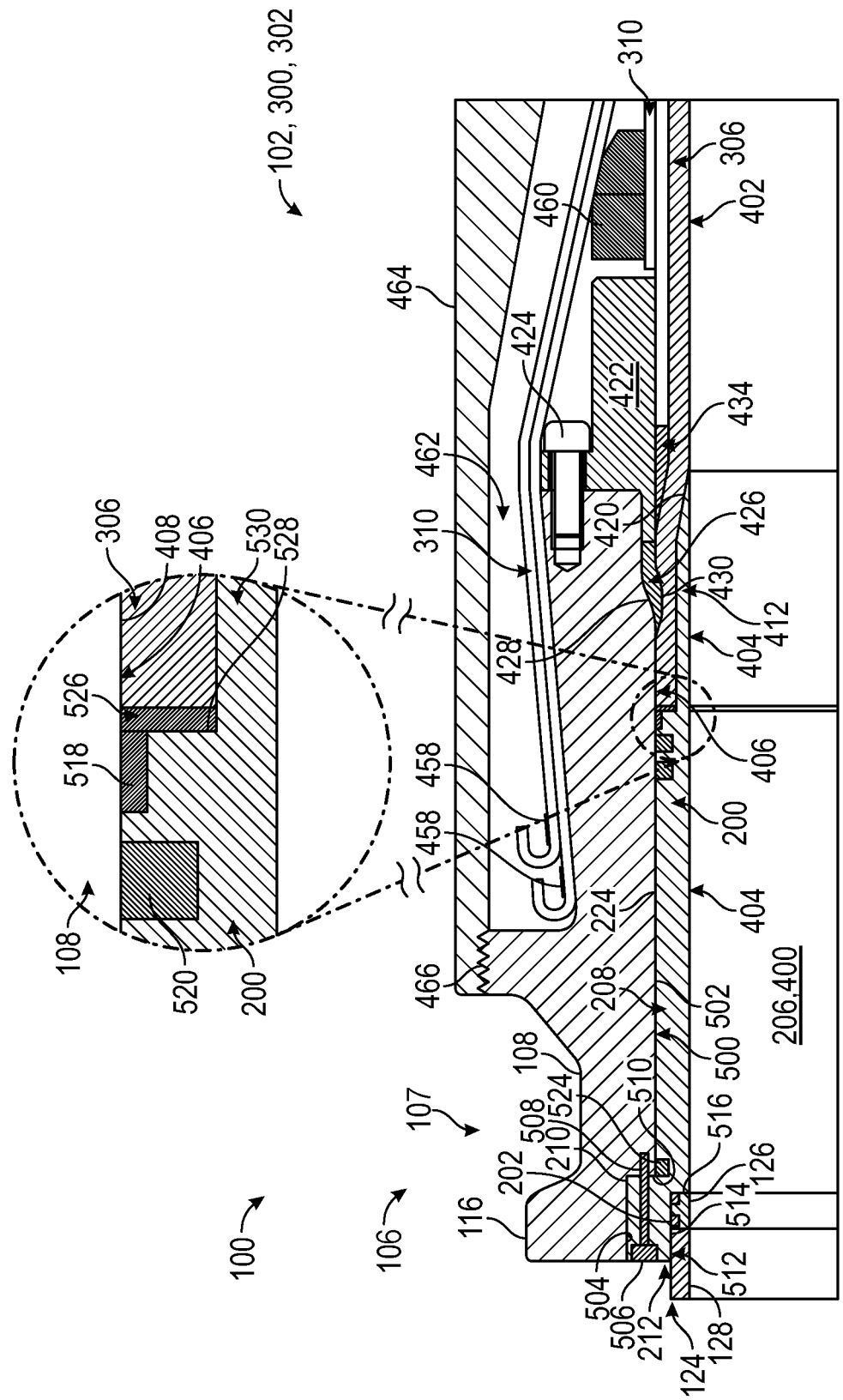
Figure 5D:
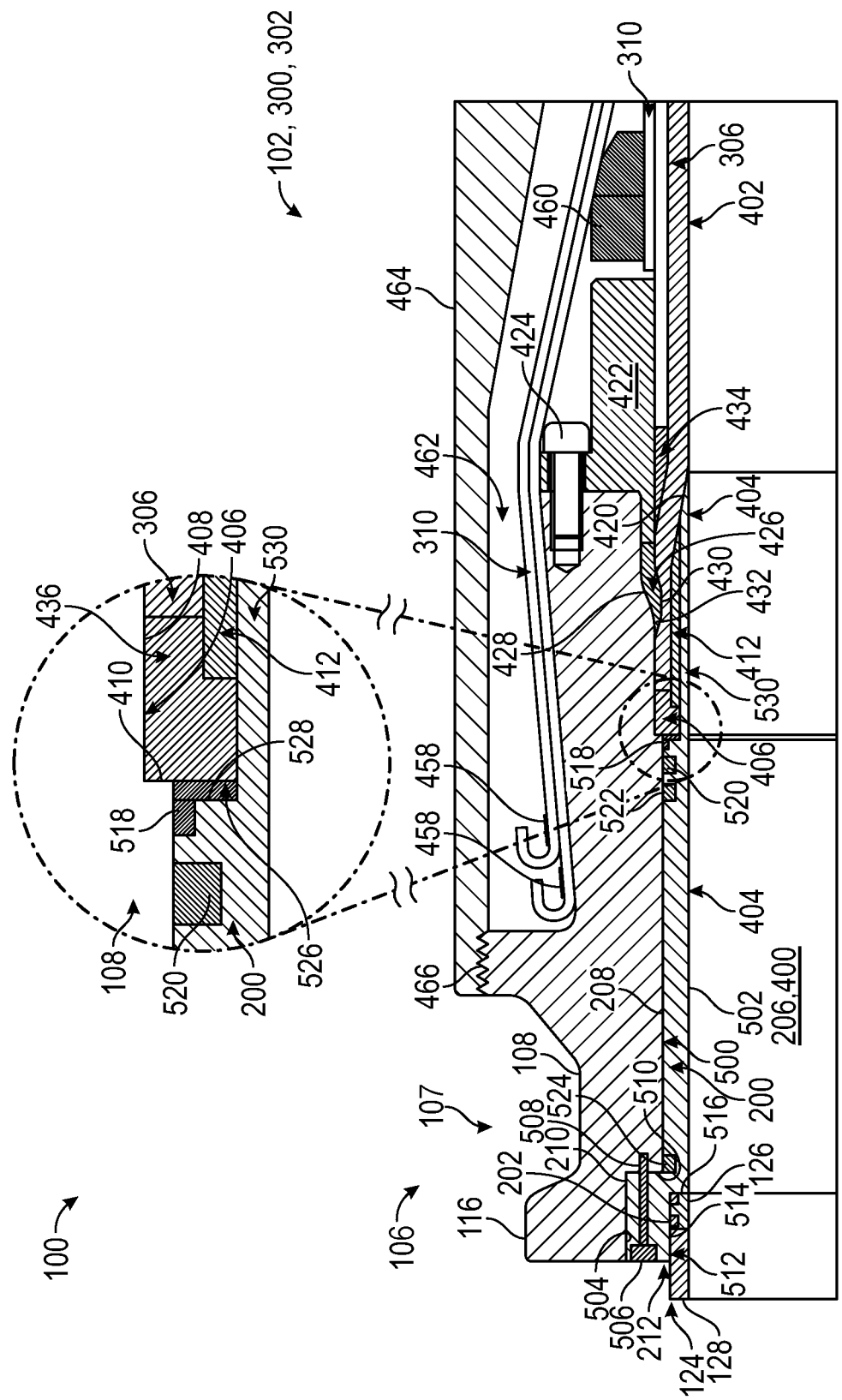
Figure 5E:
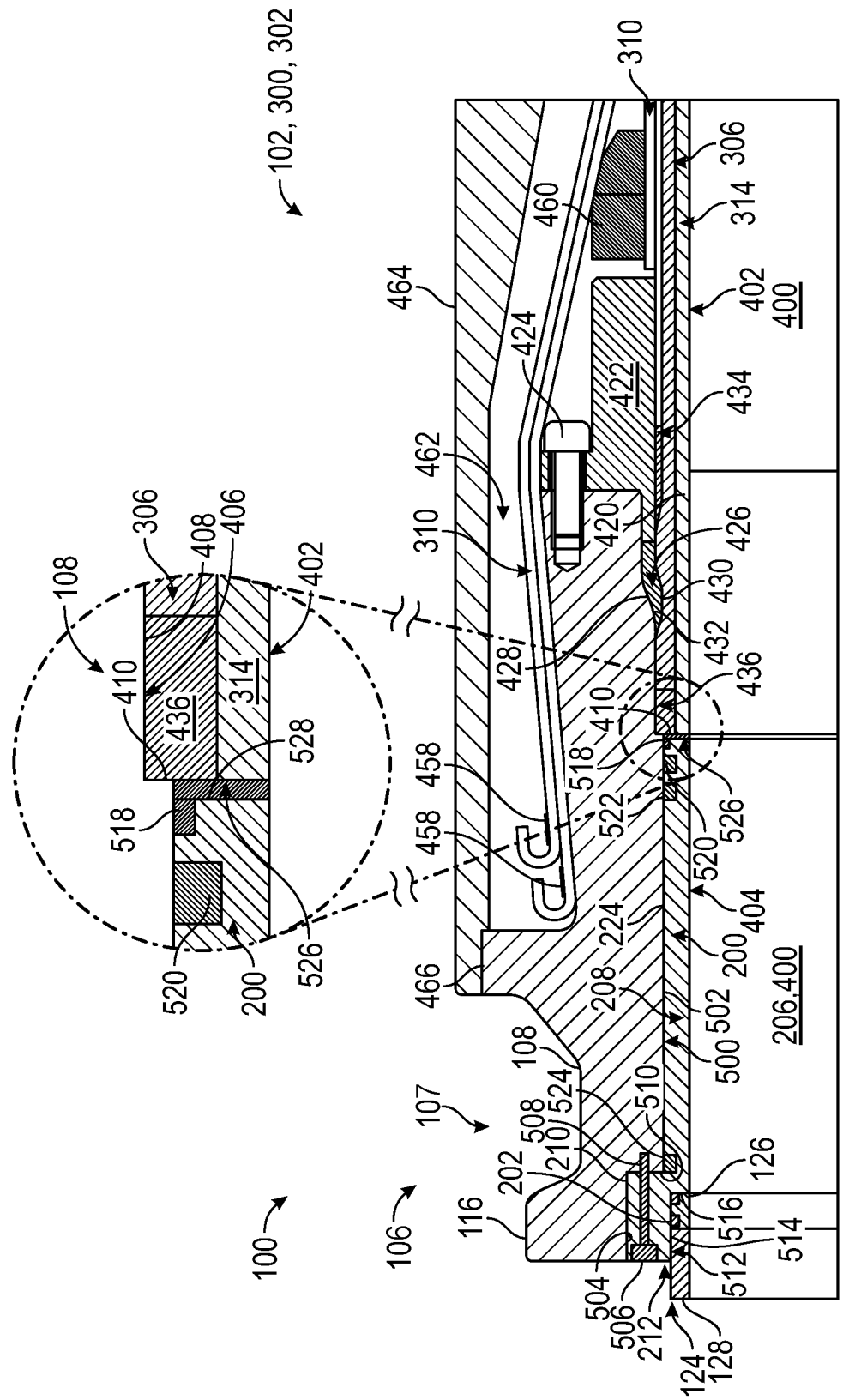
Figure 5F:
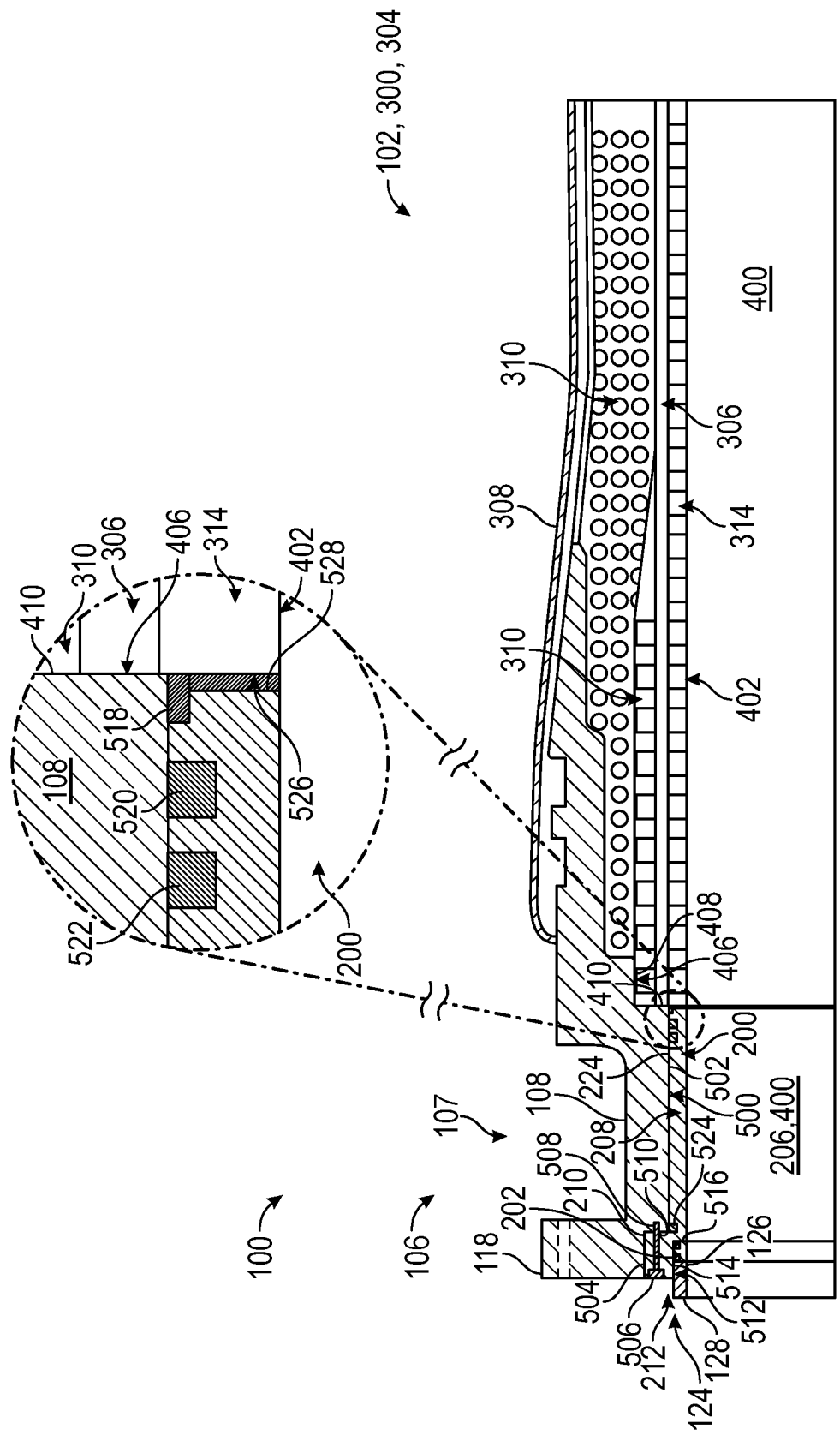
Figure 6A:
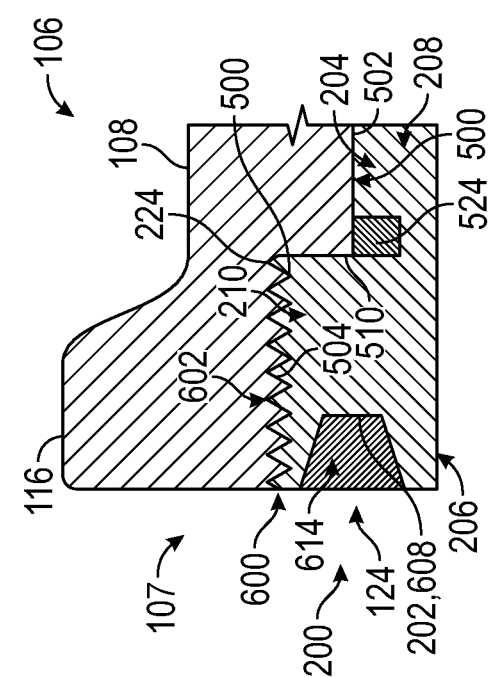
Figure 6C:
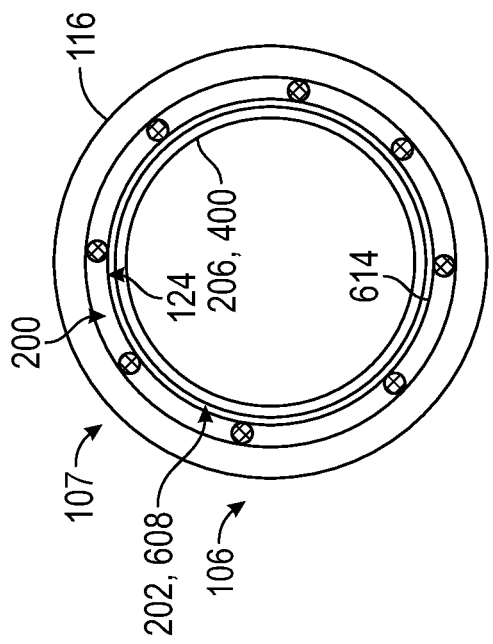
Figure 6B:
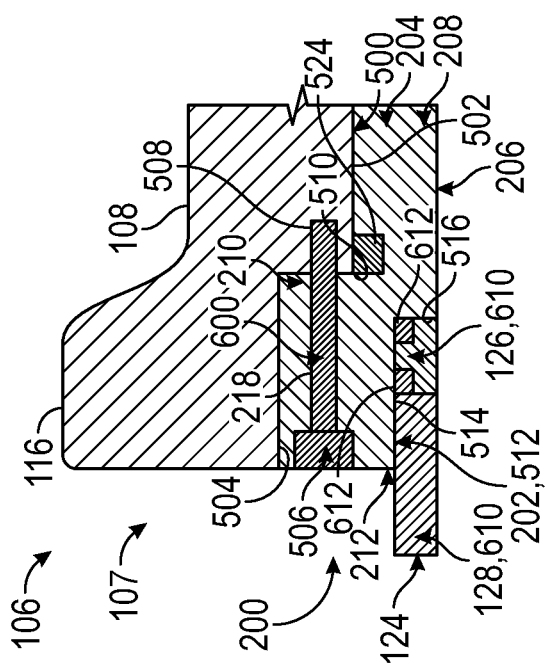
Figure 6D:
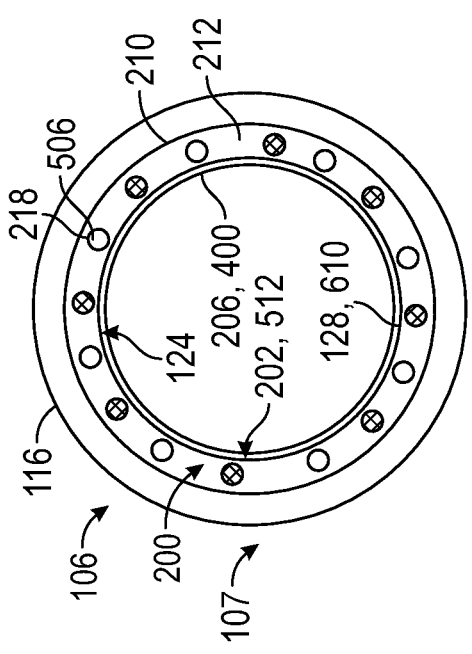
Figure 7A:
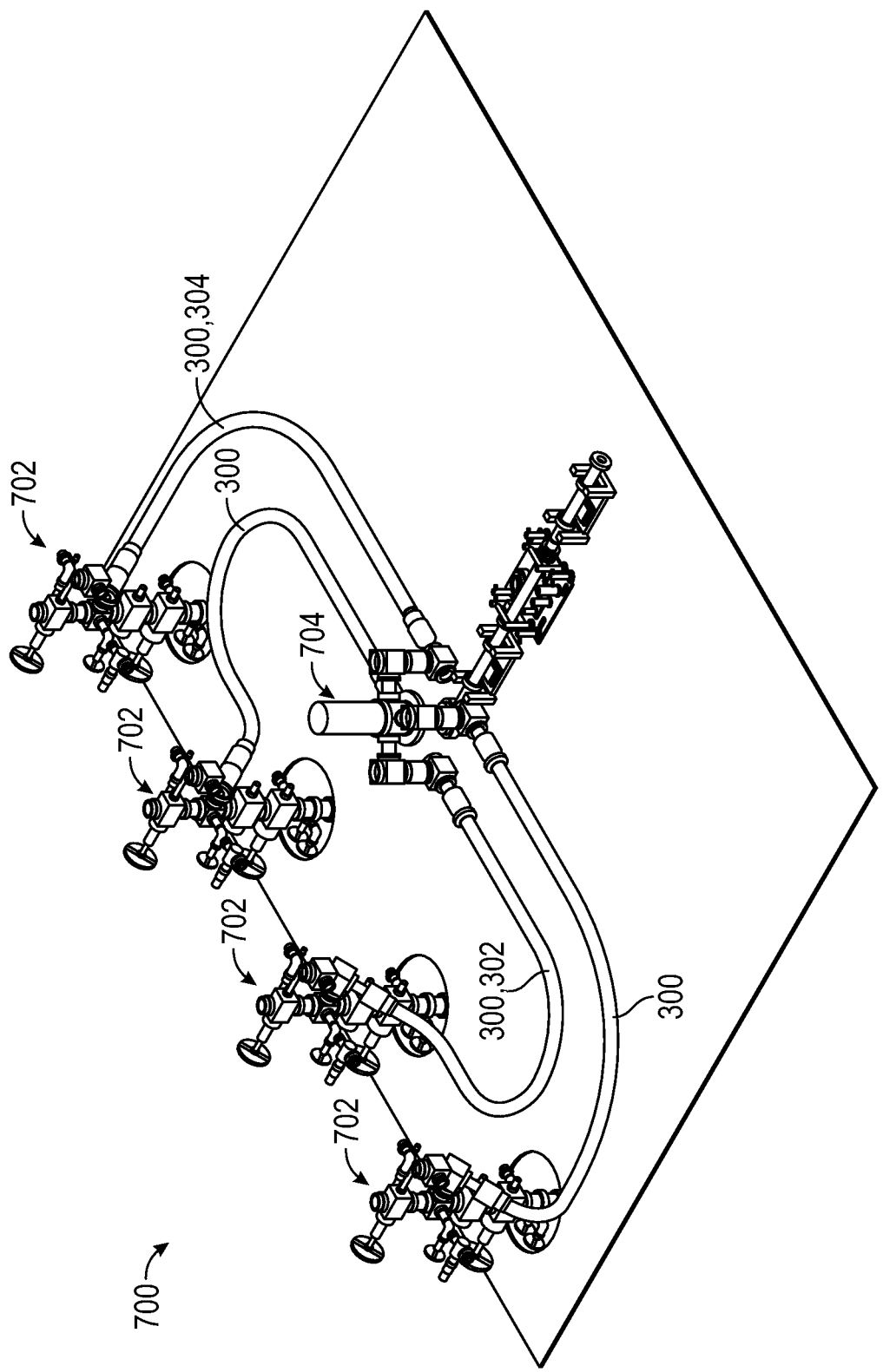
Figure 7B:
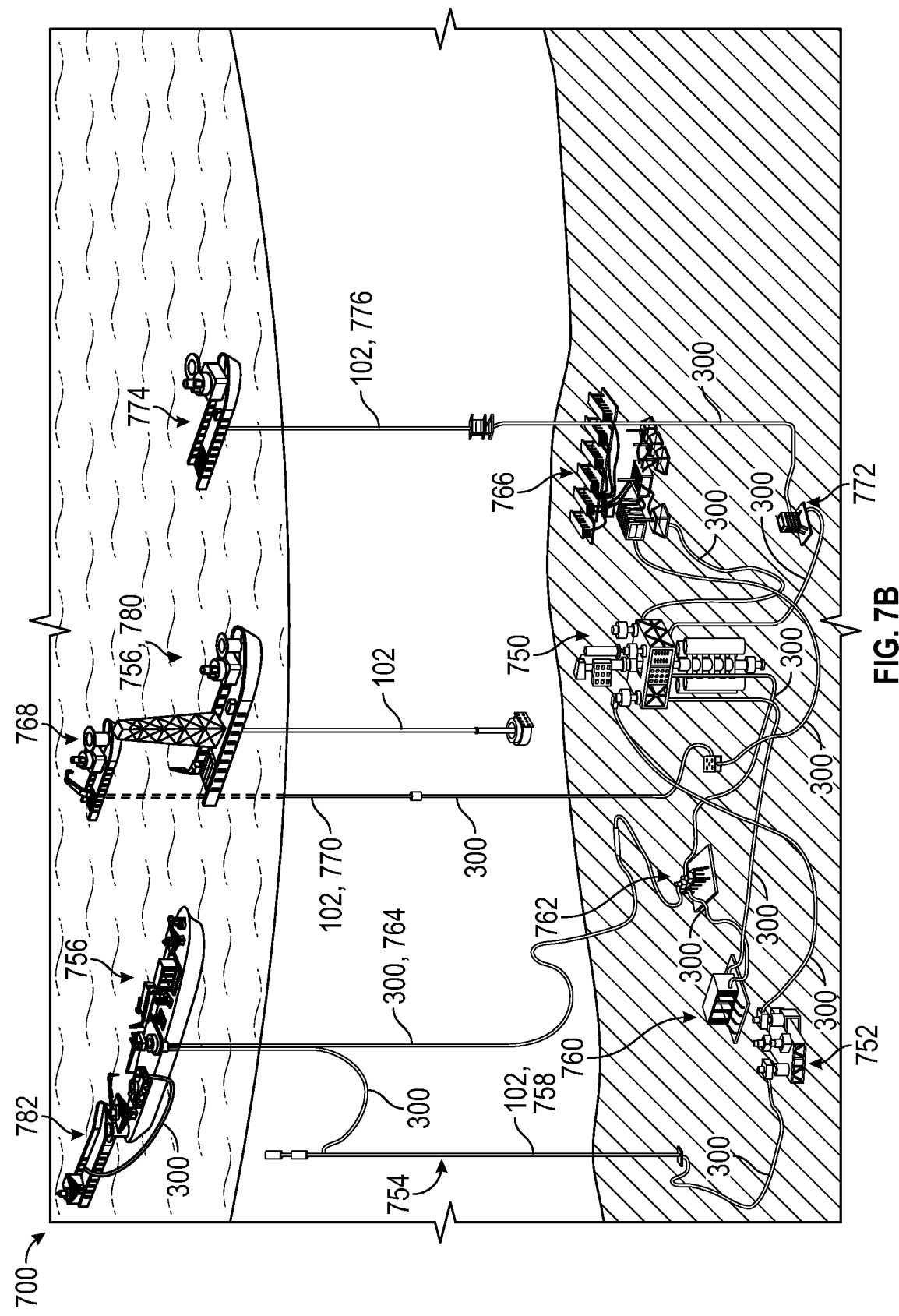
Figure 8:
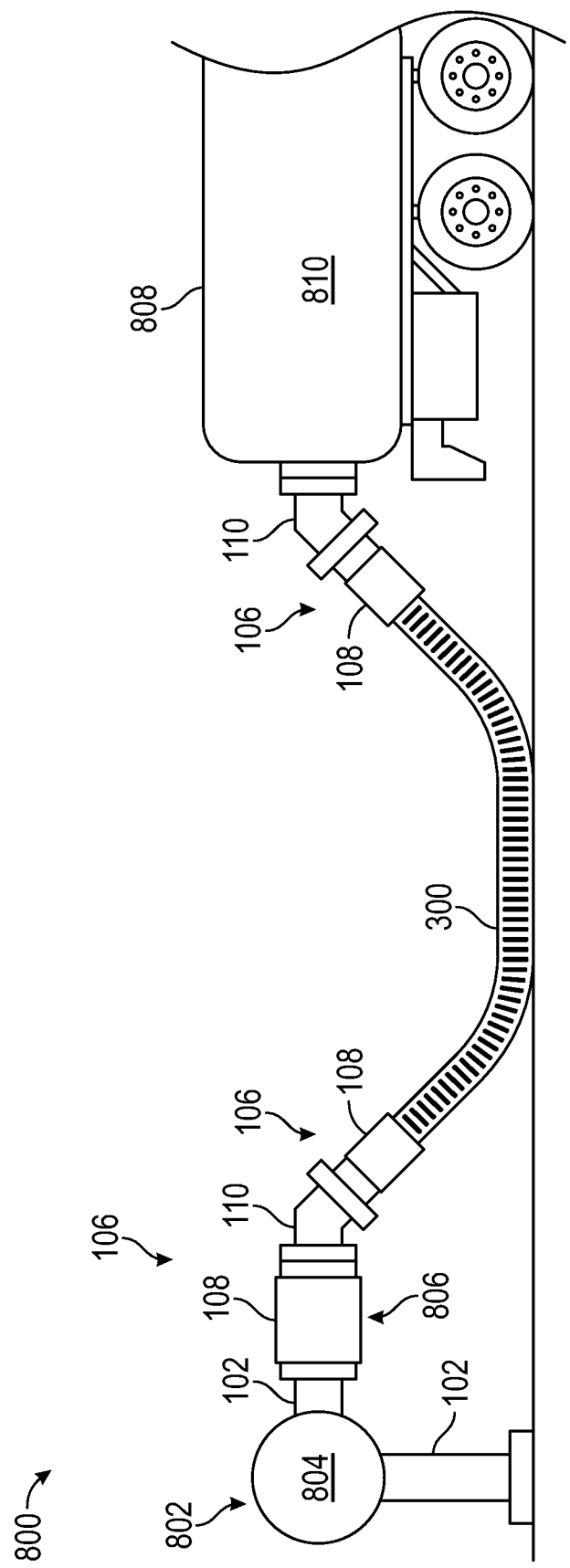
Figure 9:
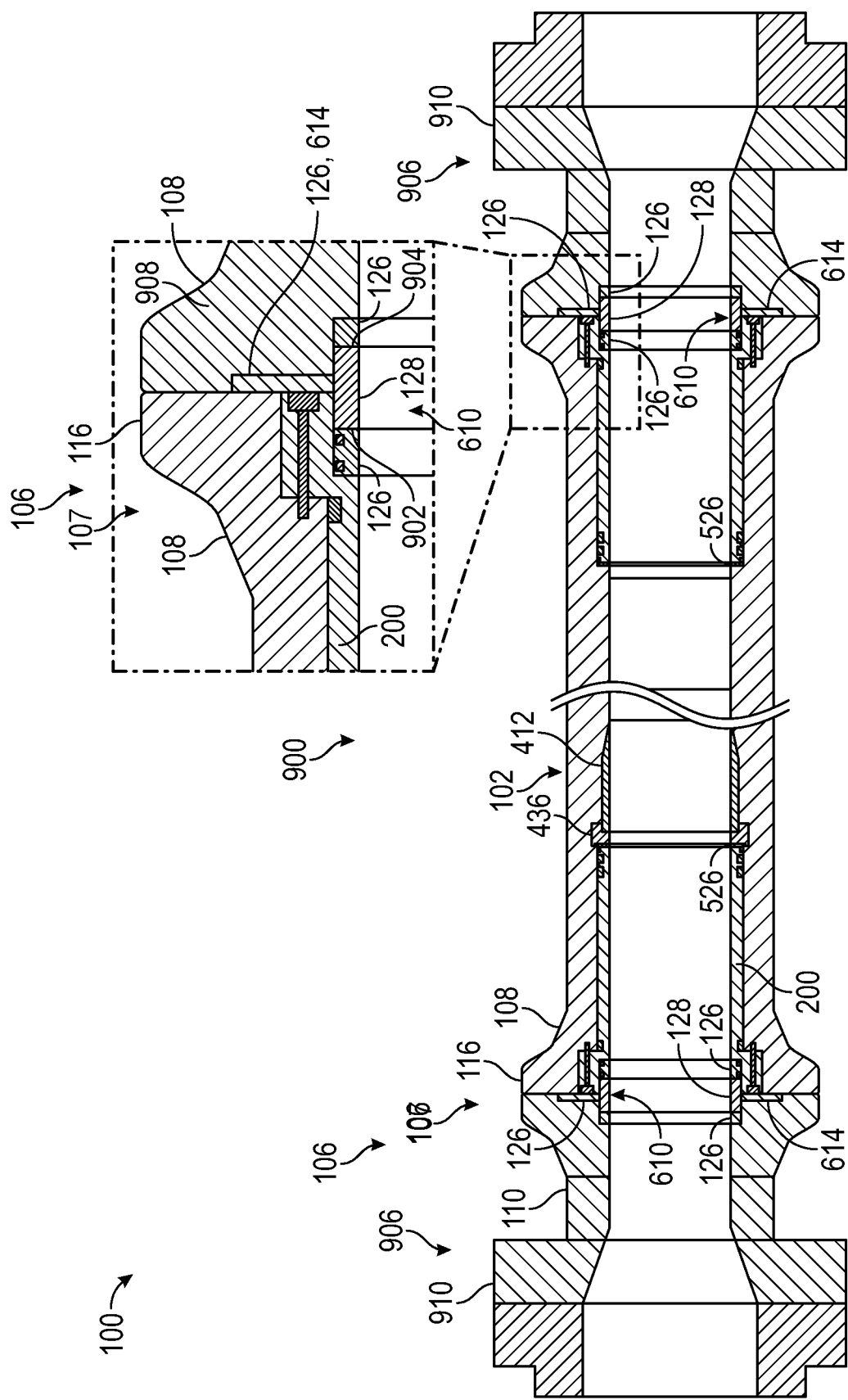
Figure 10A:
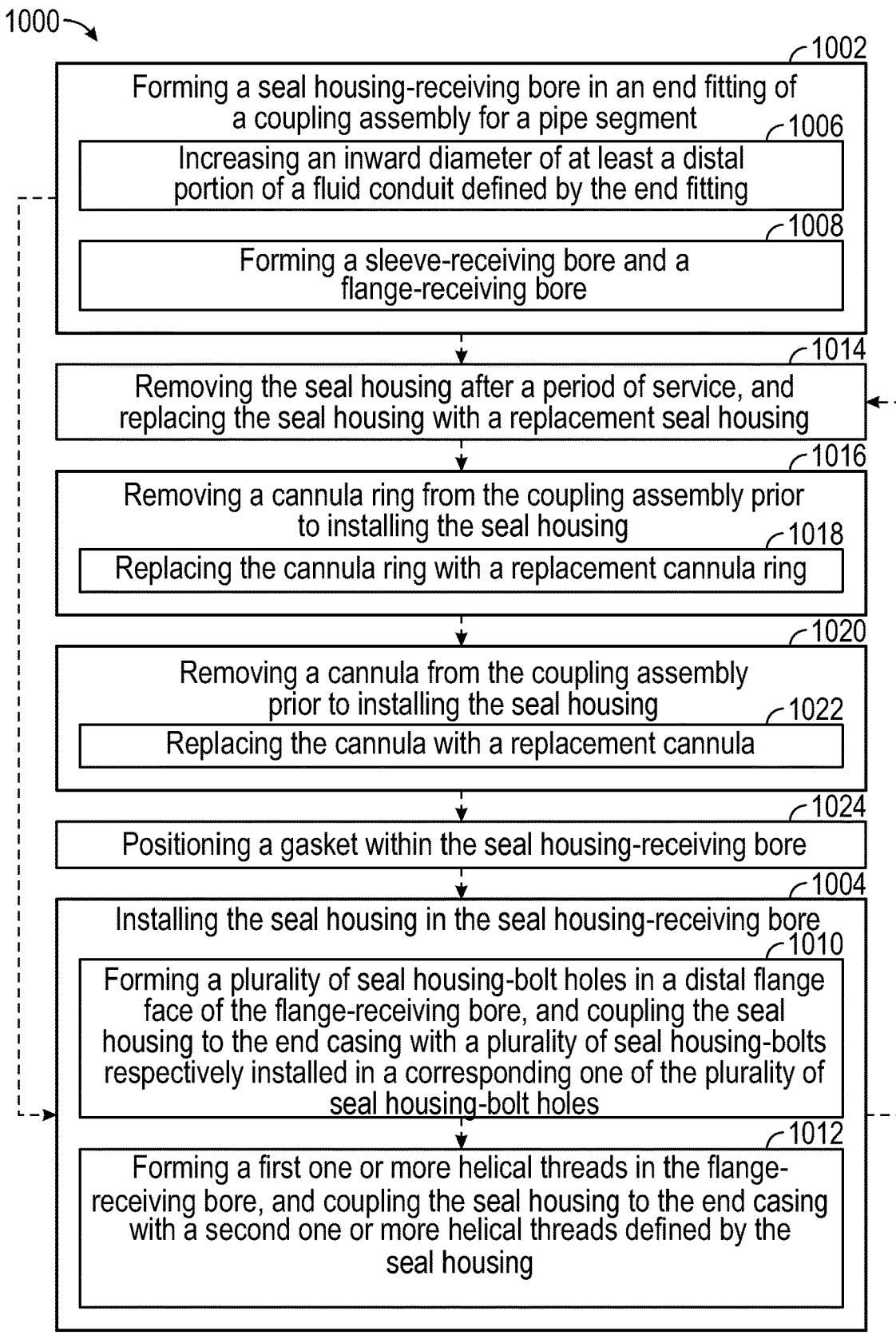
Figure 10B:
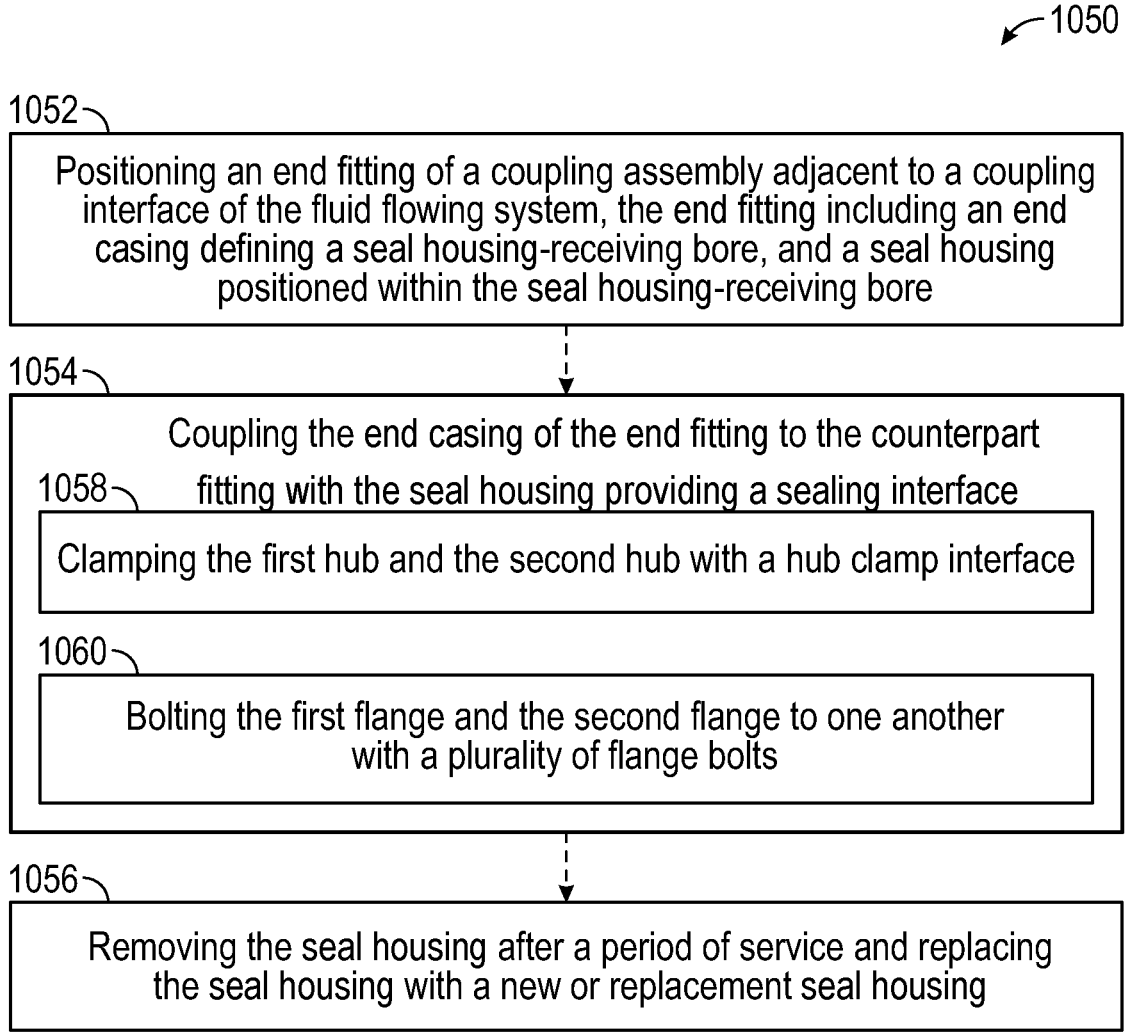

Embodiments of the present are described in detail below with reference to the attached drawing figures, wherein:

FIG. 1A schematically depicts a perspective view of one example of a pipe assembly that includes at least one pipe segment that may be utilized in connection with a fluid flowing system;

FIG. 1B schematically depicts a perspective view of another example of a pipe assembly that includes at least one pipe segment that may be utilized in connection with a fluid flowing system;

FIG. 1C schematically depicts an exploded view of one example of a coupling assembly that includes an end fitting coupled to a pipe segment;

FIG. 1D schematically depicts an exploded view of another example of a coupling assembly that includes an end fitting coupled to a pipe segment;

FIG. 2A schematically depicts a perspective view of one example of a seal housing or removable portion of an end fitting;

FIG. 2B schematically depicts a side view of the seal housing or removable portion of the end fitting shown in FIG. 2A;

FIG. 2C schematically depicts a cross-sectional view of the seal housing or removable portion of the end fitting shown in FIGS. 2A and 2B;

FIG. 3A schematically depicts a perspective cutaway view of one example of an unbonded flexible pipe segment;

FIG. 3B schematically depicts a perspective cutaway view of another example of an unbonded flexible pipe segment;

FIG. 3C schematically depicts a perspective cutaway view of one example of a bonded flexible pipe segment;

FIG. 3D schematically depicts a perspective cutaway view of another example of a bonded flexible pipe segment;

FIG. 4A schematically depicts a partial cross-sectional view of one example of an end fitting permanently coupled to an unbonded flexible pipe segment;

FIG. 4B schematically depicts a partial cross-sectional view of one example of an end fitting permanently coupled to a bonded flexible pipe segment;

FIG. 5A schematically depicts a partial cross-sectional view of one example of a smooth bore, unbonded flexible pipe segment that includes an end fitting with an end casing permanently coupled to an end of the pipe segment and a seal housing removably coupled to the end casing;

FIG. 5B schematically depicts a partial cross-sectional view of another example of a smooth bore, unbonded flexible pipe segment that includes an end fitting with an end casing permanently coupled to an end of the pipe segment and a seal housing removably coupled to the end casing;

FIG. 5C schematically depicts a partial cross-sectional view of yet another example of a smooth bore, unbonded flexible pipe segment that includes an end fitting with an end casing permanently coupled to an end of the pipe segment and a seal housing removably coupled to the end casing;

FIG. 5D schematically depicts a partial cross-sectional view of yet another example of a smooth bore, unbonded flexible pipe segment that includes an end fitting with an end casing permanently coupled to an end of the pipe segment and a seal housing removably coupled to the end casing;

FIG. 5E schematically depicts a partial cross-sectional view of one example of a rough bore, unbonded flexible pipe segment that includes an end fitting with an end casing permanently coupled to an end of the pipe segment and a seal housing removably coupled to the end casing;

FIG. 5F schematically depicts a partial cross-sectional view of one example of a bonded flexible pipe segment that includes an end fitting with an end casing permanently coupled to an end of the pipe segment and a seal housing removably coupled to the end casing;

FIG. 6A schematically depicts a partial cross-sectional view of one example of an end fitting that includes a seal housing removably coupled to an end casing;

FIG. 6B schematically depicts facing view of the end fitting shown in FIG. 6A;

FIG. 6C schematically depicts a partial cross-sectional view of another example of an end fitting that includes a seal housing removably coupled to an end casing;

FIG. 6D schematically depicts facing view of the end fitting shown in FIG. 6C;

FIG. 6E schematically depicts a partial cross-sectional view of yet another example of an end fitting that includes a seal housing removably coupled to an end casing;

FIG. 6F schematically depicts facing view of the end fitting shown in FIG. 6E;

FIG. 6G schematically depicts a partial cross-sectional view of yet another example of an end fitting that includes a seal housing removably coupled to an end casing;

FIG. 6H schematically depicts facing view of the end fitting shown in FIG. 6G;

FIG. 7A schematically depicts a perspective view of one example of a fluid flowing system in connection with a petroleum extraction station;

FIG. 7B schematically depicts a perspective view of another example of a fluid flowing system in connection with a petroleum extraction station;

FIG. 8 schematically depicts a side view of one example of a fluid flowing system in connection with a fluid transfer station;

FIG. 9 schematically depicts a cross-sectional view of one example of a pipe assembly that may be utilized in connection with a fluid flowing system;

FIG. 10A shows a flowchart depicting one example of a method of installing a seal housing in an end casing; and FIG. 10B shows a flowchart depicting one example of a method of coupling a pipe assembly to a fluid flowing system.

The drawing figures illustrate example embodiments of the presently disclosed subject matter. The claims are not limited to the example embodiments depicted in the drawing figures. The aspects and features depicted in the drawing figures are not necessarily to scale. Repeat use of reference characters in the specification and drawing figures represent the same or analogous aspects or features.

DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed subject matter. The present disclosure is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the example embodiments in this description.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, or joined with one another, including by way of one or more fastening elements or hardware, an interference fit, a shrink fit, by crimping, by an adhesive, by bonding, by molding, by welding, or the like. The term "coupled" includes objects that are removably coupled with one another as well as objects that are permanently coupled to one another.

The term "removably coupled," when used herein with reference to at least two objects, indicates that the objects are configured to be decoupled from one another as an intended feature of the manner in which the objects are coupled to one another. Under normal circumstances, removably coupled objects can be decoupled from one another without causing damage or destruction to the respective objects. By way of example, and without limitation, at least two objects may be removably coupled to one another by one or more fastening elements or hardware, an interference fit, a shrink fit, or the like, as well as combinations of these.

The term "permanently coupled," when used herein with reference to at least two objects, indicates that the objects are configured to remain coupled to the second object indefinitely as an intended feature of the manner in which the objects are coupled to one another. Separation of permanently coupled objects normally causes damage or destruction to at least one of the objects or to the means used to couple the objects to one another. By way of example, and without limitation, at least two objects may be permanently coupled to one another by crimping, by an adhesive, by bonding, by molding, by welding, or the like, as well as combinations of these.

The term "integral" or "integrally formed," when used herein with reference to at least to elements, refers to two elements that respectively define a portion, part, or piece of one and the same object. The term "integral" includes a portion, part, or piece of an element that cannot be separated from the whole of the element without destructive means. For example, the term "integral" may refer to objects that are formed or cast as a single unit, as well as portions, parts, or pieces of a single, monolithic object.

The present disclosure is generally directed to pipe assemblies for flowing a fluid, such as a fluid associated with a petroleum extraction station or a fluid transfer station. The pipe assemblies may include one or more pipe segments that may be coupled to one another and/or to a counterpart fitting of a fluid flowing system by way of a coupling assembly. The coupling assembly may include an end fitting that has a fixed portion and a removable portion that work in cooperation with one another to fluidically seal a fluid plenum and/or flow path defined by the coupling assembly. The fixed portion of the end fitting is referred to herein as an "end casing." The removable portion of the end fitting is referred to herein as a "seal housing." The end casing may be coupled, such as permanently coupled, to the pipe segment, and the seal housing may be removably coupled to the end casing. The end casing may provide the coupling function of the coupling assembly, while the seal housing may provide the sealing function of the coupling assembly.

The end casing may define a seal housing-receiving bore, and the seal housing may be positioned within the seal housing-receiving bore of the end casing. The seal housing (e.g., the removable portion of the end fitting) may include one or more sealing interfaces that interact with adjacent componentry to fluidically seal the fluid plenum and/or flow path defined by the coupling assembly. The end casing (e.g., the fixed portion of the end fitting) may be configured to secure the end fitting to the counterpart fitting. The end casing may impart a force upon the sealing interfaces provided by the seal housing, yet in some embodiments, the fluid plenum and/or flow path defined by the coupling assembly may be fluidically sealed entirely by one or more sealing interfaces defined by the seal housing.

The removability of the seal housing may prolong the useful life of the pipe segment and/or the end fitting coupled to the pipe segment, as the seal housing may be replaced in the event of damage or deterioration without removing the fixed portion of the end fitting from the pipe segment. For example, some fluids that are transported by a fluid flowing system may include materials that can interact with various components of a coupling assembly, causing them to deteriorate over time. Some fluids may include chemical groups that can react with a material used to form the various components of a coupling assembly over time. Petroleum-based fluids may include impurities or chemical groups that are corrosive or reactive, such as chlorides, carbon dioxide, organic acids, sulfur-based compounds, salts, and so forth. Additionally, or in the alternative, petroleum-based fluids may include abrasive materials, such as sand, precipitates, drilling mud, corrosion byproducts, and so forth. Further, some fluid flowing systems may flow fluids that are inherently corrosive or abrasive in addition or in the alternative to impurities within the fluid. Though an end casing may be permanently coupled to a pipe segment, a seal housing that has sustained damage or deterioration from such fluids can be decoupled from the end casing and replaced with a new seal housing, thereby extending the useful life of the end fitting.

Flexible pipe segments that are commonly used with petroleum-based fluids may include an internal sheath formed of a polymeric material or other material that has general compatibility with the fluid transported by the pipe segments. End fittings and other components of coupling assemblies that are commonly used with petroleum-based fluids, however, tend to have a material composition that includes a metal alloy, which can be particularly susceptible to corrosion and/or abrasion. Replacing these end fittings and/or other components of a coupling assembly can be labor intensive and/or cost prohibitive. Additionally, some flexible pipe segments, such as bonded flexible pipe segments, may include an end fitting and/or other components that are permanently coupled to the flexible pipe segment, such as by bonding and/or crimping the end casing to the flexible pipe segment. Replacing an end fitting that is permanently coupled to a flexible pipe segment may require cutting, and consequently shortening the flexible pipe segment, which may be labor intensive and/or cost prohibitive, and which may reduce the usefulness of the resultingly shortened pipe segment.

A polymeric liner may be installed within an end casing, such as by way of an adhesive, to protect the end casing from corrosive and/or abrasive materials. However, such polymeric liners are susceptive to deadhesion and other damage. For example, petroleum-based fluids may include gases that may permeate through the liner and/or between the liner and the end casing, which may cause blistering and/or deadhesion of at least a portion of the liner. Additionally, or in the alternative, such polymeric liners may decrease the inner diameter of the fluid conduit, resulting in an increase in fluid velocity and/or a decrease in fluid pressure. The increase in fluid velocity may cause increased turbulence, which may lead to general or local fluid processing disturbances, such as localized wear, cavitation, increased friction, and so forth. The decrease in fluid conduit diameter associated with a polymeric liner may cause a dynamic pressure loss coefficient that may have a significant cumulative effect together with other sources of pressure loss throughout the fluid flowing system.

Advantageously, the present disclosure provides end fittings that include a fixed portion and a removable portion. The fixed portion, or end casing, may be permanently coupled to a pipe segment. The removable portion, or seal housing, may be removably coupled to the end casing. The seal housing may be positioned within a seal housing-receiving bore defined by the end casing and removably coupled to the end casing by one or more coupling elements, such as seal housing bolts extending through a flange of the seal housing, a threaded interface between the seal housing and the seal housing-receiving bore, and/or an interference fit between the seal housing and the seal housing-receiving bore. The presently disclosed seal housings may define a sealing interface between the seal housing and a counterpart fitting, and/or between the seal housing and a seal assembly disposed between the seal housing and the counterpart fitting. The seal housing may include at least one seal bore extending from an axially distal surface of the seal housing. One or more seal elements may be seated the seal bore, such that a sealing interface may be defined between the seal housing and the counterpart fitting at least in part by the one or more seal elements. In some embodiments, the sealing interface may advantageously hold the seal housing and/or the one or more sealing elements in position. For example, the sealing interface may reinforce the coupling between the seal housing and the end casing, and/or the coupling between the end casing and the counterpart fitting. The counterpart fitting to which the end casing is coupled may include a component of a fluid flowing system and/or another pipe segment.

The presently disclosed seal housings are replaceable, such as in the form of a sacrificial component, without requiring replacement or removal of the end casing. The seal housings may be formed of a material that has general compatibility with the fluid transported by the pipe segments. The seal housings may have an inward diameter that matches an inward diameter of an adjacent pipe segment, thereby avoiding increases in fluid velocity, decreases in fluid pressure, and/or other adverse effects that may be associated with polymeric liners. Thus, in embodiments the internal inward diameter of the seal housings is generally the same as an inward diameter of the adjacent pipe segment, such that pipes fitted with the seal housings of embodiments of the present disclosure do not have a restricted flow bore diameter at the end fitting.

The presently disclosed end fittings may be utilized with a new pipe segment and/or with a previously fabricated or previously used pipe segment, such as in connection with refurbishing, reconditioning, or retrofitting the pipe segment. The presently disclosed end fittings may be utilized with a flexible pipe segment, such as an unbonded flexible pipe segment or a bonded flexible pipe segment, and/or with an unbonded or bonded flexible pipe segment that includes a smooth bore or a rough bore. Further, the presently disclosed end fittings may be utilized with a pipe segment that has an inflexible or rigid configuration.

As used herein, the term "flexible pipe segment" refers to a configuration of a tubular pipe body that includes a composite of layered materials that form a pressure-containing conduit that allows large deflections without a significant increase in bending stresses. The terms "rigid" and/or "inflexible," as used herein with reference to a pipe segment, refers to a pipe segment that does not allow large deflections without a significant increase in bending stresses. Rigid or inflexible pipe segments include pipe segments that are not a flexible pipe segment, such as pipe segments formed of a tubular metal alloy.

The term "unbonded," or "unbonded configuration," as used herein with reference to a flexible pipe segment, refers to a configuration of a flexible pipe segment that includes one or more armoring layers capable of relative movement with respect to one or more coaxially adjacent polymeric layers. The one or more armoring layers may be formed of a metal alloy. The one or more coaxially adjacent polymeric layers may respectively define an anti-friction layer disposed coaxially between adjacent armoring layers. An anti-friction layer may allow a plurality of armoring layers to move relative to one another.

The term "bonded," or "bonded configuration," as used herein with reference to a flexible pipe segment, refers to a configuration of a flexible pipe segment that includes one or more armoring layers integrated and bonded to an elastomeric material, such as by way of a vulcanization process. A flexible pipe segment that includes a bonded construction may include one or more textile layers that separate one or more elastomeric layers and that may provide additional structural reinforcement to the flexible pipe segment.

The term "smooth bore," as used herein with reference to a flexible pipe segment, refers to a flexible pipe segment that has an inward sheath or some other smooth layer as the innermost layer of the pipe segment. The inward sheath or the other smooth layer may be formed of a polymeric material.

The term "rough bore," as used herein with reference to a flexible pipe segment, refers to a flexible pipe that has a carcass layer as the innermost layer of the pipe segment.

Example fluids that can be transported by the presently disclosed pipe assemblies include petroleum-based fluids, such as crude oil, petrochemicals, petrochemical feedstocks, petroleum-based gases, petroleum gases, liquified petroleum gas, liquified natural gas, fracking fluid, petroleum-based byproducts, biofuels, commodity chemicals, industrial chemicals, fine chemicals, specialty chemicals, inorganic chemicals, organic chemicals, agrochemicals, industrial gasses, and so forth. Additionally, or in the alternative, the presently disclosed pipe assemblies may be utilized to transport fuels or other chemical products. Additionally, or in the alternative, the presently disclosed pipe assemblies may be utilized to transport water, such as in connection with public utilities, industrial facilities, irrigation, and so forth. Additionally, or in the alternative, the presently disclosed pipe assemblies may be utilized for utility or auxiliary services, such as supplying process fluids, as seawater intake lines, as mud/cementing lines, as air supply lines (e.g., $N_2$, $O_2$, $CO_2$, etc.), or as conduits for electrical wires, optical fibers, and so forth.

These and other features of the presently disclosed subject matter are described with reference to the Figures.

Referring now to the Figures, the presently disclosed subject matter is further described. FIGS. 1A-1D shown an example of a pipe assembly 100 that may be utilized to flow fluid from one location to another, such as from point "A" to point "B." A pipe assembly may include at least one pipe segment 102. The at least one pipe segment 102 may include a flexible pipe and/or an inflexible pipe or rigid pipe segment. A relatively short pipe segment 102 may have a self-supporting length, as shown in FIG. 1A. A relatively long pipe segment 102 may be stored on a spool 104, as shown in FIG. 1B.

A pipe segment 102 may include at least one coupling assembly 106 respectively coupled to an end of the pipe segment 102. The coupling assembly 106 may include an end fitting 107 that has a fixed portion referred to as an end casing 108, and a removable portion referred to as a seal housing 200. The end casing 108 may be permanently coupled to the pipe segment 102. The seal housing 200 may be removably coupled to the end casing 108. The end casing 108 may be couplable to a counterpart fitting 110. The seal housing 200 may include one or more sealing interfaces that interact with adjacent componentry to fluidically seal a fluid plenum and/or flow path defined by the coupling assembly 106.

As shown in FIGS. 1A-1C, the coupling assembly 106 may include a hub clamp interface 112 configured to clamp the end casing 108 to the counterpart fitting 110. As shown in FIG. 1C, the hub clamp interface 112 may include a hub collar 114 configured to provided clamping contact around adjacently situated hubs 116. A first hub 116a may be defined by the end casing 108, and a second hub 116b may be defined by the counterpart fitting 110. A hub 116 defined by the end casing 108 may sometimes be referred to as a casing-hub. A hub 116 defined by the counterpart fitting 110 may sometimes be referred to as a counterpart-hub. As shown in FIG. 1D, the coupling assembly 106 may include a flange clamp configured to clamp the end casing 108 to the counterpart fitting 110. The flange clamp may include a first flange 118a and a second flange 118b that are couplable to one another, for example, by a plurality of flange-bolts 120 (FIG. 1B) inserted through flange-bolt holes 122 (FIG. 1D). The first flange 118a may be defined by the end casing 108, and the second flange 118b may be defined by the counterpart fitting 110. The first flange 118a defined by the end casing 108 may sometimes be referred to as an end casing-flange. The second flange 118b defined by the counterpart fitting 110 may sometimes be referred to as a counterpart-flange.

In some embodiments, an end casing 108 may have a material composition that includes a metal alloy. Suitable metal alloys that may be utilized in a material composition for an end casing include carbon steel, austenitic stainless steel, duplex stainless steel, nickel-alloyed steel, molybdenum-alloyed steel, or nickel-molybdenum-alloyed steel, as well as combinations of these. Additionally, or in the alternative, an end casing 108 may have a material composition that includes a composite material. Suitable composite materials that may be utilized in a material composition for an end casing include a polymeric material reinforced with fibers, such as carbon fibers, glass fibers, and/or aramid fibers. Suitable polymeric materials that may be utilized in a composite material for an end casing include any one or more of the thermoplastic materials and/or elastomeric materials described herein.

As shown in FIGS. 1C and 1D, the coupling assembly 106 may include a seal assembly 124. The seal housing 200 may include one or more seal housing-interfaces 125 configured to interface with one or more seal assembly-interfaces 127 defined by the seal assembly 124. A counterpart fitting 110 may include one or more counterpart-interfaces 129 configured to interface with an additional one or more seal assembly-interfaces 127 defined by the seal assembly 124. A fluid plenum or flow path defined by the coupling assembly 106 and/or the seal assembly 124 may be fluidically sealed at least in part by one or more sealing interfaces defined between a seal housing-interface 125 of the seal housing 200 and a seal assembly-interface 127 of the seal assembly 124. The fluid plenum or flow path may be further fluidically sealed by one or more sealing interfaces defined between an additional seal housing-interface 125 of the seal assembly 124 and a counterpart-interface 129 of the counterpart fitting 110. In some embodiments, the end casing 108 may interface with the seal assembly 124 and/or the counterpart fitting 110 in a manner that does not provide a sealing interface, with the one or more sealing interfaces provided by the seal housing 200 fluidically sealing the fluid plenum or flow path.

The seal assembly 124 may include one or more seal elements configured to interface with the seal housing 200 and/or with the counterpart fitting 110. As shown, the seal assembly 124 may include at least one ring seal 126. Additionally, or in the alternative, the seal assembly may include at least one seal shroud 128. A ring seal 126 may include a first seal assembly-interface 127 configured to provide a first sealing interface with at least one seal housing-interface 125. Additionally, or in the alternative, a ring seal 126 may include a second seal assembly-interface 127 configured to provide a second sealing interface with at least one counterpart-interface 129.

As shown, a seal shroud 128 and at least one ring seal 126 may have a coaxial orientation relative to a longitudinal axis (L) of the coupling assembly 106. For example, at least one ring seal 126 may circumferentially surround the seal shroud 128. Additionally, or in the alternative, a ring seal 126 and a seal shroud 128 may have an axially adjacent orientation relative to the longitudinal axis (L) of the coupling assembly 106. The seal shroud 128 and the ring seal 126 may be respectively separate components of a seal element and/or seal assembly 124. The seal shroud 128 and the seal ring 126 may be coupled, such as removably coupled or permanently coupled, to one another. Additionally, or in the alternative, a ring seal 126 and the seal shroud 128 may define respective portions of an integrally formed seal element and/or seal assembly 124. The seal assembly 124 may inhibit fluid, such as fluid flowing through the pipe segment 102, from escaping through the coupling assembly 106. Additionally, or in the alternative, the seal assembly 124 may inhibit fluid and/or contaminants from entering into interfaces or spaces within the coupling assembly 106.

As shown in FIGS. 1B-1D, in some embodiments, the counterpart fitting 110 may be an adapter, such as a fitting adapter. For example, the counterpart fitting 110 may be configured to couple the coupling assembly to a fluid flowing system, such as a petroleum extraction station, a fluid transfer station, or the like. Additionally, or in the alternative, the counterpart fitting 110 may define a direct interface with a fluid flowing system.

In some embodiments, as shown, an end cap 130 may be attached to the coupling assembly 106 and/or the counterpart fitting 110, such as during storage or transportation of the pipe segment 102, or when the pipe segment 102 is not in use. The end cap 130 may include a charging port 132 for adding or removing fluid from the pipe segment 102. For example, fluid may be added to the pipe segment 102 prior to placing the pipe segment 102 into service, and/or fluid may be removed from the pipe segment 102 after removing the pipe segment 102 from service. In some embodiments, the pipe segment 102 may be stored or transported with the pipe segment 102 at least partially filled with fluid.

As shown in FIGS. 1C and 1D, the coupling assembly 106 may include at least one seal housing 200. A seal housing 200 may be positioned within a seal housing-receiving bore defined by one or more components of the coupling assembly 106, as described herein, for example, with reference to FIGS. 4A and 4B, and FIGS. 5A-5F. For example, as shown, a seal housing 200 may be positioned within a seal housing-receiving bore defined by an end casing 108. The seal housing 200 may be removably coupled to the end casing 108 defining the seal housing-receiving bore. Additionally, or in the alternative, a seal housing 200 may be positioned within a seal housing-receiving bore defined by a counterpart fitting 110. The seal housing 200 may be removably coupled to the counterpart fitting 110 defining the seal housing-receiving bore.

The seal housing 200 may define at least one seal bore 202. A seal bore 202 defined by the seal housing 200 may extend from an axially distal surface of the seal housing 200. At least a portion of the seal assembly 124, such as at least a portion of one or more seal elements of the seal assembly 124, may be seated in a seal bore 202 defined by a seal housing 200. For example, at least a portion of one or more ring seals 126 may be seated in a seal bore 202 defined by a seal housing 200. Additionally, or in the alternative, at least a portion of one or more seal shrouds 128 may be seated in a seal bore 202 defined by a seal housing 200. The at least one seal bore 202 may define one or more of the seal housing-interfaces 125 configured to provide a sealing interface with a seal assembly-interface 127 of the seal assembly 124. The one or more ring seals 126 and/or the one or more seal shrouds 128 may respectively define a seal assembly-interface 127 configured to provide a sealing interface with a seal housing-interface 125 of the at least on seal bore 202.

As shown, a proximal portion of one or more seal elements, such as a ring seal 126 and/or a seal shroud 128, may be seated in a seal bore 202 defined by a seal housing 200. As shown, the seal housing 200 may be positioned within a seal housing-receiving bore defined by an end casing 108 and removably coupled to the end casing 108. A distal portion of the one or more seal elements, such as the ring seal 126 and/or the seal shroud 128, may interface with the counterpart fitting 110. In some embodiments, the counterpart fitting 110 may define a seal bore 202 within which the one or more seal elements may be seated. Additionally, or in the alternative, the counterpart fitting may include a seal housing 200 that defines a seal bore 202 within which the one or more seal elements may be seated.

In some embodiments, the seal housing 200 may provide a sealing interface with a seal assembly 124 and/or with a counterpart fitting 110, regardless of whether the counterpart fitting 110 and the coupling assembly 106 were designed as respectively mating pairs, and/or regardless of whether the counterpart fitting 110 includes a corresponding seal housing 200. For example, the seal housing 200 may provide a sealing interface with a seal assembly 124 that was originally designed to mate with a coupling assembly 106 and/or with a counterpart fitting 110 that does not include a seal housing 200. As another example, a seal housing 200 may provide a sealing interface with a counterpart fitting 110 that was originally designed to mate with a coupling assembly 106 that does not include a seal housing 200.

Referring now to FIGS. 2A-2C, example seal housings 200 are further described. An end fitting 107 that includes an end casing 108 and a seal housing 200 removably couplable to the end casing 108 may be utilized with a flexible pipe segment and/or an inflexible or rigid pipe segment, and with an unbonded flexible pipe segment or a bonded flexible pipe segment. Additionally, or in the alternative, an end fitting 107 that includes an end casing 108 and a seal housing 200 removably couplable to the end casing 108 may be utilized with a smooth bore flexible pipe or a rough bore flexible pipe segment, such as a smooth bore, unbonded flexible pipe segment, a rough bore, unbonded flexible pipe segment, a smooth bore, bonded flexible pipe segment, or a rough bore, bonded flexible pipe segment.

As shown, a seal housing 200 includes a seal housing-body 204 defining a fluid conduit 206 extending longitudinally through the seal housing-body 204. The seal housing-body 204 may include a sleeve portion 208 and a flange portion 210. The sleeve portion 208 may define a proximal portion of the seal housing-body 204 and the flange portion 210 may define a distal portion of the seal housing-body 204. The fluid conduit 206 extends through the sleeve portion 208 and the flange portion 210.

The seal housing 200 may include one or more seal bore-interfaces 211 configured to provide a sealing interface between the seal housing 200 and the seal housing-receiving bore defined by the end casing 108. The one or more sealing interfaces between the seal housing 200 and the seal housing-receiving bore may be configured to prevent fluid from the fluid conduit 206 from flowing between the seal housing 200 and the end casing 108. The prevention of fluid from flowing between the seal housing 200 and the seal housing-receiving bore is of particular importance for embodiments in which the end casing 108 does not provide a sealing interface with the seal assembly 124 and/or the counterpart fitting 110. While the end casing 108 may lack such a sealing interface, the fluid conduit 206 may be fluidically sealed by the one or more sealing interfaces between the seal housing 200 and the seal housing-receiving bore, together with the one or more sealing interfaces between the seal housing 200 and the fluid plenum or flow path defined by the coupling assembly 106 and/or the seal assembly 124 may be fluidically sealed at least in part by one or more sealing interfaces defined between the seal housing 200 and the seal assembly 124 and/or the counterpart fitting 110.

As shown in FIGS. 2A-2C, the seal housing 200 includes at least one seal bore 202 defined by the seal housing-body 204. As shown, the seal housing 200 includes at least one seal bore 202 that extends from an axially distal surface 212 of the seal housing-body 204. A seal bore 202 may define a radially inward surface of the seal housing 200. One or more seal elements may be seated within the at least one seal bore 202. The seal bore 202 and/or the one or more seal elements may define at least a portion of a sealing interface between the seal housing 200 and the seal assembly 124. A seal bore 202 may include a seal bore-rim 214 that defines a circumferential surface of the seal bore 202. The circumferential surface defined by the seal bore-rim 214 may face radially inward. The seal bore may include a seal bore-face 216 that defines an axial face of the seal bore 202, such as an axially distal-facing surface of the seal bore 202. A seal element of the seal assembly 124 may be seated against the seal bore-rim and/or the seal bore-face 216.

In some embodiments, the seal housing 200 may be removably coupled to an end casing 108 of an end fitting 107 (or to a counterpart fitting 110) by a plurality of seal housing-bolts. Additionally, or in the alternative, the seal housing 200 may be removably coupled to an end casing 108 of a coupling assembly 106 (or to a counterpart fitting 110) by helical threads. Additionally, or in the alternative, the seal housing 200 may be removably coupled to an end casing 108 of a coupling assembly 106 (or to a counterpart fitting 110) by an interference fit.

As shown in FIG. 2C, the seal housing 200 may include a plurality of seal housing-bolt holes 218 extending longitudinally through the flange portion 210 of the seal housing-body 204. The seal housing-bolt holes 218 may be circumferentially spaced about the flange portion 210 of the seal housing-body 204. The seal housing-bolt holes 218 may be through holes configured to align with corresponding end casing-bolt holes correspondingly circumferentially spaced about an end casing 108 of a coupling assembly 106. The seal housing 200 may additionally or alternatively include a plurality of blind holes 220 extending longitudinally into the axially distal surface 212 of the seal housing-body 204, such as the flange portion 210 thereof. The blind holes 220 may be configured to receive a tool for installing and/or removing the seal housing 200 from a seal housing-receiving bore. For example, the blind holes 220 may be configured as jack bold holes configured to receive a jack bolt tool.

The seal housing 200 may include at least one seal groove 222 situated circumferentially about a radially outward surface 224 of the seal housing-body 204. The at least one seal groove 222 may be respectively configured to receive one or more ring seals. In some embodiments, a proximal portion 226 of the seal housing-body 204 may include one or more seal grooves 222. A seal groove 222 located at the proximal portion 226 of the radially outward surface 224 of the seal housing-body 204 may be referred to as an outward proximal seal groove. Additionally, or in the alternative, the distal portion 228 of the seal housing-body 204 may include at least one seal groove 222. A seal groove 222 located at the distal portion 228 of the radially outward surface 224 of the seal housing-body 204 may be referred to as an outward distal seal groove.

By way of example, the proximal portion 226 of the seal housing-body 204 may include a plurality of seal grooves 222, such as a primary outward proximal seal groove 230, a secondary outward proximal seal groove 232, and a tertiary outward proximal seal groove 234. The one or more seal grooves 222 located at the proximal portion 226 of the seal housing-body 204 may define at least a portion of a seal bore-interface 211 configured to provide a sealing interface that inhibits fluid, such as fluid flowing through the pipe segment 102, from accessing an interface or space between the radially outward surface 224 of the seal housing-body 204 and the seal housing-receiving bore. As a further example, the radially outward surface 224 of the distal portion 228 of the seal housing-body may include at least one outward distal seal groove 236. The at least one seal groove 222 located at the distal portion 228 of the seal housing-body 204 may be configured to inhibit fluid or contaminants, such as from an external source, from accessing the interface or space between the radially outward surface 224 of the seal housing-body 204 and the seal housing-receiving bore.

The seal housing 200 may have a material composition that includes one or more materials. The material composition of the seal housing 200 may be selected based at least in part on a setting in which the seal housing 200 may be used and/or based at least in part on an environment to which the seal housing 200 may be exposed. In some embodiments, the seal housing 200 may have a material composition that includes a polymeric material. Additionally, or in the alternative, the seal housing 200 may have a material composition that includes a metal alloy. Additionally, or in the alternative, the seal housing 200 may have a material composition that includes a ceramic. Additionally, or in the alternative, the seal housing 200 may have a material composition that includes a composite.

Suitable polymeric materials that may be included in the material composition of a seal housing 200 include thermoplastic materials such as polyamide, polyethylene, polypropylene, polyurethane, or polyvinylidene fluoride, or other thermoplastic materials, as well as combinations of these. Further suitable polymeric materials that may be included in the material composition of the seal housing may additionally or alternatively include ethylene tetrafluoroethylene (ETFE), polyether ether ketone (PEEK), polyetherketoneketone (PEKK), polymethylmethacrylate (PMMA), polyacrylate, polyacrylonitrile (PAN), polyamide-imide (PAI), polyaryletherketone (PAEK), polycarbonate (PC), polyketone (PK), polyester, polyetherimide (PEI), polyimide (PI), polystyrene (PS), polyethersulfone (PES), polyphenylene sulphide (PPS), polysulfone (PSU), polytetrafluoroethylene (PTFE), or polychlorotrifluoroethylene (PCTFE), as well as combinations of these.

Suitable metal alloys that may be included in the material composition of a seal housing 200 include austenitic stainless steel, duplex stainless steel, nickel-alloyed steel, molybdenum-alloyed steel, or nickel-molybdenum-alloyed steel, as well as combinations of these.

Suitable ceramics that may be included in the material composition of a seal housing 200 may include one or more oxide, nitride, or carbide materials that are inorganic and non-metallic. By way of example, suitable ceramic materials may include aluminum oxide, silicon nitride, silicon carbide, or combinations of these.

Suitable composites that may be included in the material composition of a seal housing 200 include a polymeric material reinforced with fibers, such as carbon fibers, glass fibers, and/or aramid fibers. Suitable polymeric materials that may be utilized in a composite material for an end casing include any one or more of the thermoplastic materials and/or elastomeric materials described herein. Further suitable composite materials may include a ceramic material.

Referring now to FIGS. 3A-3D, example pipe segments 102 are further described. As shown in FIGS. 3A-3D, a pipe segment 102 may include a flexible pipe segment 300. The flexible pipe segment 300 may include an unbonded flexible pipe segment 302, as shown, for example, in FIGS. 3A and 3B. Additionally, or in the alternative, The flexible pipe segment 300 may include a bonded flexible pipe segment 304. The presently disclosed coupling assemblies 106, including the presently disclosed end casings 108 and seal housings 200, may be utilized with any flexible pipe segment 300, including an unbonded flexible pipe segment 302 and/or a bonded flexible pipe segment 304.

A flexible pipe segment 300 may be configured according to American Petroleum Institute (API) Recommended Practice 17B, Fifth Edition, May 2014 (Reaffirmed, March 2021), the entirety of which is incorporated by reference herein as if set forth verbatim. Additionally, or in the alternative, an unbonded flexible pipe segment 302 may be configured according to API Specification 17J, Specification for Unbonded Flexible Pipe segment, Fourth Edition, May 2014, the entirety of which is incorporated by reference herein as if set forth verbatim. Additionally, or in the alternative, a bonded flexible pipe segment 304 may be configured according to API Specification 17K, Specification for Bonded Flexible Pipe segment, May 1, 20206, Reaffirmed May 2010, the entirety of which is incorporated by reference herein as if set forth verbatim.

By way of example, a flexible pipe segment 300, such as an unbonded flexible pipe segment 302 or a bonded flexible pipe segment 304, may include an inward sheath 306, an outward sheath 308, and one or more armoring layers 310 situated between the inward sheath 306 and the outward sheath 308. The inward sheath 306 provides containment of fluid within the bore of the flexible pipe segment 300. The outward sheath 308 provides protection against the external environment within which the flexible pipe segment 300 may be utilized. The one or more armoring layers 310 may provide structural support to the flexible pipe segment 300, including support to resist axial and/or radial forces.

The inward sheath 306 may be formed of a material selected based at least in part on compatibility with the fluid intended to be transported through the flexible pipe segment 300. The outward sheath 308 may be formed of a material selected based at least in part on the environment within which the flexible pipe segment 300 may be utilized. In some embodiments, the inward sheath 306 and/or the outward sheath 308 may be formed of a polymeric material. By way of example, suitable polymeric materials that may be utilized in an inward sheath 306 and/or an outward sheath 308 may include one or more thermoplastic materials and/or elastomeric materials described herein, such as polyamide, polypropylene, polyethylene, polyurethane, or polyvinylidene fluoride, as well as combinations of these.

The one or more armoring layers 310 may include one or more reinforcing materials, such as metal alloys and/or one or more composite materials. The one or more armoring layers 310 may include pressure armoring layers and/or tensile armoring layers. By way of example, suitable metal alloys that may be utilized in a reinforcing material for an armoring layer 310 include carbon steel, austenitic stainless steel, duplex stainless steel, nickel-alloyed steel, molybdenum-alloyed steel, or nickel-molybdenum-alloyed steel, as well as combinations of these. Suitable composite materials may include a polymeric material reinforced with fibers, such as carbon fibers, glass fibers, and/or aramid fibers. Suitable polymeric materials that may be utilized in a composite material include any one or more of the thermoplastic materials and/or elastomeric materials described herein.

As shown in FIGS. 3A and 3B, an unbonded flexible pipe segment 302 may include one or more armoring layers 310 that are not bonded to adjacent layers. For example, a plurality of armoring layers 310 may be respectively separated from one another by an anti-friction layer 312. Additionally, or in the alternative, an anti-friction layer 312 may be located between an armoring layer 310 and the inward sheath 306, and/or between an armoring layer 310 and the outward sheath 308. The respective anti-friction layer(s) 312 may enhance relative slippage between adjacently situated layers of the unbonded flexible pipe segment 302.

As shown in FIGS. 3C and 3D, a bonded flexible pipe segment 304 may include one or more armoring layers 310 that include a reinforcing material, such as steel cables, bonded to an elastomeric matrix. The reinforcing material may be fully encapsulated within the elastomeric matrix. The elastomeric matrix may be bonded to one or more adjacent layers, such as to the inward sheath 306 and/or the outward sheath 308. Additionally, the elastomeric matrix may be bonded to the end casing 108. Further, the end casing may be crimped into position within the bonded flexible pipe segment 304. The end casing 108 may be permanently coupled to the bonded flexible pipe segment at least in part by bonding with the elastomeric matrix and/or the crimping of the end casing 108 within the bonded flexible pipe segment 304. The reinforcing material may be bonded to the elastomeric matrix by way of a vulcanization process, such as in an autoclave. The vulcanization process may cause the elastomeric material to crosslink and bond to the reinforcing material, the inward sheath 306, and the outward sheath 308.

In some embodiments, a flexible pipe segment 300, such as an unbonded flexible pipe segment 302 and/or a bonded flexible pipe segment 304, may include an outer armoring layer (not shown) that surrounds the outward sheath 308. The outer armoring layer may protect the flexible pipe segment 300 from mechanical impact, abrasion, weathering, and the like. For example, an unbonded flexible pipe segment 302 may include an inward sheath 306, an outward sheath 308, one or more armoring layers 310 between the inward sheath 306 and the outward sheath 308, and an outer armoring layer surrounding the outward sheath 308. Suitable unbonded flexible pipe segments 302 that include such a configuration include COFLEXIP® unbonded flexible pipe segments 302, available from TechnipFMC, Paris, France.

Suitable elastomeric materials that may be utilized in an armoring layer 310 for a bonded flexible pipe segment 304 include butyl rubber, chlorbutyl rubber, chlorinated polyethylene (CPE), ethylene propylene rubber (EPDM), hydrogenated nitrile butadiene rubber (HNBR), chlorosulfonated polyethylene, natural rubber, polychloroprene (neoprene), nitrile rubber (NBR), nitrile blended PVC (NVC), acrylate rubber, styrene-butadiene rubber (SBR), silicone rubber, or fluorinated rubber, as well as combinations of these. Additionally, or in the alternative, one or more of the thermoplastic materials described herein may be utilized in an armoring layer 310 for a bonded flexible pipe segment 304.

As shown in FIGS. 3B and 3D, in some embodiments, a flexible pipe segment 300, such as an unbonded flexible pipe segment 302 or a bonded flexible pipe segment 304, may include a carcass layer 314. The flexible pipe segments 300 shown in FIGS. 3B and 3D represent a rough bore pipe segment as a result of the carcass layer 314 being the inward-most layer of the pipe segment 102. The flexible pipe segments 300 shown in FIGS. 3A and 3C represent a smooth bore pipe segment as a result of the inward sheath 306 being the inward-most layer of the pipe segment 102.

A carcass layer 314, such as shown in FIGS. 3B and 3D, may be formed of one or more strips of material, such as a metal alloy material, that are shaped into an interlocked helical tube. The one or more strips of material may be folded and wound in a helix such that sequential windings are geometrically locked with one another. The carcass layer 314 may provide enhanced collapse resistance, such as for implementations in which the flexible pipe segment 300 may be exposed to high levels of internal or external hydrodynamic loading. Suitable metal alloys that may be utilized in a carcass of a flexible pipe segment 300 include austenitic stainless steel, duplex stainless steel, nickel-alloyed steel, molybdenum-alloyed steel, or nickel-molybdenum-alloyed steel, as well as combinations of these.

In some embodiments, a pipe segment 102, such as a flexible pipe segment 300, may include a multibore configuration. A multibore configuration may include a plurality of flexible pipe segments 300 combined into a common pipe segment 102, thus reducing the number of distinct lines in a fluid flowing system and providing a simplified layout of the fluid flowing system. A multibore configuration may include a plurality of flexible pipe segments 300 (and/or one or more pipe segments that are inflexible or rigid) combined in a bundle, with one or more external layers surrounding the bundle. The flexible pipe segments may be wound helically. One or more filler materials may be utilized to provide a circular cross section around the bundle of flexible pipe segments 300. The one or more external layers may include one or more armoring layers 310 and/or an outward sheath 308 respectively configured as described herein. One or more of the pipe segments 102 included in a multibore configuration may have an end fitting 107 configured according to the present disclosure. Example flexible pipe segments 300 that have a multibore configuration include integrated service umbilicals, integrated production bundles, and the like. Such multibore configurations may include pipe segments 102 configured for fluid flow, as well as pipe segments that include electrical cables, optical fibers, heating fluid lines, and so forth.

A pipe segment 102, such as a flexible pipe segment 300, may include an inward diameter of from 5 to 60 centimeters, such as from 5 to 15 centimeters, such as from 15 to 30 centimeters, or such as from 30 to 60 centimeters. A pipe segment 102, such as a flexible pipe segment 300, may have a length of less than 1 meter to several thousand meters. For example, a pipe segment 102 may have a length of from 0.1 meter to 2,000 meters, such as from 1 meter to 1,000 meters, such as from 1 meter to 10 meters, such as from 10 meters to 100 meters, such as from 100 meters to 800 meters, such as from 800 meters to 1,200 meters, or such as from 1,200 meters to 2,000 meters.

In some embodiments, a pipe assembly 100 may include a pipe segment 102 that has a rigid or inflexible configuration. By way of example, a pipe segment 102 that has a rigid or inflexible configuration may be formed of a tubular metal alloy, such as carbon steel, austenitic stainless steel, duplex stainless steel, nickel-alloyed steel, molybdenum-alloyed steel, or nickel-molybdenum-alloyed steel, as well as combinations of these. Other rigid or inflexible materials may also be utilized in addition or in the alternative to a metal alloy.

Referring now to FIGS. 4A and 4B, example coupling assemblies 106 are further described. As shown in FIG. 4A, a coupling assembly 106 may be coupled to an unbonded flexible pipe segment 302. As shown in FIG. 4B, a coupling assembly 106 may be coupled to a bonded flexible pipe segment 304. As shown, a fluid flowpath 400 may be defined by a radially inward pipe-surface 402 of a pipe segment 102. The radially inward pipe-surface 402 may be defined by an inward sheath 306 (see, e.g., FIG. 4A) or by a carcass layer 314 (see, e.g., FIG. 4B). Additionally, the fluid flowpath 400 may be defined by one or more components of a coupling assembly 106, such as by a radially inward coupling assembly-surface 404. The fluid flowpath 400 may generally have a similar diameter as between a portion of the fluid flowpath 400 defined the radially inward coupling assembly-surface 404 and a portion of the fluid flowpath 400 defined by the radially inward pipe-surface 402.

As shown in FIG. 4A, the respective layers of an unbonded flexible pipe segment 302 may be coupled to an end fitting 107 of a coupling assembly 106. As shown in FIG. 4B, the respective layers of a bonded flexible pipe segment 304 may be bonded to an end fitting 107 of a coupling assembly 106. The end fitting 107 and a distal portion of the one or more layers of the bonded flexible pipe segment 304 may be permanently bonded to one another to form a one-piece component. The end fitting 107 may include a pipe segment-receiving bore 406 configured to receive at least part of a distal portion of one or more layers of a pipe segment 102, such as a distal portion of an inward sheath 306, a distal portion of a carcass layer 314, and/or a distal portion of an armoring layer 310. The pipe segment-receiving bore 406 may include a pipe segment-receiving seat 408 that faces a radially inward surface. Additionally, or in the alternative, the pipe segment-receiving bore 406 may include a pipe segment-receiving rim 410 that includes a proximally oriented axial face, as shown, for example, in FIG. 4B.

The pipe segment-receiving seat 408 may circumferentially surround one or more layers of the flexible pipe segment 300, such as the inward sheath 306, the carcass layer 314, and/or one or more armoring layers 310. In some embodiments, as shown in FIG. 4B, one or more layers of the flexible pipe segment 300, such as the inward sheath 306, the carcass layer 314, and/or one or more armoring layers 310 may be situated proximally adjacent to the pipe segment-receiving rim 410. For example, the one or more layers of the flexible pipe segment 300 may abut the pipe segment-receiving rim 410. As shown in FIG. 4A, one or more layers of an unbonded flexible pipe segment 302 may be coupled to the end fitting 107 at least in part at the pipe segment-receiving bore 406. As shown in FIG. 4B, one or more layers of a bonded flexible pipe segment 304 may be bonded to the end fitting 107 at least in part at the pipe segment-receiving bore 406.

As shown, for example, in FIG. 4A, in some embodiments, the coupling assembly 106 may include a cannula 412. The cannula 412 may have an annular configuration that includes a radially inward cannula-surface 414 and a radially outward cannula-surface 416. The radially inward cannula-surface 414 may define a portion of the fluid flowpath 400. The radially inward coupling assembly-surface 404 may include the radially inward cannula-surface 414. The cannula 412 may support an endward portion of one or more layers of a flexible pipe segment 300, such as an endward portion of the inward sheath 306 of an unbonded flexible pipe segment 302. The cannula 412 may additionally include a distal cannula-face 418 and a proximally oriented taperer 420. The distal cannula-face 418 may define an abutting surface that abuts one or more corresponding surfaces of the coupling assembly 106. The proximally oriented taperer 420 may allow the inward sheath 306 to be slidably guided over the radially outward cannula-surface 416.

An endward portion of the inward sheath 306 may be clamped between the radially outward cannula-surface 416 and one or more radially inward clamping surfaces of the coupling assembly 106. For example, as shown, the inward sheath 306 may be clamped between the cannula 412 and the end fitting 107 at least in part by a coupling flange 422. The coupling flange 422 may have an annular configuration. The coupling flange 422 may include one or more surfaces that interface with the end fitting 107. The coupling flange 422 may be coupled to the end fitting 107 by one or more coupling flange-bolts 424. In some embodiments, the coupling assembly 106 may include one or more crimping rings 426. The one or more crimping rings 426 may individually or collectively define an annular configuration. A crimping ring 426 may define an integrally formed portion of the coupling flange 422, and/or a crimping ring 426 may define a component that is separate from the coupling flange 422.

As shown, a crimping ring 426 may include a radially outward crimping ring-surface 428 that interfaces with the end fitting 107, and a radially inward crimping ring-surface 430 that interfaces with the inward sheath 306. The end fitting 107 may include a radially inward end fitting-surface 432 that interfaces with the radially outward crimping ring-surface 428. The radially outward crimping ring-surface 428 may have a distally oriented taper that corresponds to the radially inward end fitting-surface 432, such as that corresponds to a distally oriented taper of the and the radially inward end fitting-surface 432. The coupling flange 422 may cause the crimping ring 426 to slidably engage with the end fitting 107 as the coupling flange 422 becomes coupled to the end fitting 107, such as by the one or more coupling flange-bolts 424. As the radially outward crimping ring-surface 428 slidably engages with the radially inward end fitting-surface 432, the crimping ring may bear upon the inward sheath 306, causing at least part of the endward portion of the inward sheath 306 to be crimped between the radially outward cannula-surface 416 and the radially inward crimping ring-surface 430.

In some embodiments, the coupling assembly 106 may include one or more stop rings 434. The one or more stop rings 434 may be situated proximally adjacent to the one or more crimping rings 426. The one or more stop rings 434 may individually or collectively define an annular configuration. A stop ring 434 may define an integrally formed portion of the coupling flange 422, and/or a stop ring 434 may define a component that is separate from the coupling flange 422. The one or more stop rings 434 may inhibit the inward sheath 306 from slipping, such as under tension forces imparted to the flexible pipe segment 300.

In some embodiments, the coupling assembly 106 may include a cannula ring 436. The cannula ring 436 may be situated longitudinally between the end fitting 107 and the cannula 412, and/or between the end fitting 107 and the endward portion of the inward sheath 306 of the unbonded flexible pipe segment 302. The cannula ring 436 may provide axial and/or radial support to the cannula 412 and/or to the inward sheath 306. Additionally, or in the alternative, the cannula ring 436 may provide a sealing interface between the end fitting 107 and the cannula 412, between the end fitting 107 and the inward sheath 306, and/or between the cannula 412 and the inward sheath 306.

The cannula ring 436 may have an annular configuration that includes a radially inward cannula ring-surface 438 and a radially outward cannula ring-surface 440. The cannula ring 436 may additionally include a distal cannula ring-face 442 and a proximal cannula ring-face 444. The radially inward cannula ring-surface 438 may define a portion of the fluid flowpath 400. The radially inward coupling assembly-surface 404 may include the radially inward cannula ring-surface 438. The radially outward cannula ring-surface 440 and/or the distal cannula ring-face 442 may interface with one or more surfaces of the end fitting 107. The proximal cannula ring-face 444 may be oriented towards the inward sheath 306 and/or the cannula 412.

In some embodiments, the cannula ring 436 may include a cannula-receiving seat 446 that includes a radially inward surface. Additionally, or in the alternative, the cannula ring 436 may include a cannula-receiving rim 448 that includes a proximally oriented axial face. The cannula-receiving seat 446 may circumferentially surround a distal portion of the cannula 412. The cannula-receiving seat 446 may receive a portion of the radially outward cannula-surface 416, such as a distal portion of the radially outward cannula-surface 416. The cannula-receiving rim 448 may be located distally adjacent to the distal cannula-face 418 of the cannula 412. The cannula-receiving rim 448 may receive the distal cannula-face 418 of the cannula 412.

In some embodiments, the distal cannula-face 418 of the cannula 412 may bear upon the cannula-receiving rim 448, for example, as the coupling flange 422 becomes coupled to the end casing 108, such as by the one or more coupling flange-bolts 424. Additionally, or in the alternative, the radially outward cannula-surface 416 of the cannula 412 may bear upon the cannula-receiving seat 446, for example, as the coupling flange 422 becomes coupled to the end casing 108, such as by the one or more coupling flange-bolts 424. A sealing interface may be defined between the distal cannula-face 418 of the cannula 412 and the cannula-receiving rim 448 of the cannula ring 436, and/or between the radially outward cannula-surface 416 and the cannula-receiving seat 446. Additionally, or in the alternative, a sealing interface may be defined between the cannula ring 436 and the end fitting 107.

As shown, for example, in FIG. 4A, in some embodiments, the end fitting 107 may include a cannula ring-receiving bore 450 configured to receive a cannula ring 436. The cannula ring-receiving bore 450 may include a cannula ring-receiving seat 452 that includes a radially inward surface. Additionally, or in the alternative, the cannula ring-receiving bore 450 may include a cannula ring-receiving rim 454 that includes a proximally oriented axial face. The cannula ring-receiving seat 452 may be located distally adjacent to the radially inward end fitting-surface 432 of the end fitting 107. Additionally, or in the alternative, the cannula ring-receiving seat 452 may define a portion of the radially inward end fitting-surface 432 of the end fitting 107. The cannula ring-receiving seat 452 may circumferentially surround the cannula ring 436. The cannula ring-receiving seat 452 may receive the radially outward cannula ring-surface 440 of the cannula ring 436. The cannula ring-receiving rim 454 may be located distally adjacent to the distal cannula ring-face 442 of the cannula ring 436. The cannula ring-receiving rim 454 may receive the distal cannula ring-face 442 of the cannula ring 436.

In some embodiments, the distal cannula ring-face 442 of the cannula ring 436 may bear upon the cannula ring-receiving rim 454, for example, as the coupling flange 422 becomes coupled to the end fitting 107, such as by the one or more coupling flange-bolts 424. Additionally, or in the alternative, the radially outward cannula ring-surface 440 of the cannula ring 436 may bear upon the cannula ring-receiving seat 452, for example, as the coupling flange 422 becomes coupled to the end fitting 107, such as by the one or more coupling flange-bolts 424. A sealing interface may be defined between the distal cannula ring-face 442 of the cannula ring 436 and the cannula ring-receiving rim 454 of the end fitting 107, and/or between the radially outward cannula ring-surface 440 of the cannula ring 436 and the cannula ring-receiving seat 452. Additionally, or in the alternative, the proximal cannula ring-face 444 of the cannula ring 436 and a distal end of the inward sheath 306 may define a sealing surface. In some embodiments, the cannula ring 436 may include a cannula ring flange 456 defined between the cannula-receiving seat 446 and the radially outward cannula ring-surface 440. The cannula ring flange 456 may have a sufficient length to compensate for variation in a longitudinal position of the inward sheath 306 situated between the radially outward cannula-surface 416 of the cannula 412 and the radially inward crimping ring-surface 430 of the crimping ring 426. The cannula ring 436 may be formed, e.g., machined, with a dimensional tolerance suitable to provide the sealing surface with respect to the end fitting 107, the cannula 412, and/or the inward sheath 306.

Referring further to FIG. 4A, an endward portion of one or more armoring layers 310 of a flexible pipe segment 300, such as an unbonded flexible pipe segment 302, may be clamped to the end fitting 107 by one or more armoring layer-clamps 458. Additionally, or in the alternative, an endward portion of one or more armoring layers 310 may be clamped to an armoring layer-flange 460. At least a portion of the one or more armoring layers 310 in proximity to the coupling assembly 106 may be encased in an encasing material 462. The encasing material 462 may further secure the one or more armoring layers 310 to and/or within the coupling assembly 106 or one or more components thereof. Additionally, or in the alternative, the encasing material 462 may inhibit external fluids such as water, or contaminants, from penetrating into the coupling assembly 106. The encasing material 462 may additionally or alternatively inhibit fluid within the fluid flowpath 400 from penetrating into the coupling assembly 106. The encasing material 462 may include one or more thermoplastic materials such as one or more of the thermoplastic materials described herein.

An endward portion of the outward sheath 308 of a flexible pipe segment 300, such as an unbonded flexible pipe segment 302, may be secured to the coupling assembly 106 by an outward-sheath clamping assembly (not shown). In some embodiments, the coupling assembly 106 may include a coupling assembly-cover 464. The coupling assembly-cover 464 may be coupled to the end fitting 107, such as by helical threads 466. The outward-sheath clamping assembly (not shown) may couple the endward portion of the outward sheath 308 to the coupling assembly-cover 464. By way of example, the coupling assembly-cover 464 may include coupling assembly-componentry similar to the componentry described with respect to the coupling of the inward sheath 306 to the coupling assembly 106, such as an outer sheath-cannula, an outer sheath-coupling flange, outer sheath-coupling flange-bolts, one or more outer sheath-crimping rings, and/or one or more outer sheath-stop rings.

As shown, for example, in FIG. 4B, an end fitting 107 may include a pipe segment-receiving seat 408 that circumferentially surrounds one or more layers of the bonded flexible pipe segment 304, such as the inward sheath 306, the carcass layer 314, and/or one or more armoring layers 310. Additionally, or in the alternative, the end fitting 107 may include a pipe segment-receiving rim 410 situated distally adjacent to a distal end of one or more layers of the flexible pipe segment 300, such as the inward sheath 306, the carcass layer 314, and/or one or more armoring layers 310. The pipe segment-receiving seat 408 may be bonded to a radially outward surface of a circumferentially adjacent layer of the bonded flexible pipe segment 304, such as a radially outward surface of the inward sheath 306 and/or a radially outward surface of an armoring layer 310. In some embodiments, a bonding gap 468 may be located between the pipe segment-receiving rim 410 and the distal end of the one or more layers of the bonded flexible pipe segment 304. Additionally, or in the alternative, the pipe segment-receiving rim 410 may be bonded to distal end of one or more layers of the bonded flexible pipe segment 304, such as a distal end of the inward sheath 306, the carcass layer 314, and/or one or more an armoring layers 310.

Referring further to FIGS. 4A and 4B, in some embodiments, a radially inward portion of the end fitting 107 may be formed to receive a seal housing 200 (see, e.g., FIGS. 2A-2C). A new or previously manufactured end fitting 107 may be formed to receive a seal housing 200 at least in part by converting the end fitting 107 into an end casing 108 by forming a seal housing-receiving bore 500 in the end fitting 107. The seal housing-receiving bore 500 may be configured and arranged to receive a seal housing 200 such that the end fitting 107 includes the end casing 108 and the seal housing 200. In some embodiments, an end fitting 107 that is permanently coupled to a pipe segment 102 may be refurbished, reconditioned, retrofitted, or the like, at least in part by converting the end fitting into an end casing 108 by forming a seal housing-receiving bore 500 in the end fitting 107, for example, as an alternative to replacing the pipe segment 102 to which the end fitting 107 is permanently coupled.

The seal housing-receiving bore 500 may extend longitudinally through the end casing 108. In some embodiments, a seal housing-receiving bore 500 may extend to the cannula ring-receiving seat 452 of the end casing 108 and/or to the radially inward end casing-surface 432 of the end casing 108, such as in the case of an unbonded flexible pipe segment 302. Alternatively, a seal housing-receiving bore 500 terminate at position of the end casing 108 located axially distal to the cannula ring-receiving rim 454 of the end casing 108. In some embodiments, a seal housing-receiving bore 500 may extend to a pipe segment-receiving seat 408 of the end casing 108 and/or to the pipe segment-receiving rim 410 of the end casing, such as in the case of a bonded flexible pipe segment 304. Alternatively, a seal housing-receiving bore 500 terminate at position of the end casing 108 located axially distal to the pipe segment-receiving seat 408 and/or to the pipe segment-receiving rim 410 of the end casing 108. In some embodiments, the seal housing-receiving bore 500 may be formed by increasing an inner diameter of the end casing 108, such as by machining, boring, or otherwise removing a portion of the end casing 108. Additionally, or in the alternative, an end casing 108 may be originally manufactured with an inner diameter that defines a seal housing-receiving bore 500.

In some embodiments, a surface treatment may be applied to at least a portion of a seal housing-receiving bore 500 and/or to at least a portion of a seal housing 200. The surface treatment may enhance a sealing interface between at least a portion of the seal housing 200 and at least a portion of the seal housing-receiving bore 500. Additionally, or in the alternative, a surface finish may prolong a useful life of the seal housing 200, the end casing 108 and/or the coupling assembly 106. In some embodiments, the surface treatment may include a coating, such as a film. The coating may provide a surface with enhanced smoothness. In some embodiments, the coating may fill or cover machining marks or other surface imperfections resulting from forming a manufacturing or refurbishing process. The coating may include a ceramic, an oxide, an epoxy resin, a polyester resin an acrylic resin, a polyurethane resin, a metal, a metal oxide, a silicate, a silicate oxide, a rare earth element, a rare earth oxide, as well as combinations of these. The coating may be applied using a coating process such as a sol-gel coating process, a micro-arc oxidation process, an atomic layer deposition process, an electrochemical process, a plasma treatment process, a solution immersion process, a surface deposition coating process, a chemical vapor deposition process, a laser-cladding process, a dip-coating process, a spray process, an electrolytic passivation process, a chromate conversion process, a phosphate conversion process, or a fusion bonding process, as well as combinations of these.

Referring now to FIGS. 5A-5F, further described are coupling assemblies 106 and/or end fittings 107 that include an end casing 108 permanently coupled to a pipe segment 102 and a seal housing 200 removably coupled to the end casing 108. The coupling assemblies 106 and/or end fittings 107 shown in FIGS. 5A-5F are described with reference to a flexible pipe segment 300. In other embodiments, the coupling assemblies 106 and/or end fittings 107 described with reference to FIGS. 5A-5F may be coupled to a rigid or inflexible pipe segment. While FIGS. 5A-5E depict an unbonded flexible pipe segment 302, the features described with reference to FIGS. 5A-5E may be additionally or alternatively implemented with a bonded flexible pipe segment 304. While FIGS. 5A-5D depict a flexible pipe segment 300 that includes a smooth bore, the features described with reference to FIGS. 5A-5D may be additionally or alternatively implemented with a flexible pipe segment 300 that includes a rough bore. While FIG. 5E depicts a flexible pipe segment 300 that includes a rough bore, the features described with reference to FIG. 5E may be additionally or alternatively implemented with a flexible pipe segment 300 that includes a smooth bore. While FIG. 5F depicts a bonded flexible pipe segment 304 that includes a rough bore, the features described with reference to FIG. 5F may be additionally or alternatively implemented with an unbonded flexible pipe segment that includes a smooth bore or a rough bore, and/or with a flexible pipe segment 300 that includes a smooth bore. While FIGS. 5A-5E depict an end casing 108 that includes a hub 116 configured to interface with a hub clamp interface 112, the features described with reference to FIGS. 5A-5E may be additionally or alternatively implemented with an end casing 108 that includes a flange 118. While FIG. 5F depicts an end casing 108 that includes a flange 118, the features described with reference to FIG. 5F may be additionally or alternatively implemented with an end casing 108 that includes a hub 116.

As shown in FIGS. 5A-5F, an end casing 108 may define a seal housing-receiving bore 500 extending longitudinally through the end casing 108. A seal housing 200 may be positioned within the seal housing-receiving bore 500 and removably coupled to the end casing 108. The seal housing 200 may define a fluid conduit 206 extending longitudinally through the sleeve portion 208 and the flange portion 210 of the seal housing. The fluid conduit 206 may define a portion of the fluid flowpath 400. The fluid conduit 206 defined by the seal housing 200 may include a diameter of from 5 to 60 centimeters, such as from 5 to 15 centimeters, such as from 15 to 30 centimeters, or such as from 30 to 60 centimeters.

The seal housing 200 may include a sleeve portion 208 defining a proximal portion of the seal housing 200. The seal housing-receiving bore 500 may include a sleeve-receiving bore 502, and the sleeve portion of the seal housing 200 may be positioned within the sleeve-receiving bore 502. In some embodiments, the seal housing 200 may include a flange portion 210 defining a distal portion of the seal housing. The seal housing-receiving bore 500 may include a flange-receiving bore 504, and the flange portion 210 of the seal housing 200 may be positioned within the flange-receiving bore 504.

The seal housing 200 may fit within the seal housing-receiving bore 500 of the end casing 108 with a circumferential clearance of from 10 to 100 micrometers. The circumferential clearance may be determined with respect to at least one longitudinal position of the seal housing 200. In some embodiments, at least a portion of the seal housing-receiving bore 500 may include a taper defining a decreasing diameter along a longitudinally proximal direction. The taper may provide for a relatively tighter fit and/or sealing interface within the seal housing-receiving bore 500 with respect to a proximal portion 226 of the seal housing 200.

In some embodiments, at least part of the seal housing 200 may have an interference fit with a corresponding portion of the seal housing-receiving bore 500. In some embodiments, the seal housing 200 may be inserted within the seal housing-receiving bore 500 at least in part by a shrink fitting process. The shrink fitting process may include cooling at least a portion of the seal housing 200 to cause a thermal contraction of the cooled portion of the seal housing 200, thereby allowing the seal housing 200 to fit within the seal housing-receiving bore 500 more readily. Additionally, or in the alternative, the shrink fitting process may include heating at least a portion of the end casing 108 to cause a thermal expansion of the heated portion of the end casing 108, thereby allowing the seal housing-receiving bore 500 to receive the seal housing 200 more readily. In some embodiments, the seal housing 200 may expand as a result of hydrodynamic pressure exerted upon the fluid conduit 206 by fluid flowing therethrough and/or as a result of a heat transfer relationship with the fluid flowing through the fluid conduit 206. Such expansion may provide for a tighter fit between the seal housing 200 and the seal housing-receiving bore 500 during at least some conditions of fluid flow through the fluid conduit 206.

In some embodiments, a seal housing 200 may be coupled to an end casing 108 by one or more seal housing-couplings 506. As shown in FIGS. 5A-5F, the one or more seal housing-couplings 506 may include a plurality of seal housing-bolts. The flange portion 210 of the seal housing 200 may include a plurality of seal housing-bolt holes. The seal housing-bolts may respectively extend longitudinally through the flange portion 210 of the seal housing-body 204, through a corresponding seal housing-bolt hole 218 (FIG. 2C). The seal housing-bolts may be secured within a corresponding end casing-bolt hole 508 in the end casing 108 of the coupling assembly 106. The flange-receiving bore 504 may include a distal flange face 510, and the plurality of end casing-bolt holes 508 may be circumferentially spaced about the distal flange face 510. corresponding to the plurality of bolt holes of the distal flange face.

Additionally, or in the alternative, a seal housing-coupling 506 may include one or more mating pairs of helical threads (not shown) defined by a radially outward surface 224 of the seal housing 200 and by the seal housing-receiving bore 500. For example, the seal housing-receiving bore 500 may include a first one or more helical threads, and the seal housing 200 may include a second one or more helical threads. The first one or more helical threads may interface with the second one or more helical threads. The first one or more helical threads may be situated about at least part of the flange-receiving bore 504, and the second one or more helical threads may be situated about at least part of the flange portion 210 of the seal housing 200. Additionally, or in the alternative, the first one or more helical threads may be situated about at least part of the sleeve-receiving bore 502, and the second one or more helical threads may be situated about at least part of the sleeve portion 208 of the seal housing 200. Additionally, or in the alternative, a seal housing-coupling 506 may include an interference fit between at least part of the seal housing 200 and a corresponding portion of the seal housing-receiving bore 500.

As shown in FIGS. 5A-5F, the seal housing 200 may define at least one seal bore 202 extending from an axially distal surface 212 of the seal housing 200, such as an axially distal surface 212 of the flange portion 210 of the seal housing 200. One or more sealing elements may be seated in the at least one seal bore 202. In some embodiments, as shown, the at least one seal bore 202 may include a radial seal bore 512, as described further below with reference to FIGS. 6A and 6B, and 6E and 6F. The radial seal bore 512 may define a radially inward surface of the seal housing 200. The radial seal bore 512 may additionally define an axially inset surface of the seal housing 200. The radially inward surface of the seal housing 200 may include a seal-receiving seat 514, and the axially inset surface of the seal housing 200 may include a seal-receiving rim 516. In addition, or in the alternative to a radial seal bore 512, the at least one seal bore 202 may include an axial seal bore defined by an axially distal surface 212 of the seal housing 200, as described further below with reference to FIGS. 6C and 6D, and 6G and 6H.

The seal housing 200 and/or the coupling assembly 106 may include one or more ring seals 126 seated in a respective one of the at least one seal bore 202, such as in a radial seal bore 512. Additionally, or in the alternative, the seal housing 200 and/or the coupling assembly 106 may include a seal shroud 128 seated in a respective one of the at least one seal bore 202, such as in the radial seal bore 512. In some embodiments, the seal shroud 128 may be distally adjacent to a ring seal 126. In some embodiments, a seal shroud 128 seated in a seal bore 202 may extend outward in an axially distal direction beyond the axially distal surface 212 of the seal housing 200. The seal shroud 128 and/or the one or more ring seals 126 may define at least part of a seal assembly 124 (see, e.g., FIGS. 1C and 1D). Additionally, or in the alternative, the one or more ring seals 126 seated in a seal bore 202 may represent additional sealing elements beyond the sealing elements provided as the seal assembly 124. In some embodiments, the seal shroud 128 may define a sealing element with respect to the seal housing. The one or more ring seals 126 and/or the seal shroud 128 may include at least one of: a lap seal, a rib seal, an o-ring seal, a wiper seal, or an s-seal.

In addition to the one or more sealing elements seated in the at least on seal bore 202, the seal housing 200 and/or the coupling assembly 106 may include one or more sealing elements, such as one or more ring seals, respectively seated in a corresponding one of at least one of seal groove 222 situated circumferentially about a radially outward surface 224 of the seal housing 200, such as a radially outward surface 224 of the sleeve portion 208 of the seal housing 200. In some embodiments the one or more sealing elements situated circumferentially about a radially outward surface 224 of the seal housing 200 may include a primary outward proximal seal 518 seated in a primary outward proximal seal groove 230 (see, e.g., FIGS. 2A-2C). In some embodiments, the seal housing 200 may additionally include a secondary outward proximal seal 520 seated in a secondary outward proximal seal groove 232 (see, e.g., FIGS. 2A-2C). In some embodiments, the seal housing 200 may additionally include a tertiary outward proximal seal 522 seated in a tertiary outward proximal seal groove 234 (see, e.g., FIGS. 2A-2C). Additionally, or in the alternative, the one or more sealing elements situated circumferentially about a radially outward surface 224 of the seal housing 200 may include at least one outward distal seal 524 seated in an outward distal seal groove 236 (see, e.g., FIGS. 2A-2C). The one or more sealing elements, such as the one or more ring seals, situated circumferentially about the radially outward surface 224 of the seal housing 200 may include an o-ring, a wiper seal, an s-seal, or a combination of these.

In some embodiments, as shown in FIGS. 5A-5F, the coupling assembly 106 may include at least one sealing element, such as a gasket 526, positioned within the seal housing-receiving bore 500 proximally adjacent to the seal housing 200. The at least one sealing element, such as the gasket 526, may provide a sealing interface between an axially proximal surface 528 of the seal housing 200 and one or more proximally adjacent elements of the coupling assembly 106 and/or a proximally adjacent portion of a pipe segment 102, such as a distal end of one or more layers of a flexible pipe segment 300.

When the coupling assembly 106 is coupled to a counterpart fitting 110, an axial and/or radial load upon the axially distal surface 212 of the seal housing 200 may tighten the sealing interface between the axially proximal surface 528 of the seal housing 200 and the coupling assembly 106 and/or between the axially proximal surface 528 of the seal housing 200 the proximally adjacent portion of a pipe segment 102, including, for example, the sealing interface provided by the at least one sealing element, such as the gasket 526. In some embodiments, the axial and/or radial load upon the seal housing 200 resulting from coupling the coupling assembly to a counterpart fitting 110 may tighten a sealing interface between the seal housing 200 and the seal housing-receiving bore 500, such as between the radially outward surface 224 of the seal housing 200 and the flange-receiving bore 504 and/or the sleeve-receiving bore 502. The axial and/or radial load upon the seal housing 200 may also tighten a sealing interface provided by the one or more sealing elements situated circumferentially between the seal housing 200 and the seal housing-receiving bore 500. For example, the axial and/or radial load resulting from coupling the coupling assembly to a counterpart fitting 110 may cause the seal housing 200 to expand circumferentially and/or to compress axially, thereby tightening one or more sealing interfaces associated with the seal housing 200 and/or the coupling assembly. In some embodiments, a taper defining a decreasing diameter along a longitudinally proximal direction of the seal housing-receiving bore 500 may contribute to a tighter sealing interface. Additionally, or in the alternative, when the coupling assembly 106 is coupled to a counterpart fitting 110, an axial and/or radial load upon the one or more sealing elements seated in the radial seal bore 512 may tighten a sealing interface between the radial seal bore 512 and the one or more sealing elements seated in the radial seal bore 512. Additionally, or in the alternative, a load upon the one or more sealing elements seated in the radial seal bore 512 may translate to the seal housing 200, and/or a load upon the seal housing 200 may translate to the one or more sealing elements seated in the radial seal bore 512, thereby tightening one or more corresponding sealing interfaces.

Referring to FIG. 5A, in some embodiments, a coupling assembly 106 may include a cannula ring 436 located proximally adjacent to the seal housing 200. The cannula ring 436 may be positioned within the pipe segment-receiving bore 406 and/or the within the seal housing-receiving bore 500. The cannula ring may be positioned between the seal housing 200 and a cannula 412. In some embodiments, one or more sealing elements, such as a gasket 526, may be situated adjacently between the seal housing 200 and the cannula ring 436. The one or more sealing elements, such as the gasket 526, may define a sealing interface between the distal cannula ring-face 442 and the axially proximal surface 528 of the seal housing 200.

In some embodiments, a portion of the cannula ring-face 442 may abut the cannula ring-receiving rim 454 and a portion of the cannula ring-face 442 may abut the one or more sealing elements, such as the gasket 526. The cannula ring 436 may interface with a cannula 412, one or more layers of a flexible pipe segment 300, and/or one or more other components of the coupling assembly 106, for example, as described with reference to FIG. 4A. In some embodiments, the cannula ring 436 may include a cannula-receiving seat 446 configured to receive a radially outward cannula-surface 416 of the cannula 412. Additionally, or in the alternative, the cannula ring 436 may include a cannula-receiving rim 448 configured to receive a distal cannula-face 418 of the cannula 412. Additionally, or in the alternative, the cannula ring 436 may include a distal cannula ring-face 442 configured to face the seal housing 200 and/or the one or more sealing elements, such as the gasket 526.

Referring to FIG. 5B, in some embodiments, a coupling assembly 106 may include a cannula 412 located proximally adjacent to the seal housing 200. The cannula 412 may be positioned within the pipe segment-receiving bore 406 and/or the within the seal housing-receiving bore 500. The seal housing 200 may provide sufficient axial support to the cannula 412, to one or more layers of a flexible pipe segment 300, and/or to one or more other components of the coupling assembly 106, such that the cannula ring 436, such as shown in FIG. 5A, may be omitted from the coupling assembly 106. The cannula ring 436 shown in FIG. 5A may be formed, e.g., machined, to a particular tolerance level to provide a suitable interface with the cannula 412 and/or the one or more layers of a flexible pipe segment 300. By omitting the cannula ring 436, a cost savings may be realized as a result of fewer parts and/or reduced manufacturing time. Additionally, or in the alternative, the configuration shown in FIG. 5B may provide an enhanced sealing interface between the seal housing 200 and the cannula 412 and/or the one or more layers of a flexible pipe segment 300.

In some embodiments, one or more sealing elements, such as a gasket 526, may be situated adjacently between the seal housing 200 and the cannula 412. The one or more sealing elements, such as the gasket 526, may define a sealing interface between the cannula 412 and the seal housing 200, such as between the distal cannula-face 418 of the cannula 412 and the axially proximal surface 528 of the seal housing 200. In some embodiments, at least part of the distal cannula-face 418 may abut the one or more sealing elements, such as the gasket 526. In some embodiments, the sleeve-receiving bore 502 may smoothly transition to the pipe segment-receiving bore 406 of the end casing 108. In some embodiments, one or more layers of the flexible pipe segment 300, such as an inward sheath 306, may abut the one or more sealing elements, such as the gasket 526.

Referring, for example, to FIGS. 5A and 5B, in some embodiments, the seal housing 200 and the cannula 412, and/or the seal housing 200 and the cannula ring 436, may have a substantially identical inward diameter. For example, the seal housing 200 may include a first inward diameter and the cannula 412 may include a second inward diameter, and the first inward diameter and the second inward diameter differ from one another by less than 1.0 millimeter. Additionally, or in the alternative, the cannula ring 436 may include a third inward diameter, and the first inward diameter and the third inward diameter may differ from one another by less than 1.0 millimeter.

Referring to FIGS. 5C and 5D, in some embodiments, a seal housing 200 may include a cannula extension 530 defining a proximal portion of the seal housing 200. The cannula extension 530 may be circumferentially surrounded by one or more layers of a flexible pipe segment 300, such as an inward sheath 306 of an unbonded flexible pipe segment 302. As shown in FIG. 5C, the cannula extension 530 may support a distal portion of the inward sheath 306. A radially inward surface of the inward sheath may abut a radially outward surface of the cannula extension 530. In some embodiments, as shown in FIG. 5D, a coupling assembly 106 may include a cannula 412 circumferentially surrounding the cannula extension 530 of the seal housing 200. Additionally, or in the alternative, as shown, the coupling assembly 106 may include a cannula ring 436 circumferentially surrounding the cannula extension 530 of the seal housing 200. A radially inward surface of the cannula 412 and/or a radially inward surface of the cannula ring 436 may abut the radially outward surface of the cannula extension 530. A radially inward surface of the inward sheath may abut a radially outward surface of the cannula 412. The cannula extension 530 may support the cannula 412 and/or the cannula ring 436. The cannula 412 and/or the cannula ring 436, supported by the cannula extension 530, may support a distal portion of the inward sheath 306. Additionally, or in the alternative, in some embodiments, the cannula 412 and/or the cannula ring 436 may define an integrally formed portion of the cannula extension 530 or may be permanently coupled to the cannula extension 530.

Referring to FIGS. 5E and 5F, in some embodiments, a coupling assembly 106 may include a seal housing 200 located distally adjacent to a carcass layer 314 of a flexible pipe segment 300. The flexible pipe segment 300 may include an unbonded flexible pipe segment 302 (FIG. 5E) or a bonded flexible pipe segment 304 (FIG. 5F). As shown in FIG. 5E, in some embodiments, a flexible pipe segment 300, such as an unbonded flexible pipe segment 302, may include a cannula ring 436 situated adjacently between the seal housing 200 and inward sheath 306 of the unbonded flexible pipe segment 302. In some embodiments, as shown in FIGS. 5E and 5F, one or more sealing elements, such as a gasket 526, may be situated adjacently between the seal housing 200 and a distal end of the carcass layer 314. The one or more sealing elements, such as the gasket 526, may define a sealing interface between the axially proximal surface 528 of the seal housing 200 and the distal end of the carcass layer 314. Additionally, or in the alternative, the one or more sealing elements, such as the gasket 526, may define a sealing interface between the axially proximal surface 528 of the seal housing 200 and the cannula ring 436.

Referring now to FIGS. 6A-6H, example seal housing-couplings 506 are described. Additionally, example seal assemblies 124 are further described. As shown in FIGS. 6A-6H, a seal housing 200 may be coupled to an end casing 108 by one or more seal housing-couplings 506. As shown, for example, in FIG. 6A, the seal housing-coupling 506 may include a plurality of seal housing-bolts 600. Additionally, or in the alternative, as shown in FIG. 6B, the seal housing-coupling 506 may include one or more mating pairs of helical threads 602 defined by a radially outward surface 224 of the seal housing 200 and the seal housing-receiving bore 500. In some embodiments, the helical threads 602 may be included on at least a portion of the flange-receiving bore 504 and a corresponding part of the flange portion 210 of the seal housing 200.

As shown in FIGS. 6A and 6B, in some embodiments the flange portion 210 of the seal housing 200 may define a plurality of seal housing-bolt holes 218. The plurality of seal housing-bolts 600 may be respectively secured in a corresponding end casing-bolt hole 508 defined by the end casing 108 of the coupling assembly 106. Additionally, or in the alternative, as shown in FIGS. 6E-6H, the plurality of seal housing-bolts 600 may be respectively secured between a partial seal housing bolt-hole 604 defined by a radially outward surface 224 of the seal housing 200 and a corresponding partial end casing-bolt hole 606 defined by the flange-receiving bore 504.

In some embodiments, as shown in FIGS. 6B, 6D, 6F, and 6H, a seal housing 200 may define a plurality of blind holes 220 configured to receive a tool for installing and/or removing the seal housing 200 from the seal housing-receiving bore 500 of the end casing 108. Referring further to FIGS. 6A-6H, a seal housing may include at least one seal bore 202 that extends from an axially distal surface 212 of the seal housing-body 204. As shown in FIGS. 6A and 6B, and FIGS. 6E and 6F, in some embodiments, the at least one seal bore 202 may include a radial seal bore 512. Additionally, or in the alternative, as shown in FIGS. 6C-6H, the at least one seal bore 202 may include an axial seal bore 608 defined by the axially distal surface 212 of seal housing 200, such as an axially distal surface 212 of the flange portion 210 of the seal housing 200.

As shown in FIGS. 6A and 6B, and FIGS. 6E and 6F, in some embodiments, the coupling assembly 106 and/or the seal housing 200 may include at least one radial seal element 610. The at least one radial seal element 610 may be seated in the radial seal bore 512. For example, the at least one radial seal element 610 may include a ring seal 126 and a seal shroud 128. The ring seal 126 may be located proximally adjacent to the seal shroud 128. In some embodiments, a radial seal element 610, such as a ring seal 126 or a seal shroud 128, may include a proximal seal surface seated in a seal bore 202 and a distal seal surface in contact with the counterpart fitting 110, for example, as shown in FIGS. 1C and 1D. Additionally, or in the alternative, a radial seal element 610, such as a ring seal 126 or a seal shroud 128, may include a proximal seal surface in contact with the seal housing 200 and a distal seal surface in contact with the counterpart fitting 110, for example, as shown in FIGS. 1C and 1D. For example, a seal assembly 124 may include a ring seal 126, such as a radial seal element 610 and/or an axial seal element 614, that circumferentially surrounds the seal shroud 128, for example, as shown in FIGS. 1C and 1D. In some embodiments, the radial seal element 610 may include a lap seal or a rib seal. Additionally, or in the alternative, a first radial seal element 610, such as the ring seal 126, may be seated against a seal-receiving seat 514 defining a radially inward surface of the seal housing 200, and against a seal-receiving rim 516 defining an axially inset surface of the seal housing 200. A second radial seal element 610, such as the seal shroud 128, may include a proximal portion seated in the seal bore 202 and a distal portion in contact with a counterpart fitting 110, for example, as shown in FIGS. 1C and 1D. The second radial seal element 610, such as the seal shroud 128, may be seated against the seal-receiving seat 514, and against an axially distal portion of the first radial seal element 610, such as the ring seal 126. A third radial seal element 610, such as a ring seal 126, may circumferentially surround the seal shroud 128, for example, as shown in FIGS. 1C and 1D.

In some embodiments, as shown, a radial seal element 610, such as the ring seal 126, may include one or more anti-extrusion elements 612. The one or more anti-extrusion elements 612 may inhibit malformation of the radial seal element 610 under axial and/or radial loads. By way of example, the one or more anti-extrusion elements 612 may include garter springs, rings, or the like. In some embodiments, a radial seal element 610, such as a ring seal 126 may include one or more anti-extrusion elements 612 encapsulated within the radial seal element 610. The one or more anti-extrusion elements 612 may facilitate bi-directional sealing of a radial seal element 610, such as a ring seal 126, such as with respect to the radial seal bore 512 and the seal-receiving rim 516 defined by the seal housing 200. In some embodiments, a ring seal 126 that includes one or more anti-extrusion elements 612 may be configured as an s-seal.

As shown in FIGS. 6C and 6D, FIGS. 6E and 6F, and FIGS. 6G and 6H, in some embodiments, the coupling assembly 106 and/or the seal housing 200 may include at least one axial seal element 614. The at least one axial seal element 614 may be seated in an axial seal bore 608 defined by an axially distal surface 212 of the seal housing 200. The axial seal element 614 may provide a sealing interface with one or more surfaces defined by a counterpart fitting 110, such as hub 116 defined by the counterpart fitting 110. The one or more ring seals, such as the at least one radial seal element 610 and/or the at least one axial seal element 614, may respectively include at least one of: a lap seal, a rib seal, an o-ring seal, a wiper seal, or an s-seal.

In some embodiments, the axial seal element 614 may define a portion of a seal assembly 124 configured to fluidically seal a seal assembly-interface 127, such as an interface with the counterpart fitting 110. Additionally, or in the alternative, in some embodiments, the axial seal element 614 may interface with one or more additional seal elements of a seal assembly 124, such as a ring seal 126 and/or a seal shroud 128. Additionally, or in the alternative, as shown in FIGS. 6E and 6F, a coupling assembly 106 and/or the seal housing 200 may include at least one radial seal element 610 seated in a radial seal bore 512, and at least one axial seal element 614 seated in an axial seal bore 608. In some embodiments, a coupling assembly 106 and/or the seal housing 200 may include a first radial seal element 610 and a second axial seal element 614. The first radial seal element 610 may be proximally adjacent to a seal shroud 128. The second axial seal element 614 may circumferentially surround the seal shroud 128, as shown, for example, in FIGS. 1C and 1D. The first radial seal element 610 may include an o-ring or an s-seal. The second axial seal element 614 may include a lap seal or a rib seal.

Referring now to FIGS. 7A and 7B, and FIG. 8, example fluid flowing systems are described. In some embodiments, as shown in FIGS. 7A and 7B, a fluid flowing system may include a petroleum extraction station 700, such as a land-based petroleum extraction station (FIG. 7A) or an underwater petroleum extraction station (FIG. 7B). A petroleum extraction station 700 may include one or more pipe assemblies 100 configured according to the present disclosure. For example, various pipe assemblies 100 included in a petroleum extraction station 700, such as a land-based petroleum extraction station (FIG. 7A) or an underwater petroleum extraction station (FIG. 7B), may include one or more flexible pipe segments 300, such as one or more unbonded flexible pipe segments 302 and/or one or more bonded flexible pipe segments 304. Additionally, or in the alternative, one or more of the pipe assemblies 100 may include one or more pipe segments 102 that have a rigid or inflexible configuration.

A pipe assembly 100 included in or that defines a portion of a land-based petroleum extraction station (FIG. 7A) or an underwater petroleum extraction station (FIG. 7B) may include one or more pipe segments 102 that has a coupling assembly 106 couplable to a counterpart fitting 110. The coupling assembly 106 may include a seal housing 200. The coupling assembly 106 of a pipe segment 102 may be coupled to a counterpart fitting 110. The counterpart fitting may define a portion of a fluid flowing system associated with the petroleum extraction station 700. Additionally, or in the alternative, the counterpart fitting 110 may define a coupling assembly 106 of another pipe segment 102. For example, a petroleum extraction station 700 may include a plurality of pipe segments 102 coupled to one another at least in part by a coupling assembly 106, such as a coupling assembly that includes a seal housing 200, respectively configured according to the present disclosure.

By way of example, the petroleum extraction station 700 depicted in FIG. 7A may include a well fracking system. Additionally, or in the alternative the petroleum extraction station 700 may include any other systems or equipment for land-based petroleum extraction. As shown in FIG. 7A, the petroleum extraction station 700 may include a plurality of frac trees 702 respectively installed over a corresponding well bore (not shown). A diverter valve system 704 may be configured to selectively connect a well servicing apparatus to one or more of the frac trees 702 while venting pressure from one or more of the other frac trees 702. The land-based petroleum extraction station may include a plurality of flexible pipe segments 300 that fluidly couple a respective frac tree 702 to the diverter valve system 704. The respective frac trees 702 and/or the diverter valve system 704 may include a counterpart fitting 110 to which a coupling assembly 106 of a flexible pipe segment 300 may be coupled.

As another example, the petroleum extraction station 700 depicted in FIG. 7B may include an underwater extraction station. As shown in FIG. 7B, a petroleum extraction station 700, such as an underwater extraction station, may include a plurality of underwater pipelines 748. One or more of the underwater pipelines 748 may include a pipe assembly 100 configured according to the present disclosure.

As shown in FIG. 7B, petroleum extraction station 700, such as an underwater extraction station, a may include one or more containment assemblies 750 fluidly coupled to a wellbore (not shown). The containment assembly 750 may be coupled to a subsea manifold 752 by way of one or more flexible pipe segments 300. The manifold may be configured to distribute fluids produced from the containment assembly 750 to one or more riser assemblies 754 that transport fluid to one or more fluid capture vessels 756. A riser assembly 754 may respectively include one or more pipe segments 102. For example, in some embodiments, a riser assembly 754 may include a rigid riser 758 that includes one or more pipe segments 102 that have an inflexible or rigid configuration. Additionally, or in the alternative, a riser assembly 754 may include one or more flexible pipe segments 300. As shown, one or more flexible pipe segments 300 may be coupled to respective ends of a rigid riser 758. Fluid may flow through a first one or more flexible pipe segments 300 to the rigid riser 758, and from the rigid riser 758 to a second one or more flexible pipe segments 300 coupled to the one or more fluid capture vessels 756. Additionally, or in the alternative, one or more flexible pipe segments may transfer fluid from a subsea manifold 752 directly to a fluid capture vessel 756. In some embodiments, a petroleum extraction station 700 may include a plurality of flexible pipe segments 300 coupled to one another in series, such as between a subsea manifold 752 and a fluid capture vessel 756.

In some embodiments, a petroleum extraction station 700, such as an underwater extraction station, may include one or more accumulators 760. An accumulator may be configured to regulate process fluid pressure by expanding and contracting a regulation chamber and a process fluid chamber that are separated from one another by a bladder, a piston, or the like. One or more pipe segments 102, such as one or more flexible pipe segments 300, may couple the process fluid chamber of the accumulator 760 to the containment assembly 750 and/or to the subsea manifold 752.

As further shown in FIG. 7B, a petroleum extraction station 700, such as an underwater extraction station, may include one or more umbilical termination units 762. The umbilical termination unit 762 may include an electrohydraulic system that allows a plurality of subsea control modules to be connected to a common source for communications, electrical, and hydraulic supply lines. An integrated service umbilical 764 may be coupled between the umbilical termination unit 762 and fluid capture vessel 756. The integrated service umbilical 764 may include a multi-bore configuration that includes at least one flexible pipe segment 300, such as a plurality of sequentially coupled flexible pipe segments 300.

In some embodiments, a petroleum extraction station 700, such as an underwater extraction station, may include a dispersant injection system 766. The dispersant injection system 766 may be configured to supply a chemical dispersing agent to a petroleum discharge source or site, such as the containment assembly 750. The chemical dispersing agent may aid in breaking up petroleum solids and liquids by reducing the interfacial tension between oil and water. The chemical dispersing agent may be supplied to the dispersant injection system 766 from a dispersant vessel 768, such as by one or more dispersant supply lines 770. The one or more dispersant supply lines 770 may include one or more pipe segments 102, such as one or more flexible pipe segments 300. Additionally, or in the alternative, the dispersant injection system 766 may provide the chemical dispersing agent to the petroleum discharge source or site at least in part by way of one or more pipe segments 102, such as one or more flexible pipe segments 300.

Additionally, or in the alternative, a petroleum extraction station 700, such as an underwater extraction station, may include a hydrate inhibitor injection system 772. The hydrate inhibitor injection system 772 may be configured to supply a hydrate inhibiting agent to the containment assembly 750 or other locations of the petroleum extraction station 700. The hydrate inhibiting agent may inhibit the formation of gas hydrates, which may form an ice-like solid material that may plug process equipment. The hydrate inhibiting agent may include a thermodynamic inhibitor, a kinetic hydrate inhibitor, an anti-agglomerant inhibitor, or a combination of these. The hydrate inhibiting agent may be supplied to the hydrate inhibitor injection system 772 from a hydrate inhibiting agent vessel 774, such as by one or more hydrate inhibiting agent supply lines 776. The one or more hydrate inhibiting agent supply lines 776 may include one or more pipe segments 102, such as one or more flexible pipe segments 300. Additionally, or in the alternative, the hydrate inhibitor injection system 772 may provide the hydrate inhibiting agent to the containment assembly 750 at least in part by way of one or more pipe segments 102, such as one or more flexible pipe segments 300.

In some embodiments, a petroleum extraction station 700, such as an underwater extraction station, may include a containment top-hat 778 configured to interface with a containment assembly 750. The containment top-hat 778 may be configured to contain and/or capture fluid from the containment assembly 750. The containment top-hat may be coupled to one or more pipe segments 102 configured to supply fluid captured by the containment top-hat 778 to a fluid capture vessel 756 and/or a support vessel 780.

In some embodiments, a fluid capture vessel 756 and/or a support vessel 780 may be configured to transfer fluid to a tanker vessel 782, such as by one or more flexible pipe segments 300. In some embodiments, the flexible pipe segments 300 may be configured to float. For example, the flexible pipe segments 300 may include one or more buoyancy layers formed of a low-density material such as open or closes cell foam.

Referring now to FIG. 8, in some embodiments, a fluid flowing system may include a fluid transfer station 800. The fluid transfer station 800 may include a pumping station 802. The pumping station 802 may include one or more pumps 804. Additionally, or in the alternative, the fluid transfer station 800 may include a transfer manifold 806 that includes one or more counterpart fittings 110 to which a pipe assembly 100 may be coupled. The pipe assembly 100 may define at least a portion of the fluid transfer station 800 or the pipe assembly 100 may be utilized in connection with a fluid flowing process associated with the fluid transfer station 800. The pipe assembly 100 may include one or more pipe segment 102, such as a flexible pipe segment 300. For example, one or more flexible pipe segments 300 may be coupled to a counterpart fitting 110 at the transfer manifold 806, such as at a first coupling assembly 106 that includes an end casing 108 coupled to a first end of the flexible pipe segment 300. Additionally, or in the alternative, a second coupling assembly 106 at a second end of the flexible pipe segment 300 may include an end casing 108 coupled to a counterpart fitting 110 of a vehicle 808 that includes a fluid tank 810, such as a tanker truck (as shown), or a marine vessel, an aircraft, or a rail car. The respective end casings 108 may include a seal housing 200 configured in accordance with the present disclosure. Additionally, or in the alternative, the pumping station 802 and/or the transfer manifold 806 may include one or more pipe segments 102 that include an end casing 108 with a seal housing 200 configured in accordance with the present disclosure. The fluid transfer station may be configured to pump fluid from the transfer manifold 806 to the fluid tank 810 of the vehicle 808, and/or from the fluid tank 810 of the vehicle to the fluid transfer manifold 806.

In some embodiments, the fluid transfer station 800 may be implemented in connection with a petroleum extraction station 700. For example, the fluid transfer station 800 may be configured to transfer a petroleum fluid from the transfer manifold 806 to the fluid tank 810. Additionally, or in the alternative, the fluid transfer station 800 may be configured to transfer a process fluid, such as a chemical dispersing agent, a hydrate inhibiting agent, or other process fluids. In some embodiments, the fluid transfer station 800 may be configured to transfer a fuel. In some embodiments, the fluid transfer station 800 may be configured to transfer a water.

In some embodiments, a pipe segment 302, such as a flexible pipe segment 300, may be configured and/or operated according to the Norwegian university of Science and Technology, Handbook on Design and Operation of Flexible Pipes, 2017, the entirety of which is incorporated by reference herein as if set forth verbatim. Additionally, or in the alternative, a pipe segment 302, such as a flexible pipe segment 300, may include a marine offloading hose configured according to the Oil Companies International Marine Forum, Guide to Manufacturing and Purchasing Hoses for Offshore Moorings, 5th Edition, the entirety of which is incorporated by reference herein as if set forth verbatim.

In some embodiments, the plurality of flexible pipe segments 300 included in a fluid flowing system, such as a petroleum extraction station 700 or a fluid transfer station 800, may include a COFLEXIP® unbonded flexible pipe segments 302, available from TechnipFMC, Paris, France. Additionally, or in the alternative, the plurality of flexible pipe segments 300 included in a fluid flowing system may include one or more other configurations in accordance with the present disclosure. Further, a fluid flowing system may include one or more pipe segments 200 that have inflexible or rigid configuration.

Referring now to FIG. 9, example pipe assemblies 100 are further described. fluid flowing system may include a fluid transfer station 800. As shown in FIG. 9, a pipe assembly 100 may include a pipe segment 102 that includes a coupling assembly 106 at respective opposite ends of the pipe segment 102. A coupling assembly 106 at a respective end of the pipe segment 102 may be coupled to the pipe segment 102. Additionally, or in the alternative, as shown in FIG. 9, a coupling assembly 106 at a respective end of the pipe segment 102 may be integral with the pipe segment 102. The coupling assembly 106 may include an end casing 108 that includes a seal housing 200. The coupling assembly 106, the end casing 108, and/or the seal housing 200 may be configured in accordance with the present disclosure. In some embodiments, at least one coupling assembly 106 of the pipe assembly 100 may include a cannula 412 and/or a cannula ring 436. Additionally, or in the alternative, the cannula 412 and/or the cannula ring 436 may be omitted from at least one coupling assembly 106.

The pipe assembly 100 may include a least one seal bore 202 extending from an axially distal surface 212 of the seal housing 200 (see, e.g., FIGS. 2A-2C). The coupling assembly 106 may include at least one radial seal element 610. The at least one radial seal element 610 may be seated in the radial seal bore 512 (see, e.g., FIGS. 5A-5F). As shown, the at least one radial seal element 610 may include a seal shroud 128, a first ring seal 126 axially adjacent to a proximal side 902 the seal shroud 128 and a second ring seal 126 axially adjacent to a distal side 904 of the seal shroud 128. Additionally, or in the alternative, the coupling assembly may include at least one axial seal element 614. As shown, an axial seal element 614 may be situated between respectively adjacent hubs 116 of a hub clamp interface 112. Additionally, or in the alternative, an axial seal element 614 may be situated between respectively adjacent flanges of a flange interface (see, e.g., FIG. 1D). As shown in FIG. 9, the axial seal element 614 may circumferentially surround the seal shroud 128. The radial seal elements 610 and the axial seal element 614 may respectively include a lap seal, a rib seal, an o-ring seal, a wiper seal, or an s-seal. For example, the radial seal elements 610, such as the ring seals 126, may include an o-ring seal, a wiper seal, or an s-seal. Additionally, or in the alternative, the axial seal element 614 may include a lap seal or a rib seal.

As shown in FIG. 9, in some embodiments, the counterpart fitting 110 may include a fitting adapter 906. The fitting adapter 906 may transition the counterpart fitting 110 from a hub 116 of an end casing 108 to a corresponding flange of a fluid flowing system. The fitting adapter 906 may include an adapter hub 908 and an adapter flange 910 that may be coupled to the corresponding flange of the fluid flowing system. The adapter hub 908 may be couplable to the hub 116 of the end casing 108 by a hub clamp interface 112 (see, e.g., FIG. 1C). In some embodiment, a first adapter flange 910 may be configured to be coupled to a frac tree 702 of a petroleum extraction station 700 (FIG. 7A). In some embodiment, a second adapter flange 910 may be configured to be coupled to a diverter valve system 704 of the petroleum extraction station 700 (FIG. 7A). In some embodiments, the pipe assembly 100 shown in FIG. 9 may be or define at least a portion of a pup joint, a save sub, a spacer and pup, or the like, which, for example, may be configured to space out flexible pipe segments 102 at a fluid flowing system such as a petroleum extraction station 700.

Referring now to FIGS. 10A and 10B, example methods of installing a seal housing 200 in an end fitting 107 of a coupling assembly 106, and example methods of coupling a pipe assembly 100 or a pipe segment 102 to a fluid flowing system, are respectively described.

As shown in FIG. 10A, a method 1000 of installing a seal housing 200 in an end fitting 107 of a pipe segment 102 or pipe assembly 100 may include, at block 1002, forming an end casing 108 by forming a seal housing-receiving bore 500 in an end fitting 107 of a coupling assembly 106 for a pipe segment 102. At block 1004, the method 1000 may include installing the seal housing 200 in the seal housing-receiving bore 500. The seal housing-receiving bore 500 may extend longitudinally through the end fitting 107. The seal housing 200 may define at least one seal bore 202 extending from an axially distal surface 212 of the seal housing 200. In some embodiments, upon having installed the seal housing 200 in the seal housing-receiving bore 500, an inward diameter defined by the seal housing 200 may be within 1.0 millimeter of an inward diameter of a fluid flowpath 400, a cannula 412, and/or a cannula ring 436 of the coupling assembly 106. In some embodiments, the seal housing 200 may fit within the seal housing-receiving bore with a circumferential clearance of from 10 to 100 micrometers. The circumferential clearance may be determined with respect to at least one longitudinal position of the seal housing 200.

In some embodiments, forming a seal housing-receiving bore 500 (block 1002) may include, at block 1006, increasing an inward diameter of at least a distal portion of a fluid flowpath 400 defined by the end fitting 107. The fluid flowpath 400 may extend longitudinally through the end fitting 107. Additionally, or in the alternative, forming the seal housing-receiving bore 500 (block 1002) may include, at block 1008, forming a sleeve-receiving bore 502 and a flange-receiving bore 504. The sleeve-receiving bore 502 may be configured to receive a sleeve portion 208 of the seal housing 200, and the flange-receiving bore 504 may be configured to receive a flange portion 210 of the seal housing 200.

In some embodiments, the method 1000 of installing a seal housing 200 may include, at block 1010, forming a plurality of seal housing-bolt holes 218 in a distal flange face 510 of the flange-receiving bore 504, and coupling the seal housing 200 to the end casing 108 with a plurality of seal housing-bolts 600 respectively installed in a corresponding one of the plurality of seal housing-bolt holes 218. Additionally, or in the alternative, the method 1000 of installing a seal housing 200 may include, at block 1012, forming a first one or more helical threads 602 in the flange-receiving bore 504, and coupling the seal housing 200 to the end casing 108 with a second one or more helical threads 602 defined by the seal housing 200, with the first one or more helical threads 602 configured to interface with the second one or more helical threads 602.

In some embodiments, the method 1000 may include, at block 1014, removing the seal housing 200 after a period of service, and replacing the seal housing 200 with a replacement seal housing 200. Additionally, or in the alternative, the method 1000 may include, at block 1016, removing a cannula ring 436 from the coupling assembly 106 prior to installing the seal housing 200. A proximal portion of the seal housing 200, when installed in the seal housing-receiving bore 500, may occupy a space previously occupied by the cannula ring 436. Additionally, or in the alternative, the method 1000 may include, at block 1018, replacing the cannula ring 436 with a replacement cannula ring 436. In some embodiments, the replacement cannula ring 436 may have a larger inward diameter than the cannula ring 436 removed from the coupling assembly 106. In some embodiments, the seal housing 200 may include a cannula extension 530, and the cannula extension 530 may occupy at least a portion of a space previously occupied by the cannula ring 436 removed from the coupling assembly 106.

Additionally, or in the alternative, the method 1000 may include, at block 1020, removing a cannula 412 from the coupling assembly 106 prior to installing the seal housing 200. In some embodiments, a proximal portion of the seal housing 200, when installed in the seal housing-receiving bore 500, may occupy at least a portion of a space previously occupied by the cannula 412. Additionally, or in the alternative, the method 1000 may include, at block 1022, replacing the cannula 412 with a replacement cannula 412. In some embodiments, the replacement cannula 412 may have a larger inward diameter than the cannula 412 removed from the coupling assembly 106. In some embodiments, the seal housing 200 may include a cannula extension 530, and the cannula extension 530 may occupy at least a portion of a space previously occupied by the cannula 412 removed from the coupling assembly 106.

In some embodiments, the method 1000 may include, at block 1024, positioning a gasket 526 within the seal housing-receiving bore 500 prior to installing the seal housing 200 in the seal housing-receiving bore 500. The gasket 526 may be situated proximally adjacent to the seal housing 200 when positioned within the seal housing-receiving bore 500.

As shown in FIG. 10B, a method 1050 of coupling a pipe assembly 100 to a fluid flowing system may include, at block 1052, positioning an end fitting 107 of a coupling assembly 106 adjacent to a counterpart fitting 100 of the fluid flowing system. The end fitting 107 may include an end casing 108 defining a seal housing-receiving bore 500, and a seal housing positioned within the seal housing receiving bore 500. At block 1054, the method 1050 may include coupling the end casing 108 of the end fitting 107 to the counterpart fitting 110, with the seal housing providing a sealing interface. In some embodiments, such as in the example method 1050, the coupling assembly 106 may include a seal housing-receiving bore 500 defined by the end casing 108, a seal housing 200 positioned within the seal housing-receiving bore 500. The seal housing-receiving bore 500 extends longitudinally through the end casing 108. The seal housing 200 defines at least one seal bore 202 extending from an axially distal surface 212 of the seal housing 200. In some embodiments, such as in the example method 1050, the coupling assembly 106 may further include one or more ring seals 126 seated in a respective one of the at least one seal bore 202. The one or more ring seals 126 may provide a sealing interface between the seal housing 200 and the counterpart fitting 110. In some embodiments, the method 1050 may include, at block 1056, removing the seal housing 200 after a period of service and replacing the seal housing 200 with a new or replacement seal housing. In various embodiments, the method 1050 may be performed with respect to a counterpart fitting 110 that defines part of at least one of a petroleum extraction station, a fluid transfer station, or the like.

In some embodiments, the end casing 108 may include a first hub 116a and the counterpart fitting may include a second hub 116b, and block 1054 of the method 1050 (coupling the end casing 108 of the coupling assembly 106 to the counterpart fitting 110) may include, at block 1058, clamping the first hub 116a and the second hub 116b with a hub clamp interface 112. In some embodiments, the end casing 108 may include a first flange 118a and the counterpart fitting 110 may include a second flange 118b, and block 1054 of the method 1050 (coupling the end casing 108 of the coupling assembly 106 to the counterpart fitting 110) may include, at block 1060, bolting the first flange 118a and the second flange 118b to one another with a plurality of flange-bolts 120.

In various embodiments, the method 1000 described with reference to FIG. 10A and/or the method 1050 described with reference to FIG. 10B may be performed with respect to an unbonded flexible pipe segment 302, a bonded flexible pipe segment 304, or a pipe segment 102 that includes an inflexible or rigid configuration. Further, the method 1000 may be performed with respect to a smooth bore pipe segment, or a rough bore pipe segment.

Further aspects of the present disclosure are provided by the following clauses:

A replaceable seal housing for an end casing of an unbonded flexible pipe segment, the replaceable seal housing comprising: a seal housing-body comprising a sleeve portion and a flange portion; a plurality of seal housing-bolt holes extending longitudinally through the flange portion of the seal housing-body; at least one of seal groove situated circumferentially about a radially outward surface of the sleeve portion of the seal housing-body; a fluid conduit defined by the seal housing-body and extending longitudinally through the sleeve portion and the flange portion; and a radial seal bore defined by the seal housing-body, wherein the radial seal bore extends from an axially distal surface of the seal housing-body.

The replaceable seal housing of any clause herein, comprising: an axial seal bore defined by an axially distal surface of the flange portion of the seal housing-body.

The replaceable seal housing of any clause herein, comprising: a plurality of blind holes extending longitudinally into the axially distal surface of the seal housing-body.

The replaceable seal housing of any clause herein, comprising one or more seal grooves situated about a radially outward surface of the sleeve portion of the seal housing-body.

The replaceable seal housing of any clause herein, wherein the seal housing-body has a material composition comprising at least one of: a thermoplastic material, a metal alloy, a ceramic, or a composite.

The replaceable seal housing of any clause herein, wherein the fluid conduit comprises a diameter of from 5 to 60 centimeters.

The replaceable seal housing of any clause herein, comprising one or more ring seals seated in the radial seal bore, the one or more ring seals comprising at least one of: a lap seal, a rib seal, an o-ring seal, a wiper seal, or an s-seal.

A seal housing for an end casing of a flexible pipe segment, the seal housing comprising: a seal housing-body defining a fluid conduit extending longitudinally therethrough; at least one seal bore defined by the seal housing-body, wherein the at least one seal bore extends from an axially distal surface of the seal housing-body.

The seal housing of any clause herein, wherein the at least one seal bore comprises at least one of: a radial seal bore defining a radially inward surface of the seal housing-body; or an axial seal bore situated about an axially distal surface of the seal housing-body.

The seal housing of any clause herein, wherein the seal housing-body comprising a sleeve portion and a flange portion, and wherein the fluid conduit extends through the sleeve portion and the flange portion.

The seal housing of any clause herein, comprising: a plurality of seal housing-bolt holes extending longitudinally through the flange portion of the seal housing-body, the plurality of seal housing-bolt holes comprising at least one of: a plurality of through holes, or a plurality of blind holes.

The seal housing of any clause herein, comprising: one or more helical threads defined by a radially outward surface of the seal housing-body.

The seal housing of any clause herein, comprising: at least one of seal groove situated circumferentially about a radially outward surface of the seal housing-body.

The seal housing of any clause herein, wherein the at least one seal groove comprises one or more seal grooves situated about at least one of: a proximal portion of the sleeve portion of the seal housing-body, or a distal portion of the sleeve portion of the seal housing.

The seal housing of any clause herein, comprising: a ring seal seated in a respective one of the at least one seal groove.

The seal housing of any clause herein, wherein the seal housing-body has a material composition comprising at least one of: a thermoplastic material, a metal alloy, a ceramic, or a composite.

The seal housing of any clause herein, wherein the fluid conduit comprises a diameter of from 5 to 60 centimeters.

The seal housing of any clause herein, comprising: a seal shroud seated in a respective one of the at least one seal bore.

The seal housing of any clause herein, comprising: one or more ring seals seated in a respective one of the at least one seal bore.

The seal housing of any clause herein wherein the one or more ring seals comprises at least one of: a lap seal, a rib seal, an o-ring seal, a wiper seal, or an s-seal.

An end fitting for a flexible pipe segment, the end fitting comprising: an end casing, the end casing defining a seal housing-receiving bore extending longitudinally through the end casing; and a seal housing positioned within the seal housing-receiving bore, wherein the seal housing defines at least one seal bore extending from an axially distal surface of the seal housing.

The end fitting of any clause herein, wherein the seal housing comprises a sleeve portion and a flange portion, the sleeve portion defining a proximal portion of the seal housing and the flange portion defining a distal portion of the seal housing; and wherein the seal housing-receiving bore of the end casing comprises a sleeve-receiving bore configured to receive the sleeve portion of the seal housing, and a flange-receiving bore configured to receive the flange portion of the seal housing.

The end fitting of any clause herein, wherein the seal housing fits within the seal housing-receiving bore with a circumferential clearance of from 10 to 100 micrometers, as determined with respect to at least one longitudinal position of the seal housing.

The end fitting of any clause herein, wherein the seal housing has a material composition comprising at least one of: a thermoplastic material, a metal alloy, a ceramic, or a composite.

A coupling assembly for a pipe segment, the coupling assembly comprising: an end casing, the end casing defining a seal housing-receiving bore extending longitudinally through the end casing; and a seal housing positionable within the seal housing-receiving bore and removably couplable to the end casing, wherein the seal housing defines at least one seal bore extending from an axially distal surface of the seal housing.

The coupling assembly of any clause herein, comprising: a gasket positionable within the seal housing-receiving bore proximally adjacent to the seal housing.

The coupling assembly of any clause herein, comprising: a cannula situated proximally adjacent to the seal housing.

The coupling assembly of any clause herein, wherein the seal housing comprises a first inward diameter and the cannula comprises a second inward diameter, and wherein the first inward diameter and the second inward diameter differ from one another by less than 1.0 millimeter.

The coupling assembly of any clause herein, comprising: a cannula ring positionable within the seal housing-receiving bore between the seal housing and the cannula.

The coupling assembly of any clause herein, wherein the cannula ring comprises: a cannula-receiving seat configured to receive a radially outward surface of the cannula; a cannula-receiving rim configured to receive an axially distal surface of the cannula; and a distal cannula ring-face configured to face the seal housing.

The coupling assembly of any clause herein, wherein the seal housing comprises a first inward diameter and the cannula ring comprises a third inward diameter, and wherein the first inward diameter and the third inward diameter differ from one another by less than 1.0 millimeter.

The coupling assembly of any clause herein, wherein the seal housing comprises a cannula extension defining a proximal portion of the seal housing.

The coupling assembly of any clause herein, comprising: a cannula circumferentially surrounding at least a portion of the cannula extension of the seal housing.

The coupling assembly of any clause herein, comprising: a cannula ring positionable within the seal housing-receiving bore between the seal housing and the cannula.

The coupling assembly of any clause herein, wherein the cannula ring comprises: a cannula-receiving seat configured to receive a radially outward surface of the cannula; a cannula-receiving rim configured to receive an axially distal surface of the cannula; and a distal cannula ring-face configured to face the seal housing.

The coupling assembly of any clause herein, wherein the seal housing comprises a sleeve portion and a flange portion, the sleeve portion defining a proximal portion of the seal housing and the flange portion defining a distal portion of the seal housing; and wherein the seal housing-receiving bore of the end casing comprises a sleeve-receiving bore configured to receive the sleeve portion of the seal housing, and a flange-receiving bore configured to receive the flange portion of the seal housing.

The coupling assembly of any clause herein, wherein at least a portion of the seal housing-receiving bore comprises a taper defining a decreasing diameter along a longitudinally proximal direction.

The coupling assembly of any clause herein, wherein the flange-receiving bore comprises a distal flange face, the distal flange face comprising a plurality of seal housing-bolt holes; and wherein the flange portion of the seal housing comprises a plurality of through holes corresponding to the plurality of seal housing-bolt holes of the distal flange face.

The coupling assembly of any clause herein, wherein the seal housing comprises a plurality of blind holes configured to receive a tool for installing and/or removing the seal housing from the seal housing-receiving bore of the end casing.

The coupling assembly of any clause herein, wherein: the end casing comprises a hub, the hub couplable to a counterpart fitting by a hub clamp interface; or the end casing comprises a flange, the flange comprising a plurality of flange-bolt holes, and the flange couplable to a counterpart fitting by a plurality of seal housing-bolts respectively extending through a corresponding one of the plurality of seal housing-bolt holes.

The coupling assembly of any clause herein, comprising: a seal shroud seatable in a respective one of the at least one seal bore.

The coupling assembly of any clause herein, comprising: one or more ring seals seatable in a respective one of the at least one seal bore, wherein the one or more ring seals comprises at least one of: a lap seal, a rib seal, an o-ring seal, a wiper seal, or an s-seal.

The coupling assembly of any clause herein, wherein the seal housing fits within the seal housing-receiving bore with a circumferential clearance of from 10 to 100 micrometers determined with respect to at least one longitudinal position of the seal housing.

The coupling assembly of any clause herein, wherein the seal housing-receiving bore comprises a first one or more helical threads, and wherein the seal housing comprises a second one or more helical threads, the first one or more helical threads configured to interface with the second one or more helical threads.

A coupling assembly for a flexible pipe segment, the coupling assembly comprising: an end casing, the end casing defining a seal housing-receiving bore extending longitudinally through the end casing; and a seal housing positionable within the seal housing-receiving bore and removably couplable to the end casing, wherein the seal housing defines at least one seal bore extending from an axially distal surface of the seal housing.

The coupling assembly of any clause herein, wherein the seal housing comprises a sleeve portion and a flange portion, the sleeve portion defining a proximal portion of the seal housing and the flange portion defining a distal portion of the seal housing; and wherein the seal housing-receiving bore of the end casing comprises a sleeve-receiving bore configured to receive the sleeve portion of the seal housing, and a flange-receiving bore configured to receive the flange portion of the seal housing.

The coupling assembly of any clause herein, wherein the seal housing fits within the seal housing-receiving bore with a circumferential clearance of from 10 to 100 micrometers, as determined with respect to at least one longitudinal position of the seal housing.

The coupling assembly of any clause herein, wherein the seal housing has a material composition comprising at least one of: a thermoplastic material, a metal alloy, a ceramic, or a composite.

The coupling assembly of any clause herein, comprising the seal housing of any clause herein.

A pipe assembly for flowing a fluid, the pipe assembly comprising: a flexible pipe segment, the flexible pipe segment having an unbonded configuration or a bonded configuration; and at least one end fitting, wherein a respective one of the at least one end fitting comprises: an end casing coupled to the flexible pipe segment, the end casing defining a seal housing-receiving bore extending longitudinally through the end casing, a seal housing positioned within the seal housing-receiving bore and removably coupled to the end casing, wherein the seal housing defines at least one seal bore extending from an axially distal surface of the seal housing, and one or more sealing elements seated in a respective one of the at least one seal bore; wherein a respective one of the at least one end fitting is couplable to a counterpart fitting, wherein the seal housing and/or the one or more sealing elements are configured to define a sealing interface with the counterpart fitting.

The pipe assembly of any clause herein, wherein the one or more sealing elements comprises: at least one ring seal, the at least one ring seal comprising a proximal seal surface in contact with the seal housing and a distal seal surface in contact with the counterpart fitting.

The pipe assembly of any clause herein, wherein the one or more sealing elements comprises: a seal shroud comprising a proximal portion and a distal portion, the proximal portion seated in the respective one of the at least one seal bore, and the distal portion in contact with the counterpart fitting.

The pipe assembly of any clause herein, wherein the one or more sealing elements comprises: a first radial seal element and a second axial seal element, the first radial seal element seated in the respective one of the at least one seal bore proximally adjacent to the seal shroud, and the second axial seal element circumferentially surrounding the seal shroud.

The pipe assembly of any clause herein, wherein the first radial seal element comprises at least one of: an o-ring seal, a wiper seal, or an s-seal.

The pipe assembly of any clause herein, wherein the second axial seal element comprises at least one of: a lap seal or a rib seal, and/or wherein the second axial seal element comprises at least one of: a lap seal or a rib seal.

The pipe assembly of any clause herein, comprising: a gasket positioned within the seal housing-receiving bore proximally adjacent to the seal housing.

The pipe assembly of any clause herein, comprising: a cannula situated proximally adjacent to the seal housing.

The pipe assembly of any clause herein, wherein the seal housing comprises a first inward diameter and the cannula comprises a second inward diameter, and wherein the first inward diameter and the second inward diameter differ from one another by less than 1.0 millimeter.

The pipe assembly of any clause herein, comprising: a cannula ring positioned within the seal housing-receiving bore between the seal housing and the cannula.

The pipe assembly of any clause herein, wherein the seal housing comprises a cannula extension defining a proximal portion of the seal housing.

The pipe assembly of any clause herein, comprising: a cannula circumferentially surrounding at least a portion of the cannula extension of the seal housing.

A pipe assembly, comprising: a flexible pipe segment; and an end fitting, the end fitting comprising: an end casing permanently coupled to the flexible pipe segment, the end casing defining a seal housing-receiving bore extending longitudinally through the end casing; a replaceable seal housing positioned within the seal housing-receiving bore, the replaceable seal housing defining a radial seal bore extending from an axially distal surface of the replaceable seal housing; and one or more sealing elements seated in the radial seal bore; wherein the replaceable seal housing comprises a sleeve portion and a flange portion, and wherein the replaceable seal housing is replaceably coupled to the end casing at least in part by a plurality of seal housing-bolts respectively installed in a corresponding one of a plurality of seal housing-bolt holes extending longitudinally through the flange portion of the replaceable seal housing; and wherein the end fitting is couplable to a counterpart fitting with at least one of the one or more sealing elements providing a sealing interface with the counterpart fitting.

The pipe assembly of any clause herein, wherein the pipe assembly and/or the counterpart fitting defines a part of a petroleum extraction station or a fluid transfer station.

The pipe assembly of any clause herein, wherein the flexible pipe segment comprises an inward diameter of from 5 to 60 centimeters.

The pipe assembly of any clause herein, wherein the flexible pipe segment comprises a length of from 1 to 1,000 meters.

A pipe assembly for flowing a fluid, the pipe assembly comprising: a pipe segment; and at least one coupling assembly respectively coupled to an end of the pipe segment, wherein the coupling assembly comprises: an end casing permanently coupled to the end of the pipe segment, the end casing defining a seal housing-receiving bore extending longitudinally through the end casing; and a seal housing positioned within the seal housing-receiving bore and removably coupled to the end casing, wherein the seal housing defines at least one seal bore extending from an axially distal surface of the seal housing.

The pipe assembly of any clause herein, wherein the pipe segment comprises one of: an unbonded flexible pipe segment; a bonded flexible pipe segment; or a rigid pipe segment.

The pipe assembly of any clause herein, wherein the pipe segment comprises one of: a smooth bore pipe segment; or a rough bore pipe segment.

The pipe assembly of any clause herein, comprising: a hub defined by the end casing; a hub clamp interface couplable to the hub; and a seal assembly comprising: at least one of a ring seal and a shroud respectively seatable in a respective one of the at least one seal bore.

The pipe assembly of any clause herein, comprising: a fitting adapter comprising an adapter hub and an adapter flange, the adapter hub couplable to the hub by the hub clamp interface.

The pipe assembly of any clause herein, wherein the pipe assembly defines at least a portion of a pup joint.

The pipe assembly of any clause herein, wherein the pipe assembly defines at least a portion of an underwater pipeline.

The pipe assembly of any clause herein, comprising the coupling assembly of any clause herein and/or the seal housing of any clause herein.

A method of installing a seal housing in an end casing of a pipe assembly, the method comprising: forming a seal housing-receiving bore in an end casing of a coupling assembly for a pipe segment, the seal housing-receiving bore extending longitudinally through the end casing; and installing a seal housing in the seal housing-receiving bore, wherein the seal housing defines at least one seal bore extending from an axially distal surface of the seal housing.

The method of any clause herein, wherein installing the seal housing in the seal housing receiving-bore comprises removably coupling the seal housing to the end casing.

The method of any clause herein, wherein forming the seal housing-receiving bore comprises increasing an inward diameter of at least a distal portion of a fluid conduit defined by the end casing, the fluid conduit extending longitudinally through the end casing.

The method of any clause herein, wherein forming the seal housing-receiving bore comprises forming a sleeve-receiving bore and a flange-receiving bore, the seal housing-receiving bore configured to receive a sleeve portion of the seal housing, and the flange-receiving bore configured to receive a flange portion of the seal housing.

The method of any clause herein, comprising: forming a plurality of seal housing-bolt holes in a distal flange face of the flange-receiving bore, and coupling the seal housing to the end casing with a plurality of seal housing-bolts respectively installed in a corresponding one of the plurality of seal housing-bolt holes.

The method of any clause herein, comprising: forming a first one or more helical threads in the flange-receiving bore, and coupling the seal housing to the end casing with a second one or more helical threads defined by the seal housing, the first one or more helical threads configured to interface with the second one or more helical threads.

The method of any clause herein, comprising: removing a cannula ring from the coupling assembly prior to installing the seal housing, wherein a proximal portion of the seal housing, when installed in the seal housing-receiving bore, occupies a space previously occupied by the cannula ring.

The method of any clause herein, comprising: removing a cannula from the coupling assembly prior to installing the seal housing.

The method of any clause herein, wherein a proximal portion of the seal housing, when installed in the seal housing-receiving bore, occupies at least a portion of a space previously occupied by the cannula.

The method of any clause herein, comprising: replacing the cannula with a replacement cannula, the replacement cannula having a larger inward diameter than the cannula having been removed from the coupling assembly.

The method of any clause herein, wherein the seal housing comprises a cannula extension, the cannula extension occupying at least a portion of a space previously occupied by the cannula having been removed from the coupling assembly.

The method of any clause herein, comprising: replacing the cannula ring with a replacement cannula ring, the replacement cannula ring having a larger inward diameter than the cannula ring having been removed from the coupling assembly.

The method of any clause herein, wherein the seal housing comprises a cannula extension, the cannula extension occupying at least a portion of a space previously occupied by the cannula ring having been removed from the coupling assembly.

The method of any clause herein, comprising: positioning a gasket within the seal housing-receiving bore prior to installing a seal housing in the seal housing-receiving bore, the gasket situated proximally adjacent to the seal housing.

The method of any clause herein, wherein the coupling assembly comprises a cannula, and wherein the seal housing comprises a first inward diameter and the cannula comprises a second inward diameter, and wherein the first inward diameter and the second inward diameter differ from one another by less than 1.0 millimeter.

The method of any clause herein, wherein the seal housing comprises a first inward diameter and the pipe comprises a third inward diameter, and wherein the first inward diameter and the third inward diameter differ from one another by less than 1.0 millimeter.

The method of any clause herein, wherein the seal housing-receiving bore comprises a taper defining a decreasing diameter along a longitudinally proximal direction.

The method of any clause herein, wherein the seal housing fits within the seal housing-receiving bore with a circumferential clearance of from 10 to 100 micrometers determined with respect to at least one longitudinal position of the seal housing.

The method of any clause herein, comprising: removing the seal housing after a period of service; and replacing the seal housing with a replacement seal housing.

The method of any clause herein, wherein the pipe comprises one of: an unbonded flexible pipe segment; a bonded flexible pipe segment; or a rigid pipe segment.

The method of any clause herein, wherein the pipe comprises one of: a smooth bore pipe segment; or a rough bore pipe segment.

A method of coupling a pipe assembly to a fluid flowing system, the method comprising: positioning a coupling assembly adjacent to a counterpart fitting of the fluid flowing system, the coupling assembly comprising an end casing permanently coupled to a pipe segment and a seal housing removably coupled to the end casing; and coupling the end casing of the coupling assembly to the counterpart fitting, wherein the seal housing comprises at least one sealing interface that interacts with the counterpart fitting to fluidically seal a fluid flow path through the coupling assembly.

The method of any clause herein, wherein the coupling assembly comprises: a seal housing-receiving bore defined by the end casing, the seal housing-receiving bore extending longitudinally through the end casing; a seal housing positioned within the seal housing-receiving bore and removably coupled to the end casing, wherein the seal housing defines at least one seal bore extending from an axially distal surface of the seal housing; and one or more ring seals seated in a respective one of the at least one seal bore, wherein the one or more ring seals provide a sealing interface between the seal housing and the counterpart fitting.

The method of any clause herein, wherein the one or more ring seals comprises a first radial seal element, the first radial seal element comprising a proximal seal surface in contact with the seal housing and a distal seal surface in contact with the counterpart fitting.

The method of any clause herein, wherein the first radial seal element comprises one of: a lap seal or a rib seal.

The method of any clause herein, wherein the coupling assembly comprises: a seal shroud comprising a proximal portion and a distal portion, the proximal portion seated in a respective one of the at least one seal bore, and the distal portion in contact with the counterpart fitting.

The method of any clause herein, wherein the one or more ring seals comprises: a first radial seal element and a second axial seal element, the first radial seal element proximally adjacent to the seal shroud, and the second axial seal element circumferentially surrounding the seal shroud.

The method of any clause herein, wherein the first radial seal element comprises at least one of: an o-ring seal, a wiper seal, or an s-seal.

The method of any clause herein, wherein the second axial seal element comprises at least one of: a lap seal or a rib seal.

The method of any clause herein, wherein the end casing comprises a first hub and the counterpart fitting comprises a second hub, and wherein coupling the end casing of the coupling assembly to the counterpart fitting comprises clamping the first hub and the second hub with a hub clamp interface; or wherein the end casing comprises a first flange and the counterpart fitting comprises a second flange, and wherein coupling the end casing of the coupling assembly to the counterpart fitting comprises bolting the first flange and the second flange to one another with a plurality of flange-bolts.

The method of any clause herein, wherein the one or more ring seals comprises a first radial seal element, the first radial seal element comprising a proximal seal surface seated in a respective one of the at least one seal bore and a distal seal surface in contact with the counterpart fitting.

The method of any clause herein, wherein the coupling assembly comprises: a seal shroud comprising a proximal portion and a distal portion, the proximal portion seated in a respective one of the at least one seal bore, and the distal portion in contact with the counterpart fitting.

The method of any clause herein, wherein the pipe comprises one of: an unbonded flexible pipe segment; a bonded flexible pipe segment; or a rigid pipe segment.

The method of any clause herein, wherein the pipe comprises one of: a smooth bore pipe segment; or a rough bore pipe segment.

The method of any clause herein, wherein the counterpart fitting defines at least a portion of a pup joint.

The method of any clause herein, wherein the counterpart fitting defines at least a portion of a petroleum extraction station.

The method of any clause herein, wherein the counterpart fitting defines at least a portion of a well fracking station.

The method of any clause herein, wherein the counterpart fitting defines at least a portion of a fluid transfer station.

The method of any clause herein, wherein the pipe comprises a length of from 1 to 1,000 meters.

The method of any clause herein, wherein the pipe comprises an inward diameter of from 5 to 60 centimeters.

The method of any clause herein, wherein the counterpart fitting comprises: an interface fitting, the interface fitting defining an interface bore extending longitudinally through the interface fitting; an interface-seal housing positioned within the interface bore, wherein the interface-seal housing defines at least one interface-seal bore extending from an axially distal surface of the interface-seal housing; and wherein a distal portion of the one or more ring seals are seated in a respective one of the at least one interface-seal bore, wherein the sealing interface between the seal housing and the counterpart fitting comprises: a proximal sealing interface defined by a proximal portion of the one or more ring seals and the respective one of the at least one seal bore;

and a distal sealing interface defined by the distal portion of the one or more ring seals and the respective one of the at least one interface-seal bore.

The method of any clause herein, comprising: removing the seal housing after a period of service; and replacing the seal housing with a replacement seal housing.

The method of any clause herein, performed with respect to the pipe assembly of any clause herein, the coupling assembly of any clause herein, and/or the seal housing of any clause herein.

Although the presently disclosed subject matter has been described with reference to the embodiments illustrated in the attached drawing figures, it is noted that equivalents may be utilized, and substitutions made herein without departing from the scope of the invention defined by the appended claims.

Accordingly, what is claimed as new and desired to be protected by Letters Patent includes the following:

1. A pipe assembly for flowing a fluid, the pipe assembly comprising:
   a flexible pipe segment; and
   at least one end fitting, wherein a respective one of the at least one end fitting comprises:
      an end casing permanently coupled to the flexible pipe segment, the end casing defining a removable seal housing-receiving bore extending longitudinally through the end casing,
      a removable seal housing positioned within the removable seal housing-receiving bore and removably coupled to the end casing, wherein the removable seal housing defines at least one seal bore extending from an axially distal surface of the removable seal housing, and
      one or more sealing elements seated in a respective one of the at least one seal bore;
   wherein a respective one of the at least one end fitting is couplable to a counterpart fitting, wherein the removable seal housing and/or the one or more sealing elements are configured to define a sealing interface with the counterpart fitting;
   a cannula situated proximally adjacent to the removable seal housing; and
   a cannula ring positioned within the removable seal housing-receiving bore between the removable seal housing and the cannula.

2. The pipe assembly of claim 1, wherein the one or more sealing elements comprises:
   at least one ring seal, the at least one ring seal comprising a proximal seal surface in contact with the removable seal housing and a distal seal surface in contact with the counterpart fitting.

3. The pipe assembly of claim 1, wherein the one or more sealing elements comprises:
   a seal shroud comprising a proximal portion and a distal portion, the proximal portion seated in the respective one of the at least one seal bore, and the distal portion in contact with the counterpart fitting.

4. The pipe assembly of claim 3, wherein the one or more sealing elements comprises:
   a first radial seal element and a second axial seal element, the first radial seal element seated in the respective one of the at least one seal bore proximally adjacent to the seal shroud, and the second axial seal element circumferentially surrounding the seal shroud.

5. The pipe assembly of claim 4, wherein the first radial seal element comprises at least one of: an o-ring seal, a wiper seal, or an s-seal.

6. The pipe assembly of claim 4, wherein the second axial seal element comprises at least one of: a lap seal or a rib seal.

7. The pipe assembly of claim 1, comprising:
   a gasket positioned within the removable seal housing-receiving bore proximally adjacent to the removable seal housing.

8. The pipe assembly of claim 1, wherein the removable seal housing comprises a first inward diameter and the cannula comprises a second inward diameter, and wherein the first inward diameter and the second inward diameter differ from one another by less than 1.0 millimeter.

9. The pipe assembly of claim 1, wherein the removable seal housing comprises a cannula extension defining a proximal portion of the removable seal housing.

10. The pipe assembly of claim 9,
    wherein the cannula circumferentially surrounds at least a portion of the cannula extension of the removable seal housing.

11. An end fitting for a flexible pipe segment, the end fitting comprising:
    an end casing permanently couplable to the flexible pipe segment, the end casing defining a seal housing-receiving bore extending longitudinally through the end casing; and
    a removable seal housing positioned within the seal housing-receiving bore, the removable seal housing defining a radial seal bore extending from an axially distal surface of the removable seal housing; and
    one or more sealing elements seated in the radial seal bore;
    wherein the removable seal housing comprises a sleeve portion and a flange portion,
    wherein the removable seal housing is removably coupled to the end casing at least in part by a plurality of seal housing-bolts respectively installed in a corresponding one of a plurality of seal housing-bolt holes extending longitudinally through the flange portion of the removable seal housing,
    wherein the end fitting is couplable to a counterpart fitting with at least one of the one or more sealing elements providing a sealing interface with the counterpart fitting;
    a cannula situated proximally adjacent to the removable seal housing; and
    a cannula ring positioned within the seal housing-receiving bore between the removable seal housing and the cannula.

12. The end fitting of claim 11,
    wherein the sleeve portion defines a proximal portion of the removable seal housing and the flange portion defines a distal portion of the removable seal housing; and
    wherein the seal housing-receiving bore of the end casing comprises a sleeve-receiving bore configured to receive the sleeve portion of the removable seal housing, and a flange-receiving bore configured to receive the flange portion of the removable seal housing.

13. The end fitting of claim 11, wherein the removable seal housing fits within the seal housing-receiving bore with a circumferential clearance of from 10 to 100 micrometers, as determined with respect to at least one longitudinal position of the removable seal housing.

14. The end fitting of claim 11, wherein the removable seal housing has a material composition comprising at least one of: a thermoplastic material, a metal alloy, a ceramic, or a composite.

15. The end fitting of claim 11, wherein the counterpart fitting defines a part of a petroleum extraction station or a fluid transfer station.

16. A pipe assembly, comprising:
a flexible pipe segment; and
an end fitting, the end fitting comprising:
  an end casing permanently coupled to the flexible pipe segment, the end casing defining a seal housing-receiving bore extending longitudinally through the end casing;
  a removable seal housing positioned within the seal housing-receiving bore, the removable seal housing defining a radial seal bore extending from an axially distal surface of the removable seal housing; and
  one or more sealing elements seated in the radial seal bore;
wherein the removable seal housing comprises a sleeve portion and a flange portion,
wherein the removable seal housing is removably coupled to the end casing at least in part by a plurality of seal housing-bolts respectively installed in a corresponding one of a plurality of seal housing-bolt holes extending longitudinally through the flange portion of the removable seal housing,
wherein the end fitting is couplable to a counterpart fitting with at least one of the one or more sealing elements providing a sealing interface with the counterpart fitting;
a cannula situated proximally adjacent to the removable seal housing; and
a cannula ring positioned within the seal housing-receiving bore between the removable seal housing and the cannula.

17. The pipe assembly of claim 16, wherein the pipe assembly and/or the counterpart fitting defines a part of a petroleum extraction station or a fluid transfer station.

18. The pipe assembly of claim 16, wherein the flexible pipe segment comprises an inward diameter of from 5 to 60 centimeters.

19. The pipe assembly of claim 16, wherein the flexible pipe segment comprises a length of from 1 to 1,000 meters.

20. The pipe assembly of claim 16, wherein the removable seal housing has a material composition comprising at least one of: a thermoplastic material, a metal alloy, a ceramic, or a composite.

* * * * *